US008843241B2

(12) United States Patent
Saberi et al.

(10) Patent No.: US 8,843,241 B2
(45) Date of Patent: Sep. 23, 2014

(54) REMOTE MONITORING AND CONTROL SYSTEM COMPRISING MESH AND TIME SYNCHRONIZATION TECHNOLOGY

(75) Inventors: Ali Saberi, Bethesda, MD (US); James Robert Gilbert, Mesa, AZ (US); Kevin Lay, New River, AZ (US)

(73) Assignee: LiveMeters, Inc., Greenbelt, MD (US)

(*) Notice: Subject to any disclaimer, the term of this patent is extended or adjusted under 35 U.S.C. 154(b) by 549 days.

(21) Appl. No.: 12/993,780

(22) PCT Filed: May 20, 2009

(86) PCT No.: PCT/US2009/044730
§ 371 (c)(1),
(2), (4) Date: Nov. 19, 2010

(87) PCT Pub. No.: WO2009/143287
PCT Pub. Date: Nov. 26, 2009

(65) Prior Publication Data
US 2011/0066297 A1    Mar. 17, 2011

Related U.S. Application Data

(60) Provisional application No. 61/054,779, filed on May 20, 2008, provisional application No. 61/108,312, filed on Oct. 24, 2008.

(51) Int. Cl.
| | | |
|---|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G08C 15/06 | (2006.01) |
| G08C 19/20 | (2006.01) |
| G08C 19/22 | (2006.01) |
| H04Q 9/00 | (2006.01) |
| F03B 13/10 | (2006.01) |
| H02P 9/04 | (2006.01) |
| F16K 31/02 | (2006.01) |
| F16K 31/08 | (2006.01) |

(52) U.S. Cl.
USPC ............. 700/287; 340/870.03; 340/870.07; 290/43; 290/54; 251/129.04; 251/129.11; 251/65

(58) Field of Classification Search
CPC ..... G01D 4/004; G01F 15/063; G01F 15/001; G01F 15/005; Y02B 90/242; Y02B 90/244; Y02B 90/246; Y02B 90/248; Y04S 20/322; Y04S 20/327; Y04S 20/42; Y04S 20/52; F01C 1/126; F01C 220/24; F16K 31/08; F16K 37/0083; F16K 37/0091
USPC .................. 700/275, 282, 286, 287; 340/870.01–870.03, 870.07; 290/7, 43, 290/54; 251/129.01, 129.04, 129.11, 65
See application file for complete search history.

(56) References Cited

U.S. PATENT DOCUMENTS

| | | | | |
|---|---|---|---|---|
| 6,994,309 | B2 * | 2/2006 | Fernandez-Sein | ....... 251/129.04 |
| 7,274,305 | B1 * | 9/2007 | Luttrell | ............ 340/870.02 |
| 7,671,480 | B2 * | 3/2010 | Pitchford et al. | ............. 290/43 |
| 7,950,217 | B2 * | 5/2011 | Hu et al. | ................. 60/39.52 |

(Continued)

*Primary Examiner* — Crystal J Barnes-Bullock
(74) *Attorney, Agent, or Firm* — Ditthavong & Steiner, P.C.

(57) ABSTRACT

A remote monitoring and control system comprising synchronized wireless MESH technology for remote monitoring and control of utility grids (e.g., utility meters), commodity distribution networks, industrial equipment, and infrastructure including remote disconnection/connection and self-generating power.

16 Claims, 33 Drawing Sheets

(56) References Cited

U.S. PATENT DOCUMENTS

| | | | |
|---|---|---|---|
| 8,279,080 B2 * | 10/2012 | Pitchford et al. | 340/870.02 |
| 8,393,138 B2 * | 3/2013 | Hu et al. | 60/39.52 |
| 8,567,757 B2 * | 10/2013 | Pitchford et al. | 251/129.04 |
| 2009/0035121 A1 * | 2/2009 | Watson et al. | 415/1 |

* cited by examiner

100

400

600

800

900

1000

1100

1200

FIGURE 15
1500
15A
15B
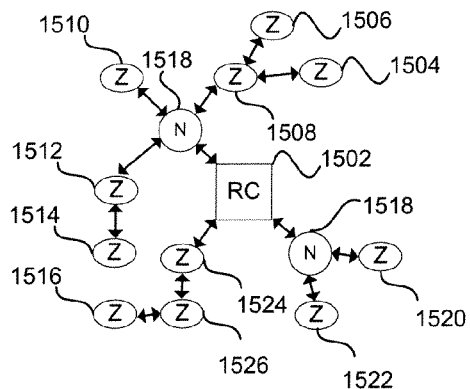
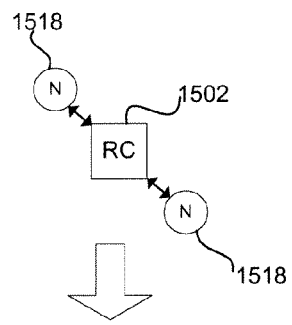
15D
15C
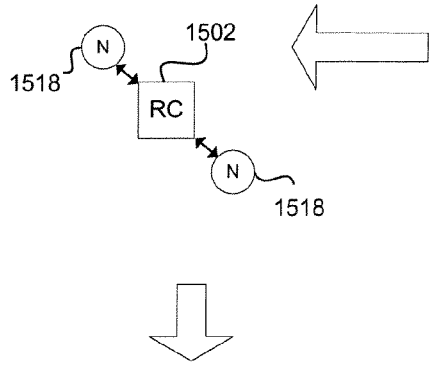
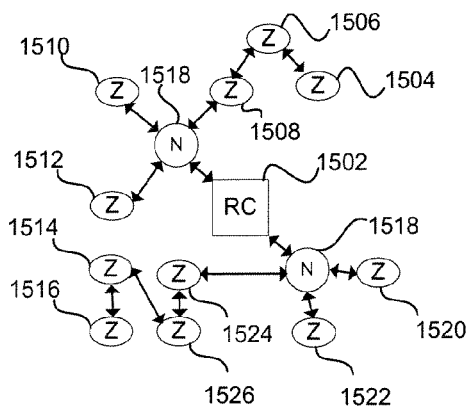
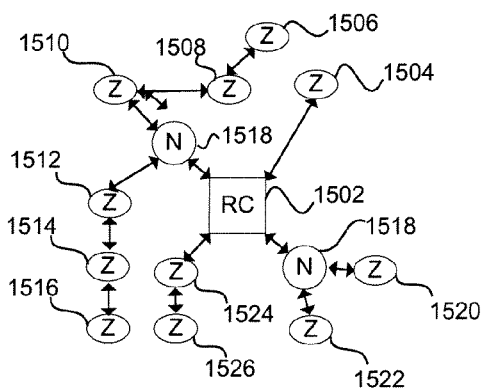
15E

1600

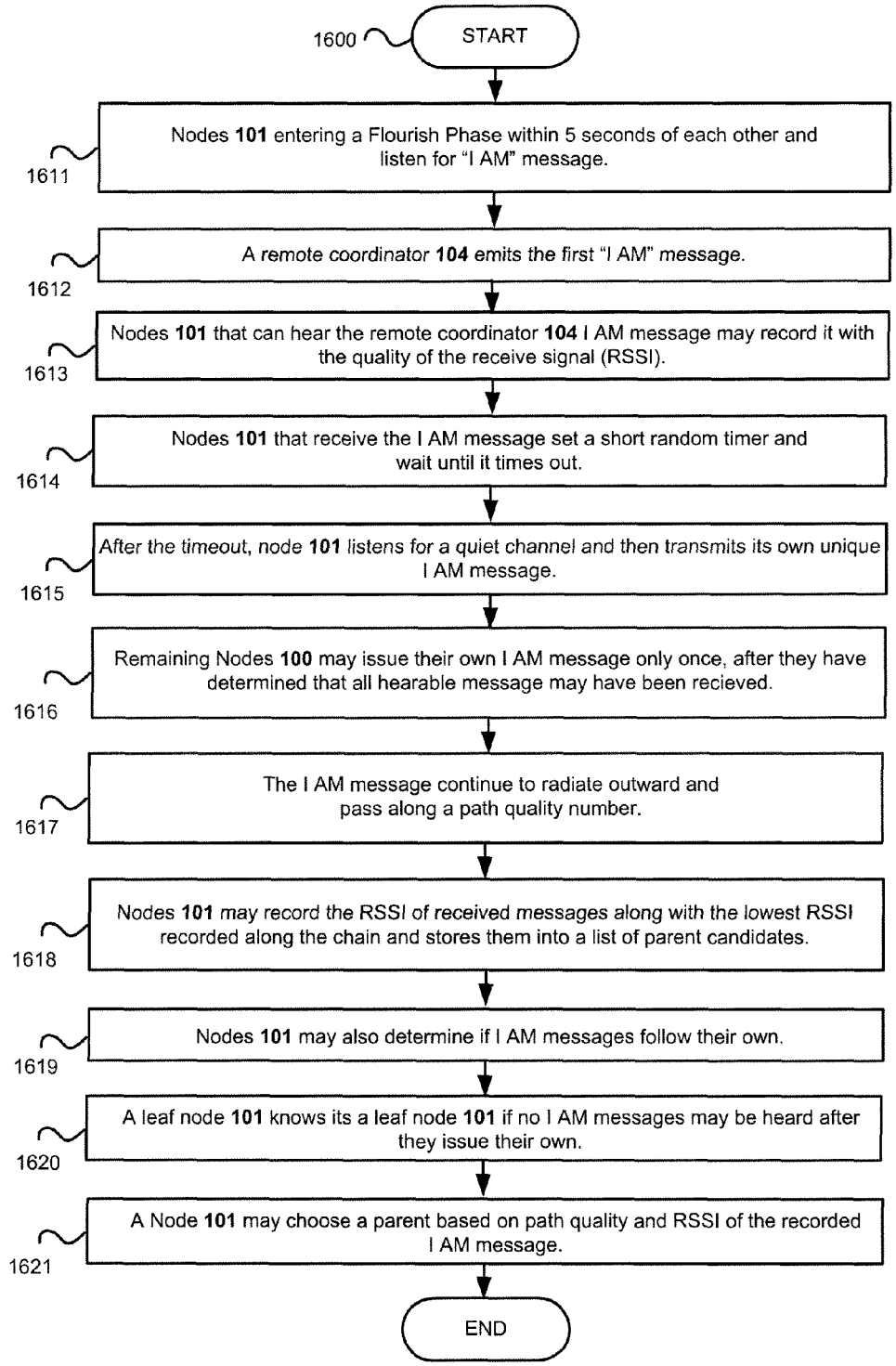

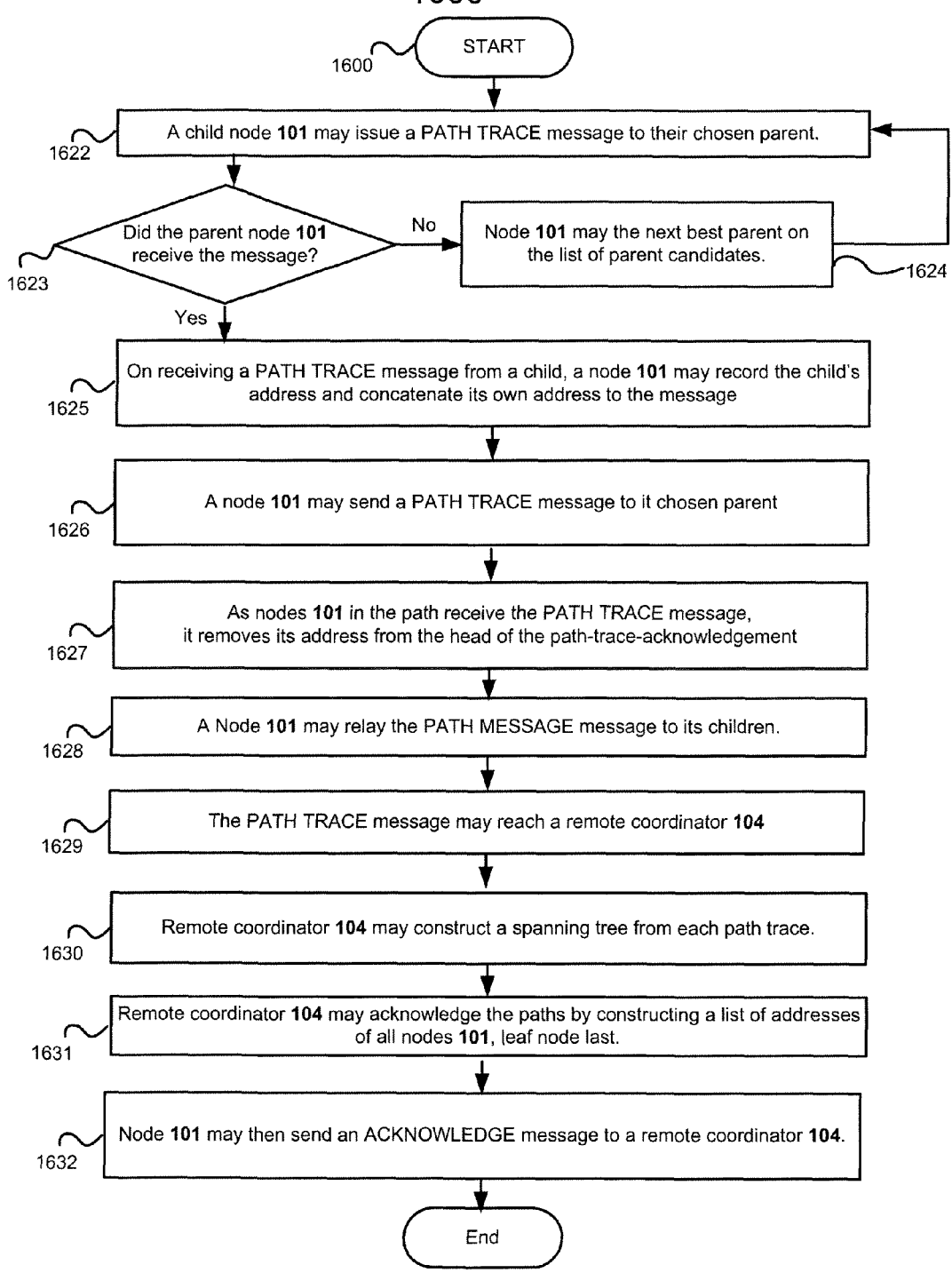

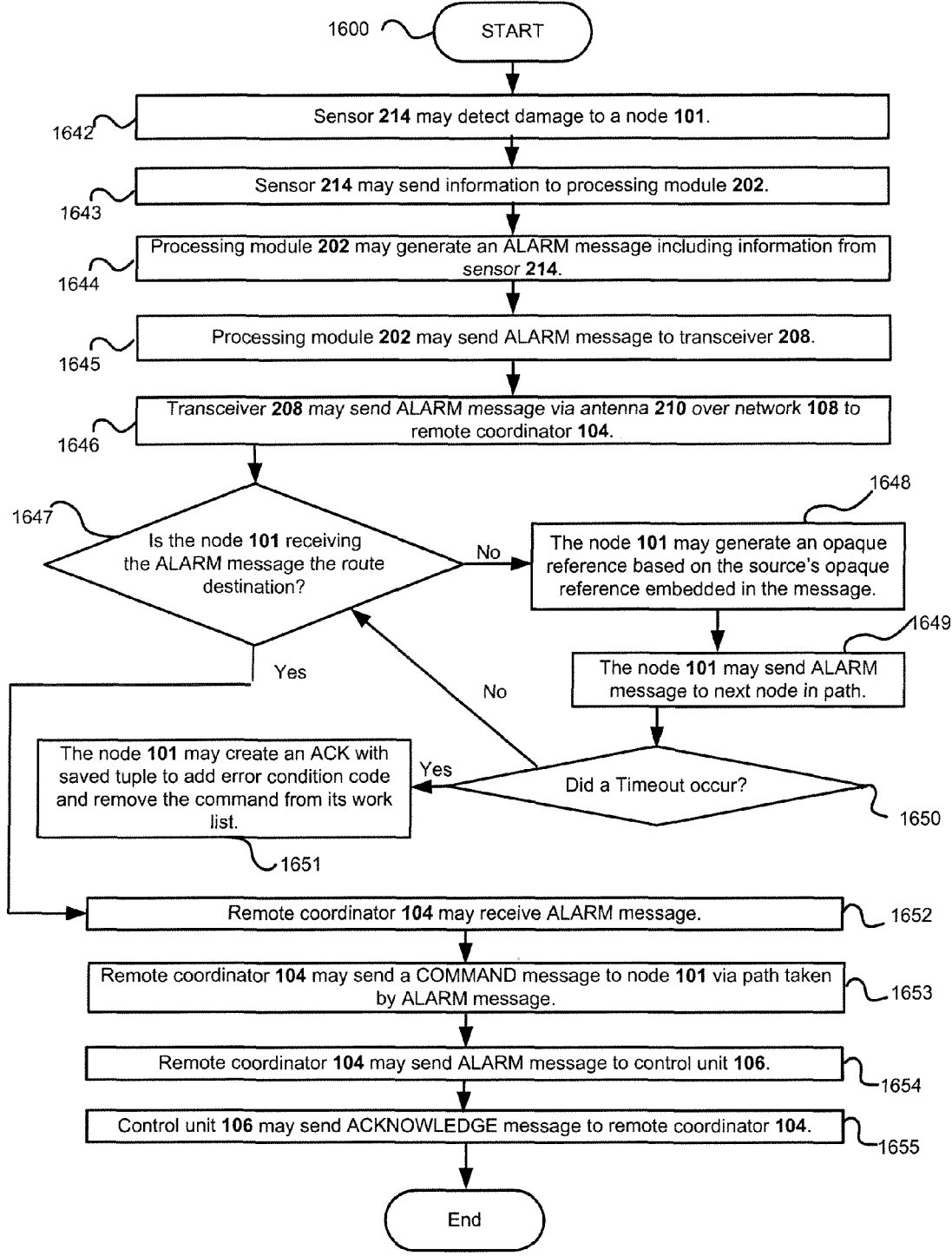

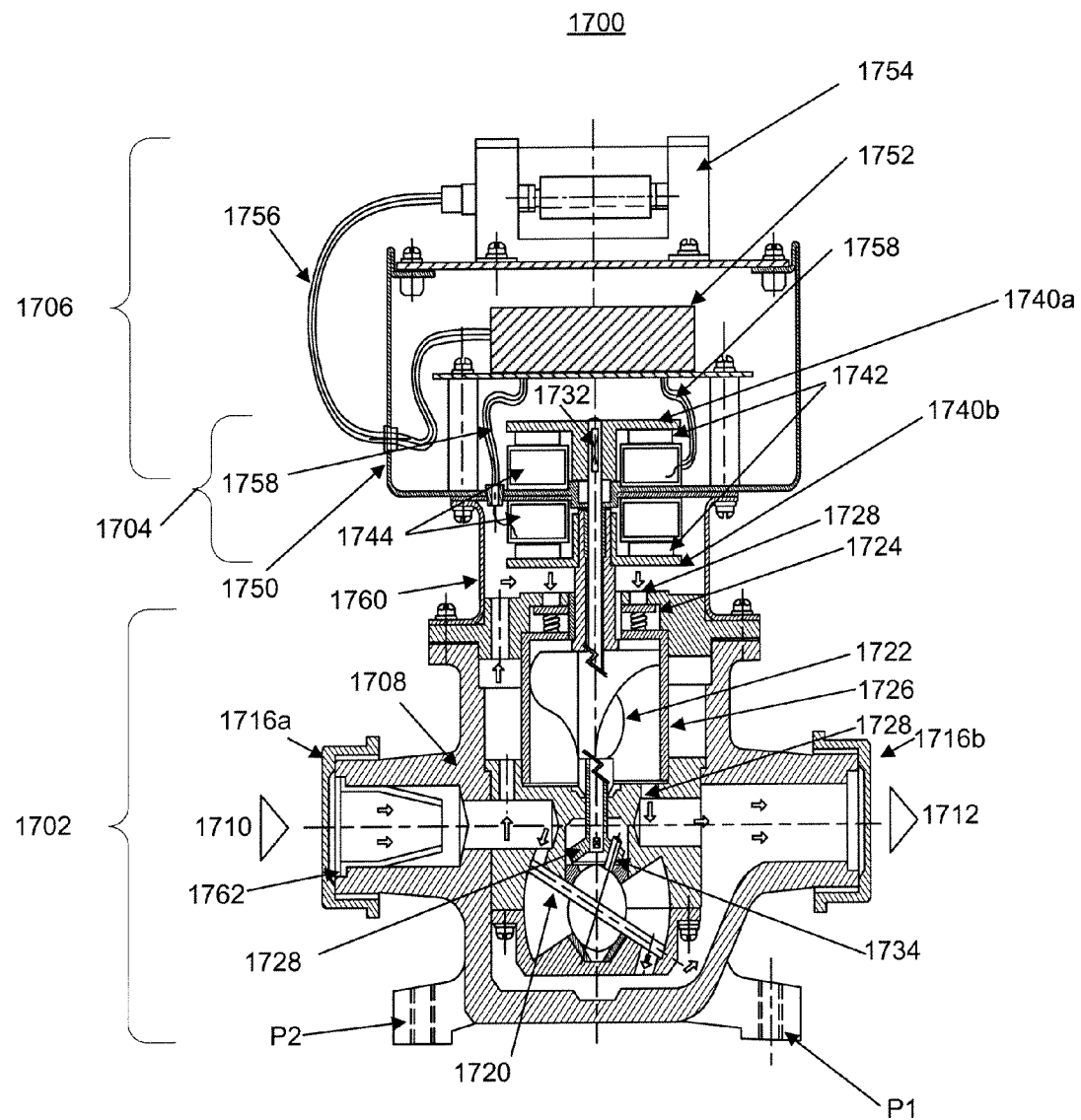

FIGURE 18
Figure 18a
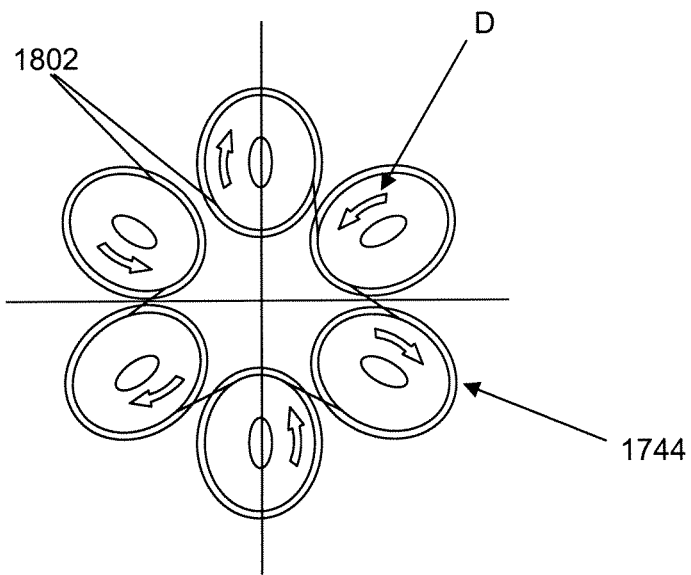
Figure 18b
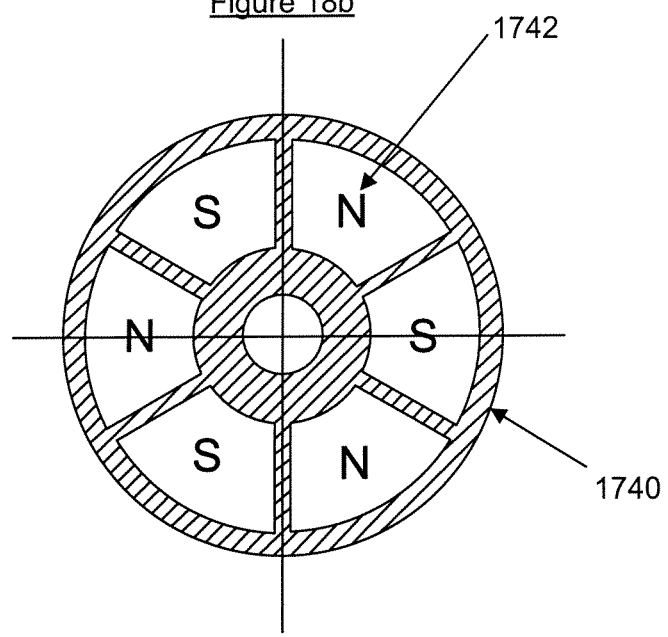

FIGURE 19
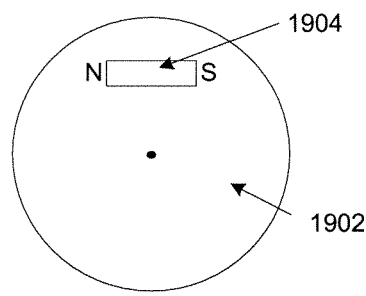
FIG. 19A
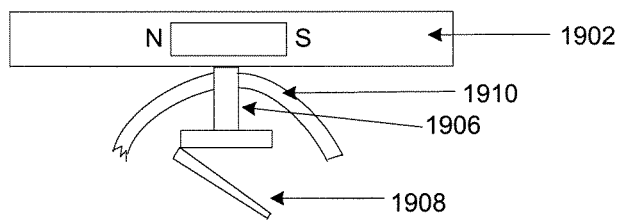
FIG. 19B
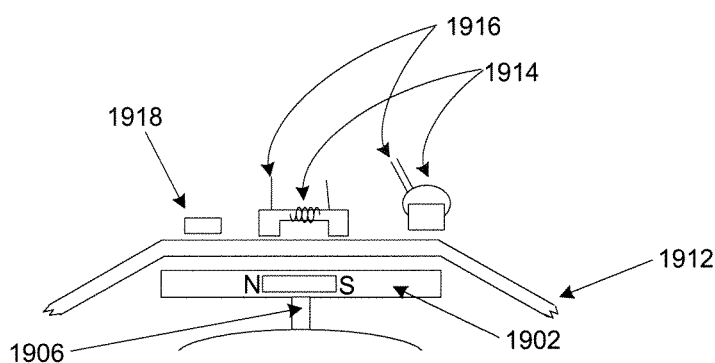
FIG. 19C
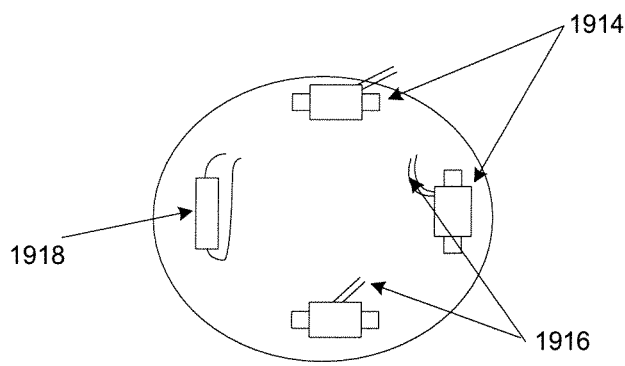
FIG. 19D

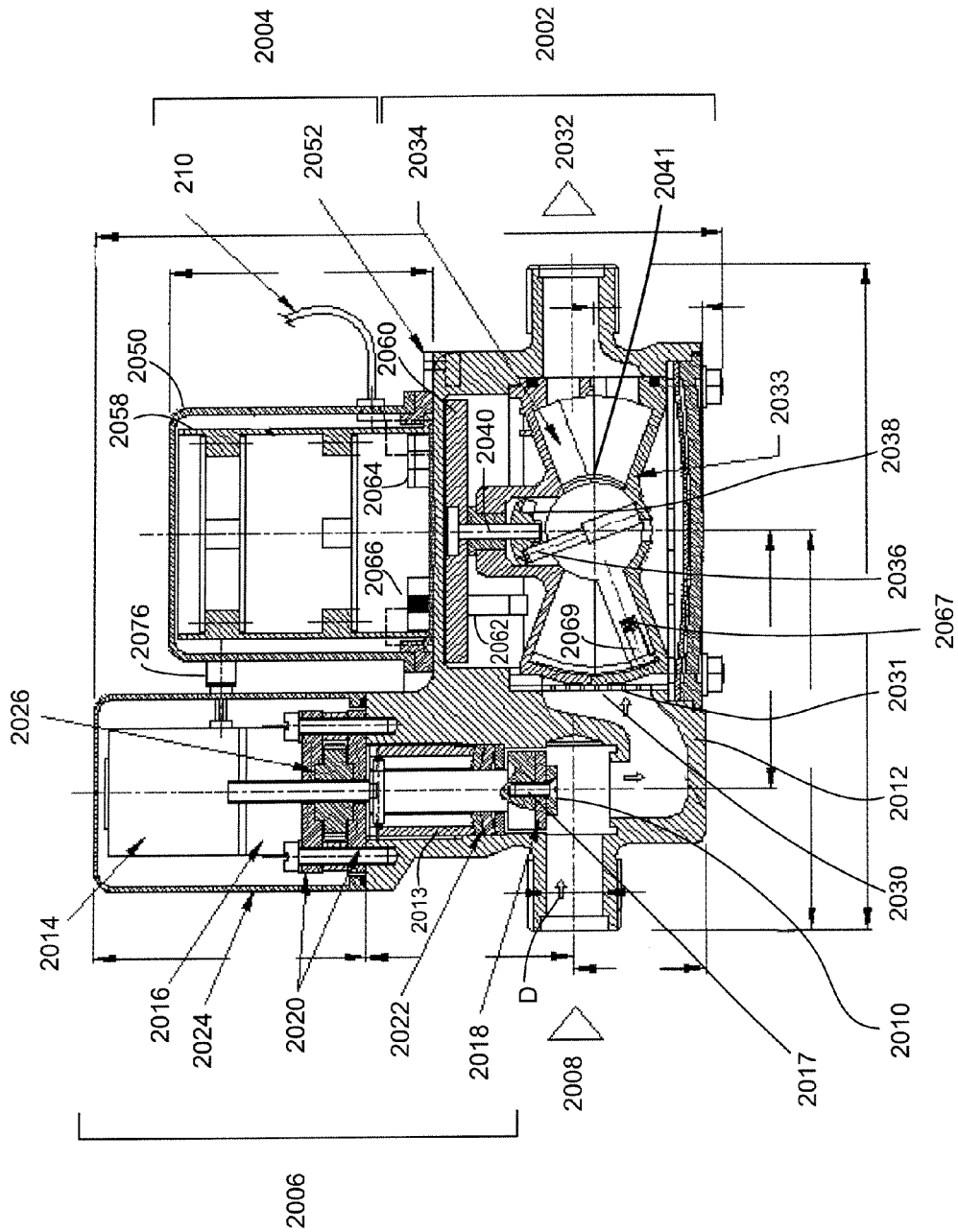

2100

2100

2200

2200

REMOTE MONITORING AND CONTROL SYSTEM COMPRISING MESH AND TIME SYNCHRONIZATION TECHNOLOGY

CROSS-REFERENCE TO RELATED APPLICATIONS

This application is the U.S. National Stage application of international patent application claims the benefit of U.S. Provisional Patent Application No. 61/054,779, filed May 20, 2008 and U.S. Provisional Patent Application No. 61/108,312, filed Oct. 24, 2008, the disclosures of both of which are herein incorporated by reference in their entirety.

FIELD OF THE INVENTION

The present invention relates to a system and method for remote monitoring and control, and more specifically, to remote utility meter reading and control of water, electricity, and gas meters using synchronized wireless communications technology, remote connection and disconnection, and an energy-harvesting device.

BACKGROUND OF THE INVENTION

Utilities that distribute commodities, such as gas, water, or electricity over a commodity distribution network face a perpetual challenge with meter reading, disconnection from, and reconnection to the grid. These three processes consume an average work effort of 90% for a utility's field services department, especially when it comes to residential and commercial accounts which contribute to a lower revenue base and higher maintenance cost.

In order to efficiently bill and collect, utility meters (e.g., water, electricity, gas) need to be read, disconnected, reconnected, maintained, and repaired in an accurate and expedient manner. However, utilities face perpetual challenges with these processes. First, a utility company may deploy field agents to manually perform these processes where these utility meters are located, consuming a great amount of resources. Second, not only is this highly inefficient, some field agents, without proper supervision, may be prone to corrupt practices (e.g., taking bribes for recording inaccurate readings). Third, because utility meters are located in remote locations, they are highly susceptible to tampering and pilfering. This may lead to inaccurate readings, uncompensated utility services, lack of notice of problems to the utility company, other losses and setbacks. Further, it is often difficult for the service person to access the meter for reading, inspection, and maintenance. Therefore, manual meter reading is a highly labor intensive, inefficient, and expensive endeavor.

When access to a meter is not possible, billings are made on the basis of estimated readings. These estimated billings often lead to customer complaints. When meter reading periods are stretched apart by longer periods and the reassessment of actual versus estimated usage involve corrections to the period end bill. Although reducing efforts on the meter reading end, the billing process is made complex, and this complexity may not reduce the possibility of inaccurate billing until the reassessment corrections occur. These and other drawbacks exist with current systems.

The present disclosure provides a system that may be retrofit into existing meter systems (e.g., grid) or installed in new systems that enables cost effective measurement of commodity usage by a consumer. Also described are methods, systems, and meters capable of providing remote networked meter reading and control.

BRIEF SUMMARY OF THE INVENTION

A monitoring and control system encompassing sensitive power budgeting and embedded wireless technology including but not limited to GSM, GPRS, MESH, SMS, WiFi, and Zigbee for remote monitoring and control of utility grids, commodity distribution networks, industrial equipment, and infrastructure using synchronized wireless communications technology, remote connection and disconnection, and an energy-harvesting device.

In one embodiment of the invention, the system described herein may be used to remotely control multiple utility grids and commodity distribution systems including but not limited to electricity, water and gas grids and distribution systems; industrial application and infrastructure including but not limited to manufacturing and pharmaceutical plants. In another embodiment of the invention, the system uses a synchronized wireless network with Radiant Configuration Protocol (RCP) and a single application system. In a further embodiment of the invention, the Radiant Configuration Protocol (RCP) comprises a light weighted network configuration that utilizes optimization of power usage and minimizing of power budgeting.

In one embodiment of the invention, a valve may open or close a gas or water line using less than about 600 milliCoulombs per activation of the valve with coil inductance of a less than about 100 m H, a switch close time of about 200 milliseconds, a battery voltage of less than about 8.7 VDC, or any combination thereof.

In one embodiment of the invention, the energy harvesting device may be installed on the yolk of a water distribution system. In another embodiment of the invention, the energy harvesting device may be integrated with a water meter's nutating disc or water meter's piston. In a further embodiment of the invention, the energy harvesting device may generate at least about 15 milliCoulombs of charge per second (15 milliAmpere) or about 0.898 Coulombs of charge per gallon. In one embodiment of the invention, a system comprising a valve configured to open or close in response to a message, the valve being coupled to the inflow port of a meter and an energy harvesting device comprising a rotor that rotates with flow of a commodity and generates electricity through electromagnets attached to a shaft coupled to the outflow of the meter, wherein the valve, meter, and energy harvesting device are electrically coupled to a processing module configured to send and receive messages to open or close the valve or send a message comprising commodity usage information from the meter and said processing module electrically coupled electrically coupled to a synchronization element, wherein the processing module may be communicatively coupled to a wireless transceiver.

In another embodiment of the invention, the system further comprise housing that protects the system from damage. In a further embodiment of the invention, the housing protects a system against damage due to an attack selected from the group consisting of nuclear, chemical, terrorist, and biological attacks. In a further embodiment of the invention, the housing protects the system against damage by an effect selected from the group consisting of vandalism, weather, water, wind, pilfering, and theft.

In one embodiment of the invention, the meter is a water meter. In a further embodiment, the water meter is a multi-jet meter, single-jet meter, positive displacement meter, vertical turbine meter, horizontal turbine meter, compound meter, fire meter, fire hydrant meter, or a magnetic flow meter.

In one embodiment of the invention, the meter may be a gas meter. In another embodiment of the invention, the gas meter is a diaphragm meter, rotary meter, turbine meter, orifice meter, ultrasonic flow meter, or Coriolmay meter.

In one embodiment of the invention, the valve, meter, and energy harvesting device are in fluid communication with each other. In another embodiment of the invention, the valve, meter, and energy harvesting device are in fluid communication with each other in that order.

In another embodiment of the invention, the energy harvesting device provides power to the valve, meter, processing module, transceiver, and combinations thereof. In a further embodiment, the energy harvesting device further comprises a rectifier operatively coupled to an output of the energy harvesting device and adapted to convert the energy from an alternating current (AC) to a direct current (DC). In a further embodiment, the energy harvesting device further comprising at least one power supply adapted to be charged by an output of the rectifier. In a further embodiment, the energy harvesting device further comprising a first power supply adapted to be charged by an output of the rectifier and a second power supply adapted to be charged by an output of the first power supply. In a further embodiment, the energy harvesting device further comprising a power supply interface configured to monitor voltages levels of the first power supply and second power supply and cause a transfer of energy from the first power supply to the second power supply in the event that the voltage level of the first storage device is above a first threshold and the voltage level of the second storage device is below a second threshold. In a further embodiment, the energy harvesting device further comprising a power supply interface operatively coupled to the first power supply and adapted to maintain voltage levels within a specified range. In a further embodiment, the rotator is selected from the group consisting of a turbine, impeller, oscillating disk, blade and shaft assembly, and a nutating disk assembly. In a further embodiment, the energy harvesting device further comprising a drive shaft operatively coupled to the rotating device at a first end and to the drive magnet at a second end.

In one embodiment of the invention, the energy harvesting device further comprises: a pair of rotors operatively coupled to the registration magnet and adapted to rotate in response to the registration magnet rotating, wherein each rotor comprises at least one magnetic pole; and a series of coils interposed between the pair of rotors, wherein the rotation of the pair of rotors with respect to the at least one coil produces an alternating current (AC) in the at least one coil. In another embodiment, the energy harvesting device further comprises a registration magnet shaft operatively coupled to the registration magnet at a first end and to the rotors at a second end. In another embodiment, the energy harvesting device further comprises a registration magnet magnetically coupled to a drive magnet. In another embodiment, the registration magnet and drive magnet are operatively coupled by one of a drive shaft and a gear assembly.

In one embodiment of the invention, the processing module of a system is a microcontroller. In another embodiment, the processing module comprising program logic to prevent a water flow to a customer associated with the water meter in response to a message received from a remote coordinator. In another embodiment, the processing module comprises an embedded microprocessor executing program logic for recording information from a sensor and a water flow counting and for periodically transmitting may report information to a remote coordinator. In another embodiment, the synchronization element is configured to keep time and optionally synchronizes the system with a another system. In another embodiment, the synchronization element is a clock. In another embodiment, the clock is selected from the group consisting of an atomic clock, a rubidium temperature crystal oscillator, controlled temperature crystal oscillator, and clever time crystal oscillator (CTXO). In another embodiment, the clock is synchronized with at least one other system.

In one embodiment of the invention, the system further comprises an antenna communicatively coupled to the transceiver. In another embodiment, the antenna is an RF antenna. In another embodiment, the RF antenna is a 802.15.4 antenna. In another embodiment, the antenna is physically coupled to a conductive meter pit cover. In another embodiment, the transceiver is an RF transceiver. In another embodiment, the RF transceiver is a 802.15.4 transceiver. In another embodiment, the wireless transceiver uses a wireless technology selected from the group consisting of global system for mobile communications (GSM), code division multiple access (CDMA), MESH, SMS, GPRS, and ZIGBEE technology. In another embodiment, the wireless technology is MESH. In further embodiment, the messages sent are encrypted. In further embodiment, the encryption is encryption is selected from the group consisting of symmetric, secret-key encryption, asymmetric, public-key encryption, and Data Encryption Standard (DES).

In one embodiment of the invention, the system further may comprise a power supply coupled to the system and may provide power to the valve, meter, processing module, or transceiver. In another embodiment, the power supply is a rechargeable battery. In another embodiment, the power supply may comprise at least one NiMH battery. In another embodiment, wherein the energy harvesting device provides power to the power supply.

In one embodiment of the invention, the system further comprises a sensor coupled to the processing module configured to detect damage to the system. In another embodiment, wherein the sensor upon detecting damage to the system sends information to the processing module which generates a message and sends it to the transceiver to send the message via a network to a to remote coordinator in response to the sensor detecting damage to the system. In another embodiment, the sensor is selected from the group consisting of an optical sensor, imaging sensor, acoustic sensor, motion detector, water quality sensor, leak detector, temperature sensor, water pressure sensor, a water composition sensor, gas flow sensor, smoke detector, and carbon monoxide detector. In another embodiment, the sensor is a flow sensor is adapted to detect reverse water flow and to cause the shut off valve to trigger when reverse water flow exceeds a predetermined volume. In another embodiment, the sensor comprises a plurality of Hall effect switches for detecting a water flow through the meter and a counter device for quantifying the water flow into a flow rate.

In one embodiment of the invention, a system comprises a switch configured to open or close in response to a message said switch coupled to the input of an electricity meter wherein the switch and electricity meter are coupled to a processing module configured to send and receive messages to open or close the switch or send a message comprising commodity usage information from the meter and said processing module electrically coupled to a synchronization element and communicatively coupled to a wireless transceiver. In another embodiment, the electricity meter is an electromechanical meter, solid state meter, or variable rate meter. In another embodiment, the switch is a latching relay, Reed relay, mercury-wetted relay, machine tool relay, contactor relay, solid-state relay, solid-state contactor relay, Buchholz relay, forced-guided contacts relay, or overload protection relay In one embodiment of the invention, a system comprises equipment coupled to an actuator configured to control the equipment in response to a message said actuator coupled to a processing module configured to send and receive messages to control the equipment via the actuator communicatively coupled to a wireless transceiver. In another embodiment, the actuator is a programmable logic controller. In another embodiment, the processing module is a microcontroller.

In one embodiment of the invention, a system comprises a remote coordinator electrically coupled to a synchronization element and communicatively coupled to a wireless transceiver configured to send messages to a system comprising a valve configured to open or close in response to a message, the valve being coupled to the inflow of a meter and an energy harvesting device comprising a rotor that rotates with the flow of a commodity and generates electricity through electromagnets attached to a shaft responsive to the outflow of the meter wherein the valve, meter, and energy harvesting device are electrically coupled to a processing module configured to send and receive messages to open or close the valve or send a message comprising commodity usage information from the meter and a synchronization element, wherein the processing module is communicatively coupled to a wireless transceiver. In another embodiment, the system may comprise a plurality of meters. In another embodiment, the remote coordinator is coupled to a data storage device to store the commodity usage information received from the meters. In another embodiment, the remote coordinator is coupled to a wireless transceiver configured to send messages received from the meter to a control unit. In another embodiment, the system is configured to detect damage to the system coupled to program logic configured to send a message to the meter to close the valve in response to detecting damage to the system.

In one embodiment of the invention, a system comprises a control unit electrically coupled to a synchronization element and communicatively coupled to a wireless transceiver configured to send messages to a remote coordinator electrically coupled to a synchronization element and communicatively coupled to a wireless transceiver configured to send messages to a system a valve configured to open or close in response to a message, the valve is coupled to the inflow of a meter and an energy harvesting device comprising a rotor that rotates with the flow of a commodity and generates electricity through electromagnets attached to a shaft coupled to the outflow of the meter, wherein the valve, meter, and energy harvesting device are electrically coupled to a processing module configured to send and receive messages to open or close the valve or send a message comprising commodity usage information from the meter and synchronization element wherein the processing module is communicatively coupled to a wireless transceiver. In another embodiment of the invention, the system comprises a plurality of the meters. In another embodiment of the invention, the system comprises a plurality of the remote coordinators. In another embodiment of the invention, the system further comprises middleware coupled to a customer information system to process commodity usage. In another embodiment of the invention, the system further comprises a user interface coupled to the control unit. In another embodiment, the control unit is a fixed location. In another embodiment, the fixed location is a utility headquarters, control panel, utility control box, or control room. In another embodiment, the control unit is mobile. In another embodiment, the mobile control unit is a van, truck, car, hand-held device, laptop, or PDA. In another embodiment, the commodity usage information is the status of the meter, consumption data, or the flow rate of a commodity. In another embodiment, the control unit, remote coordinator, and meter are networked using global system for mobile communications (GSM), code division multiple access (CDMA), MESH, SMS, GPRS, or ZIGBEE technology.

In another embodiment of the invention, the system's network further comprises of the Radiant Configuration Protocol (RCP) which configures a set of nodes in an arbitrary mesh into an ordered set of trees, each joined at the center root, known as the remote coordinator. In another embodiment, the objective of the RCP is for the remote coordinator to determine a path to each node on the network and communicate over that path to obtain each node's data. In another embodiment, the network is built from scratch each time, and is therefore "ephemeral". In another embodiment, RCP is a constrained mesh networking protocol which reduces an arbitrary mesh of nodes into sub-trees of nodes and tears them down again after applications messages have completed. In another embodiment, the mesh of nodes may not be fully connected nor are they randomly connected.

BRIEF DESCRIPTION OF THE DRAWINGS

FIG. 15A depicts an illustrative an exemplary network during a Flourish Phase when the remote coordinator, relay nodes, and nodes may be active, according to various embodiments of the invention.

FIG. 15B shows the same exemplary network during a Dormant Phase when the remote coordinator and relay nodes are Dormant and the nodes are in sleep node, according to various embodiments of the invention.

FIG. 15C is a second Flourish Phase when the remote coordinator, relay nodes, and nodes may be active, but the path the message travel may have changed, according to various embodiments of the invention.

FIG. 15D shows the same exemplary network during a Dormant Phase when the remote coordinator and relay nodes are Dormant and the nodes are in sleep node, according to various embodiments of the invention.

FIG. 15E is a second Flourish Phase when the remote coordinator, relay nodes, and nodes may be active but the path the message travel may have changed, according to various embodiments of the invention.

FIG. 16B depicts a flow chart showing an overview of a Radiant Configuration Protocol showing an example of messages sent during the beginning of a Flourish Phase, according to various embodiments of the invention.

FIG. 16C depicts flow charts showing an overview of a Radiation Configuration Protocol showing an example of a message sent from a leaf node and traveling towards a remote coordinator along a network, according to various embodiments of the invention.

FIG. 16E depicts a flow chart showing an example of an ALARM message generated by a node and sent via a network using a Radiation Configuration Protocol to reach a remote coordinator, according to various embodiments of the invention.

FIG. 17 depicts a cross section view of a water meter including an energy harvesting device, according to various embodiments of the invention.

FIGS. 18A and 18B depict top views of the electrical generation components of the water meter of FIG. 17, according to various embodiments of the invention.

FIGS. 19A, 19B, 19C, and 19D depict an energy harvesting system for a meter, according to various embodiments of the invention.

FIG. 20A depicts a cross section view of a nutating disk type positive displacement water meter including an energy harvesting device and shut-off/turn-on valve configured to open or close the flow of a commodity through a supply line, according to various embodiments of the invention.

DETAILED DESCRIPTION OF THE INVENTION

Various exemplary embodiments of the present disclosure may be directed to a system and method for providing monitoring and control. It should be appreciated that the following summary and descriptions are exemplary, and explanatory only and are not restrictive.

It should also be appreciated that while the systems and methods discussed have been developed for utility services such as electricity, water, and gas, other various applications may also be provided. In one embodiment, the systems described herein may be used to monitor and remote control multiple utility grids and commodity distribution systems such as electricity, water, or gas grids and distribution systems; industrial application and infrastructure including but not limited to manufacturing and pharmaceutical plants using a synchronized wireless network with Radiant Configuration Protocol (RCP) and a single application system. It should be appreciated that the Radiant Configuration Protocol (RCP) may allow for light weighted network configuration including but not limited to a self-sustained remote controlled and monitored water system utilizing optimum power usage and minimized power budgeting.

In an alternate embodiment, the systems and methods described herein may be applied to television, cable service, Internet service, pollution monitoring, emissions monitoring, industrial infrastructure, and commodity supply networks.

Referring now to the Figures, the system and method of the present invention including various components and units, and various exemplary and preferred embodiments thereof, may be described.

Network

Figure 1:
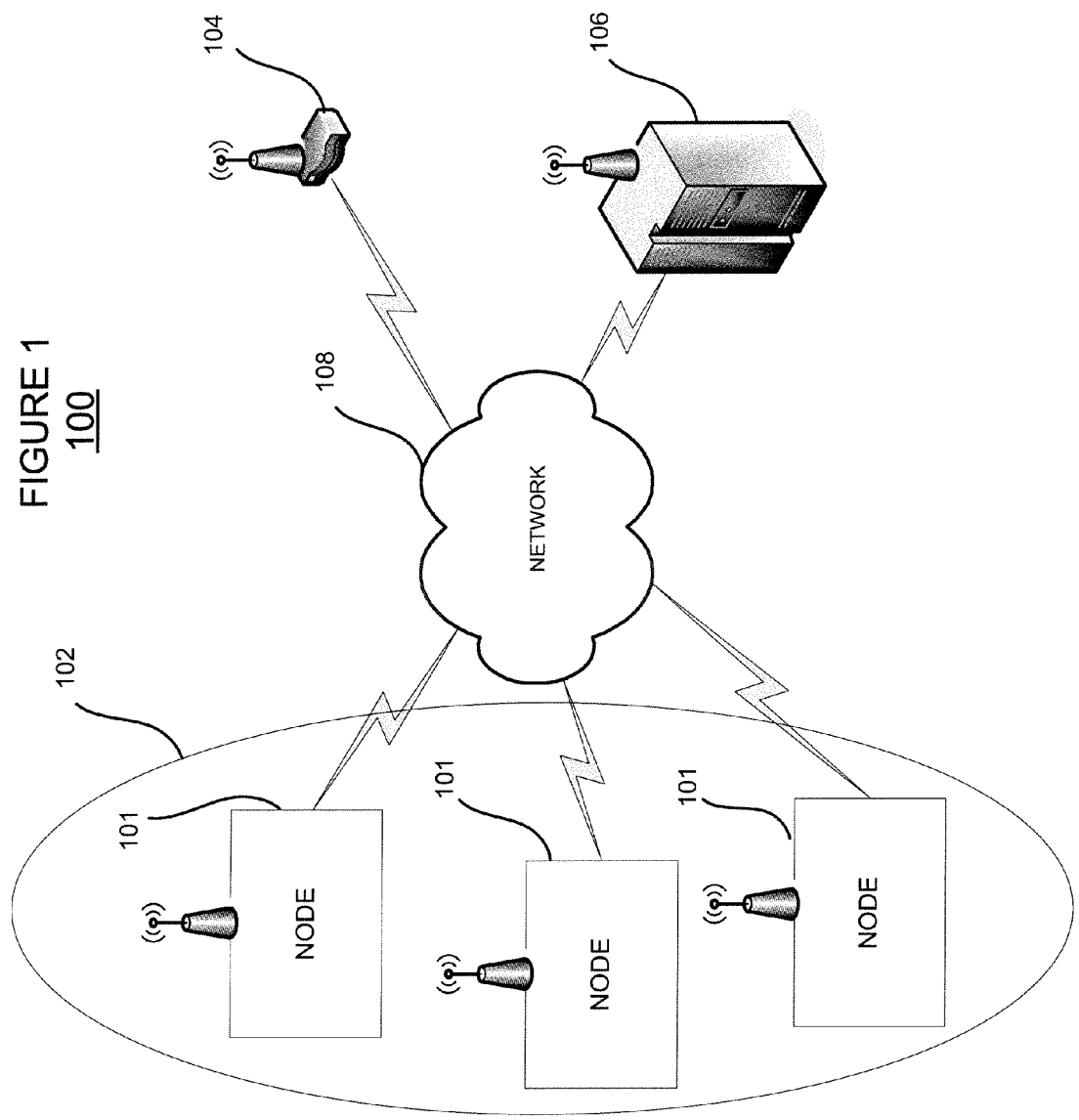
FIG. 1 depicts a generalized scheme for a landscape using GSM, SMS, GPRS, ZIGBEE, or MESH network to integrate a control unit with a remote coordinator, and nodes 101 organized into clusters, according to various embodiments of the invention.
Figure 3:
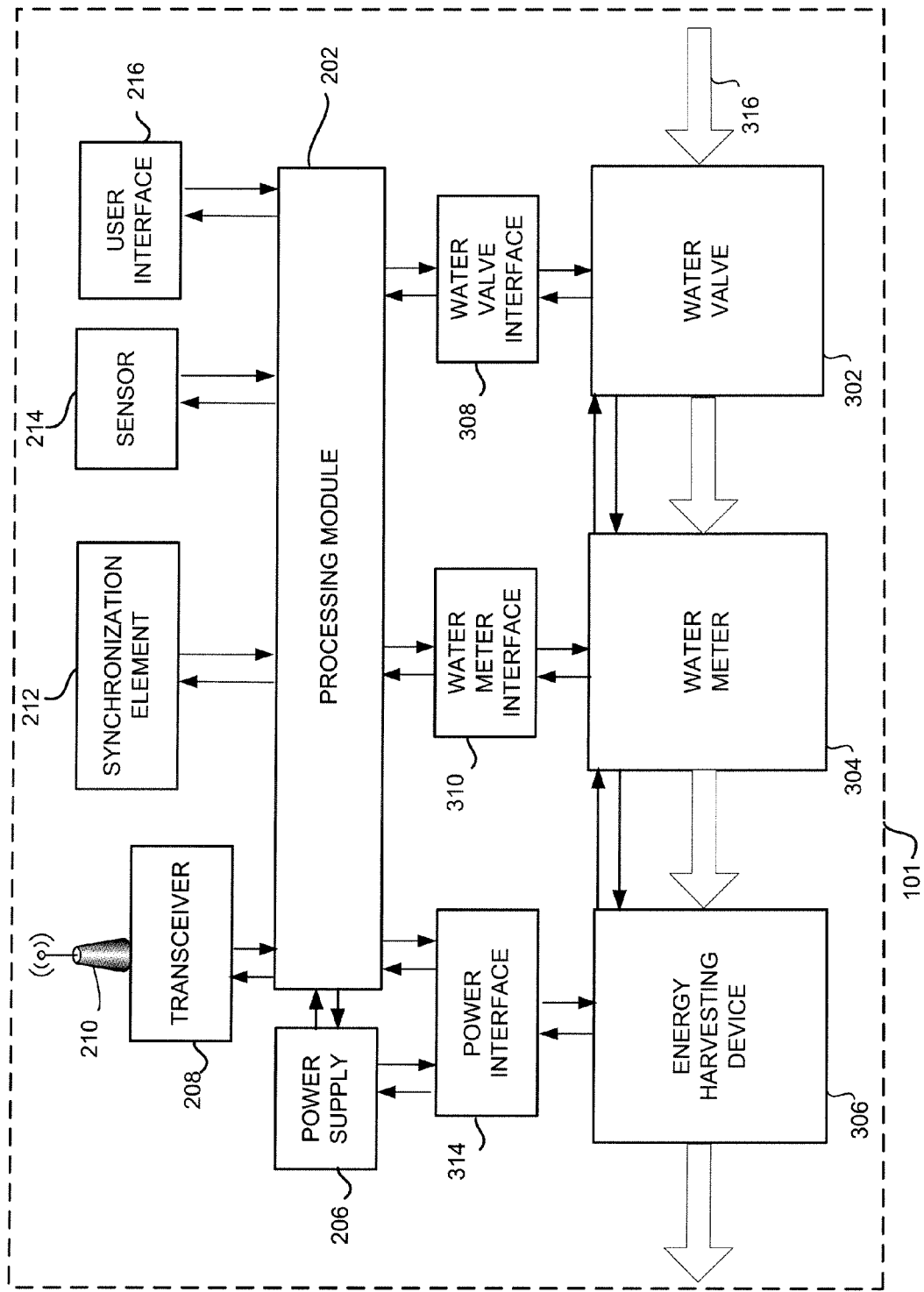
FIG. 3 depicts an illustrative diagram for a water meter node configuration, according to various embodiments of the invention.
Figure 4:
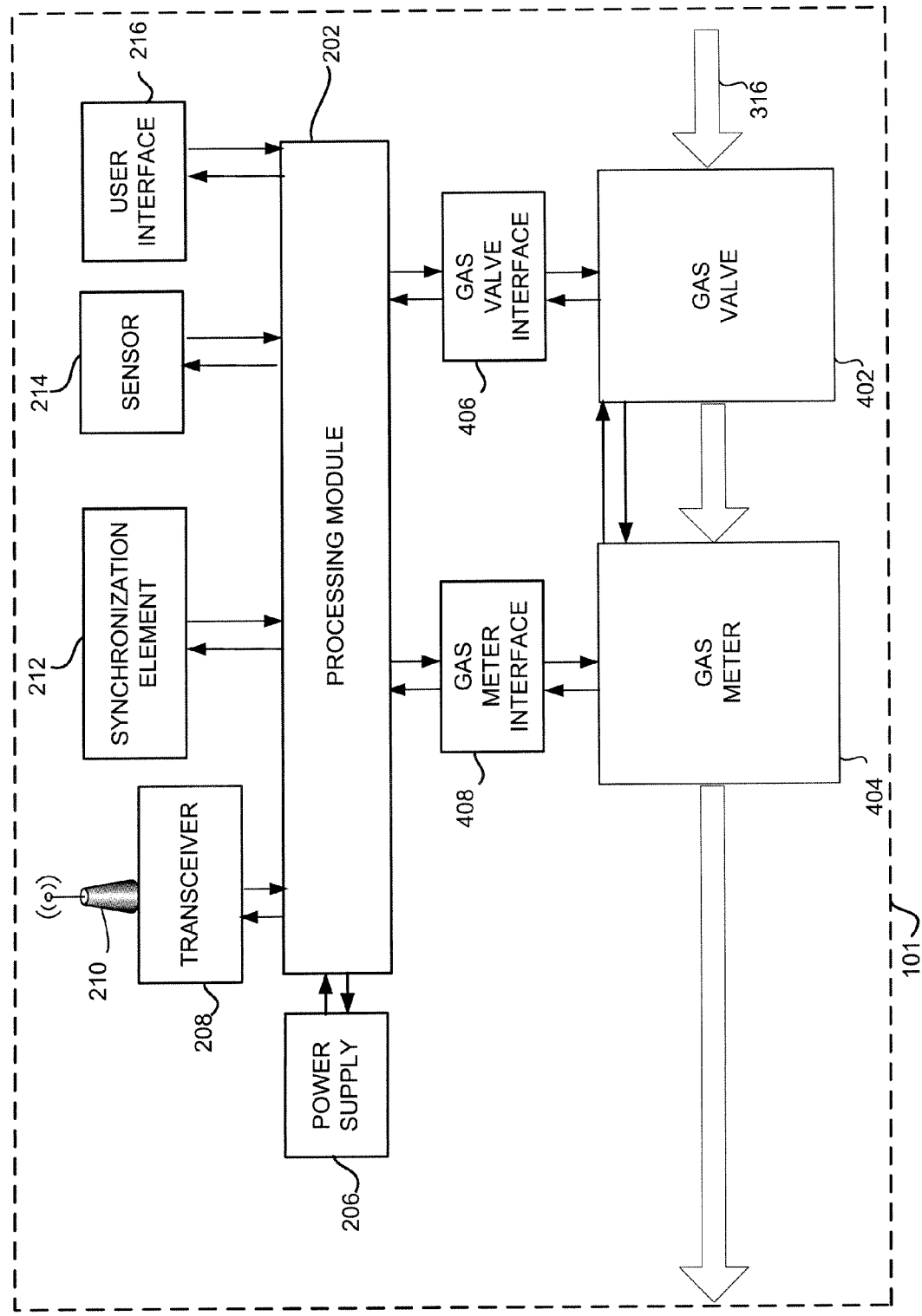
FIG. 4 depicts an illustrative diagram for a gas meter node configuration, where a valve configured to open or close a commodity supply line in response to a message from a processing module may be coupled to the intake on a gas meter, according to various embodiments of the invention.
Figure 5:
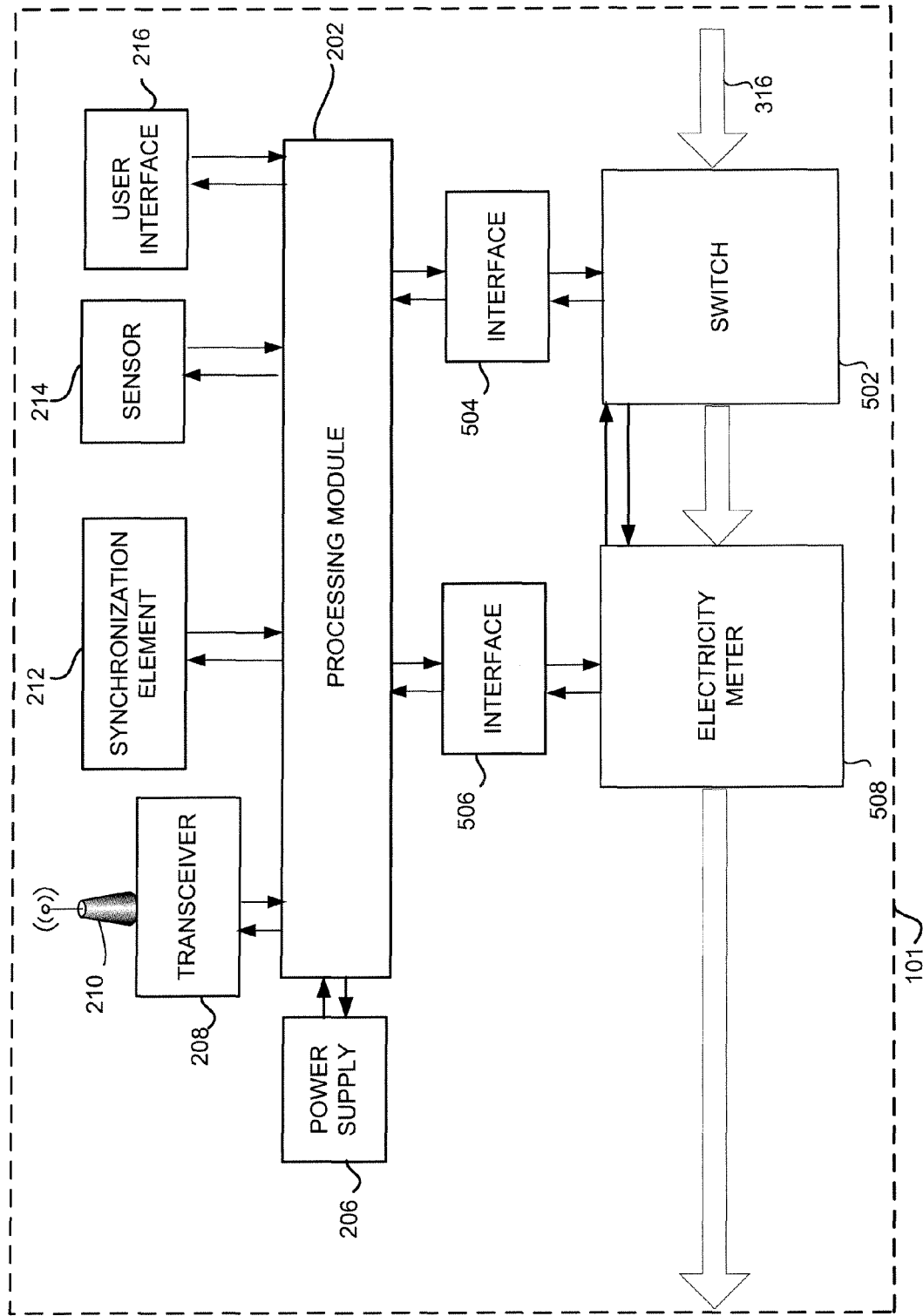
FIG. 5 depicts an illustrative diagram for an electricity meter node configuration, where a switch configured to open or close an electricity supply line in response to a message from a processing module may be coupled to the input of an electricity meter, according to various embodiments of the invention.
Figure 6:
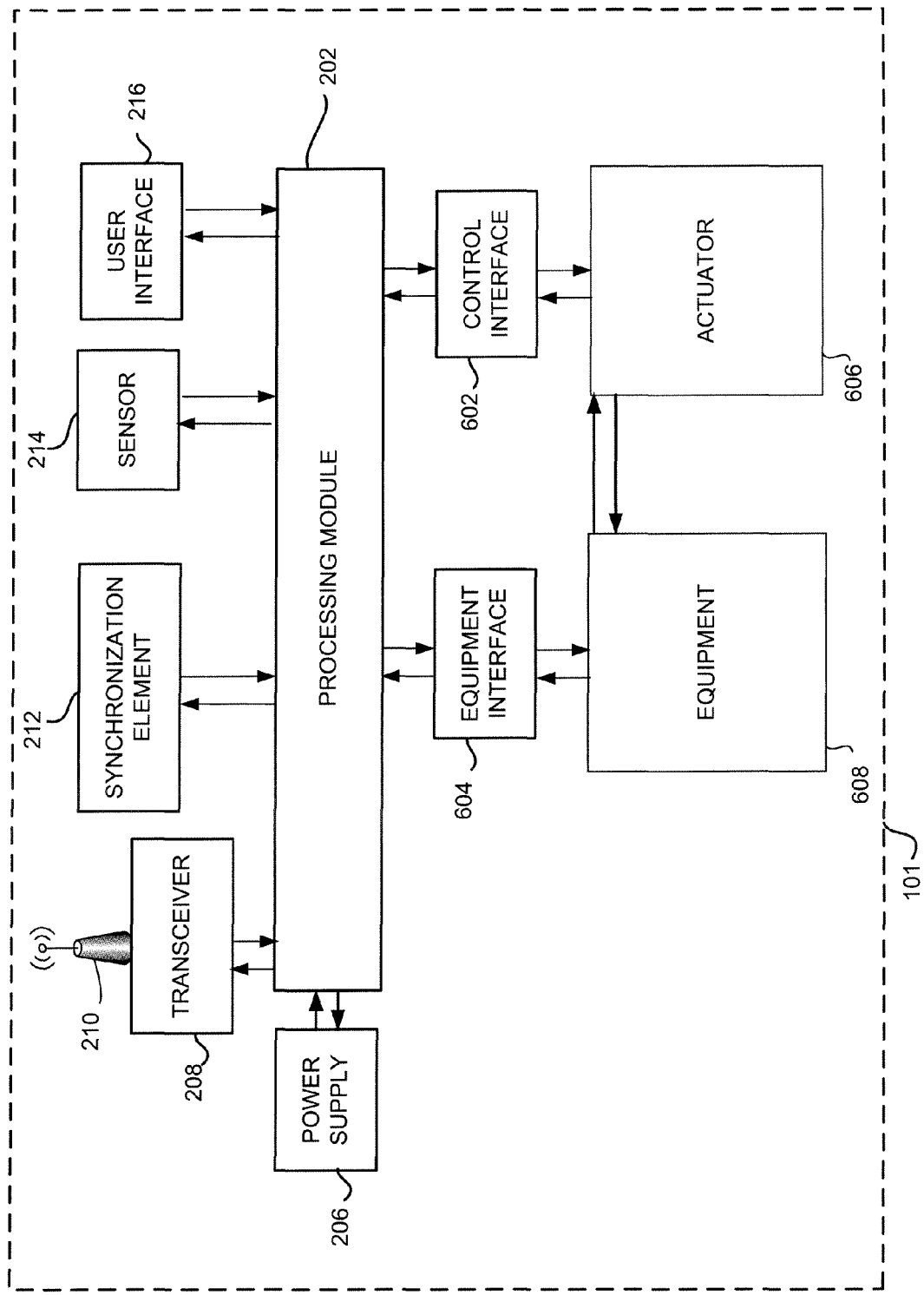
FIG. 6 depicts an illustrative diagram for an equipment node configuration, where the equipment may be coupled to an actuator that controls the equipment in response to a message from a processing module, according to various embodiments of the invention.

FIG. 1 depicts a generalized scheme for a landscape using bidirectional wireless GSM, SMS, GPRS, ZIGBEE, or a MESH network 108 to integrate a control unit 106 with a remote coordinator 104, and nodes 101 organized into a cluster 102, according to various embodiments of the invention. For the purposes of this invention, a node 101 may include but is not limited to a routing node shown in FIG. 2, a water meter node as shown in FIG. 3, a gas meter node as shown in FIG. 4, an electricity meter node as shown in FIG. 5, and an equipment node as shown in FIG. 6. In addition, node 101 may be referred to as a customer premise equipment (CPE), ZuBee, Relay node, network node, relay node, routing node, remote node, leaf node, or end node. For the purposes of this invention, a remote coordinator 104 may be referred to as an RFBee, RC, Remote Setup, or RF Coordinator. For the purposes of this invention, a control unit 106 may be referred to as a centralized control unit, Headquarters, HQ, or HQBee.

Node

Figure 2:
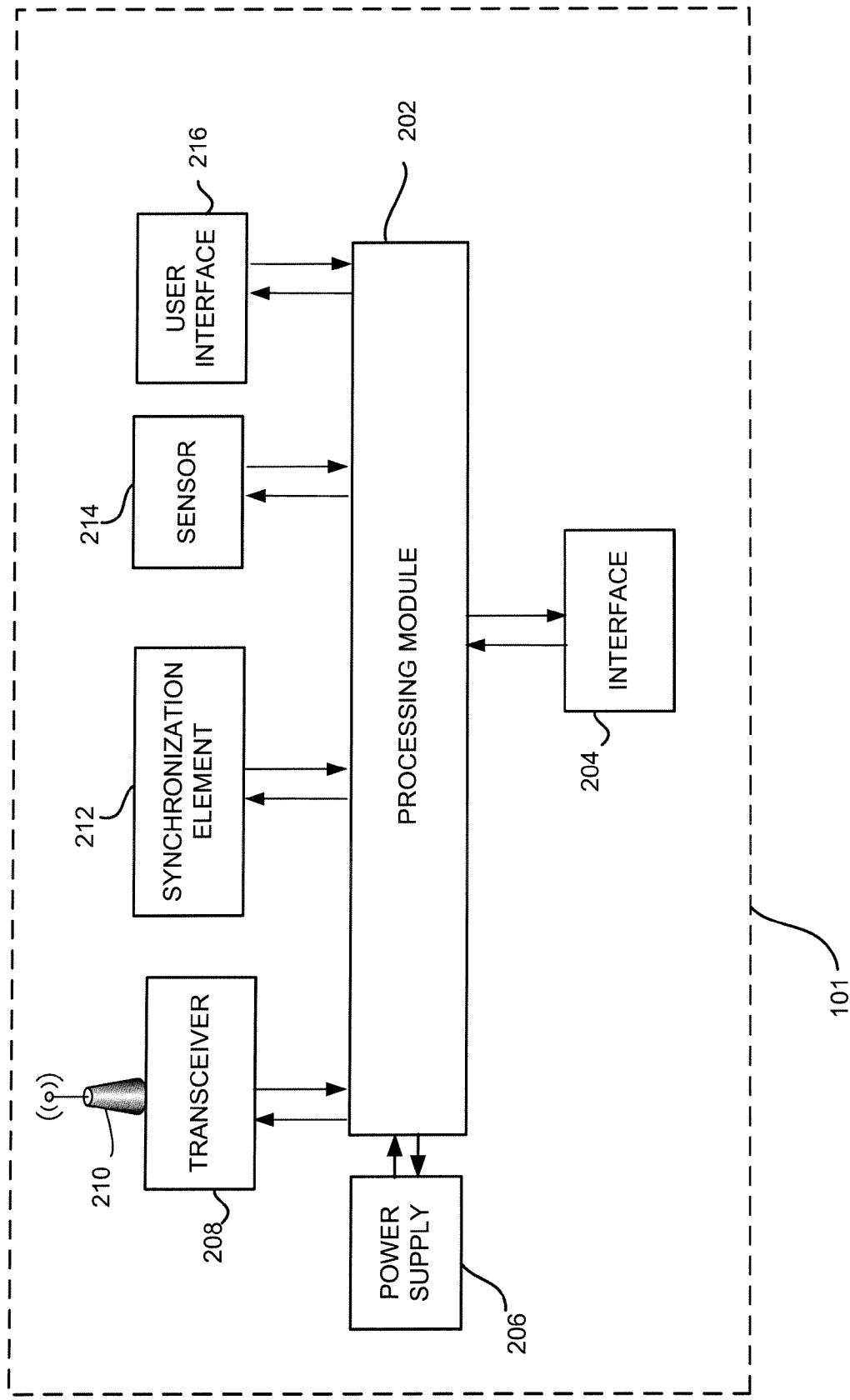
FIG. 2 depicts an illustrative diagram for a routing node configuration, according to various embodiments of the invention.

FIG. 2 depicts an illustrative diagram for a routing node configuration 101, according to various embodiments of the invention. A processing module 202 may be coupled to a power supply 206 that provides power to the processing module 202. The processing module 202 may also be coupled to a transceiver 208 which is communicatively coupled to antenna 210 configured to send and receive messages. The processing module 202 may also be coupled to a synchronization element 212 that keeps time for the processing module 202. The processing module 202 may also be coupled to a sensor 214 that may detect damage or a disruption to the system. The processing module 202 may also be coupled to a user interface 216 comprising a keyboard, display, or USB that may allow for users to interface with the processing module 202 to collect information, issue commands, and change information stored in the processing module 202. The processing module 202 may also be coupled to an interface 204 that may allow the processing module 202 to interface with other systems.

Processing Module 202

The processing module 202 may comprise a processor that communicates by a local interface with memory. An operating system and application specific software may be contained in the memory. The application specific software may include one or more of the processes described herein. The processing module 202 may comprise an integrated circuit comprising a central processing unit. The central processing unit may include but is not limited to microprocessors ranging from 4-bit processors to 32-bit or 64-bit processors. The processing module 202 may comprise serial input/output including but not limited to serial ports (UARTs) and other serial interfaces (communication bus) including but not limited to I²C, Serial Peripheral Interface and Controller Area Network for coupling to other systems; peripherals including but not limited to timers, event counters, PWM generators, and a watchdog; volatile memory (RAM) for data storage; ROM, EPROM, EEPROM, or flash memory for program and operating parameter storage. The processing module 202 may be configured as a software application executing on computer hardware, an application specific integrated circuit (ASIC), a combination of hardware and software, combinations of these, or other suitable configuration.

Further, the processing module 202 may be a microcontroller. A commercially available microcontroller suitable for use in this invention is the AVR chip from Ateml, Inc. In another embodiment, the processing module 202 is an ATEML ATMEGA MICROPROCESSOR coupled to a universal connector comprising GPIO, JTAG, RF_IO, 1WR, Vcc, IRQ, ADC/AC, UART, SPI, and I²C interfaces and where the ATEML ATMEGA MICROPROCESSOR may be communicatively coupled to a 802.15.4 RF transceiver coupled to a 802.15.4 antenna configured to send and receive messages via a wireless network. The processing module 202 may be a ATMEGA8535 8-bit AVR Microcontroller.

In another embodiment of the invention, the node configuration 101 may comprise a modem coupled to the processing module 202. The modem may be a GSM, GPRS, CDMA modem, Ethernet, Internet modem, or any other compatible system.

The processing module 202 may be coupled to a data storage device. The data storage device may allow for data generated by the system to be stored for backup or archival purposes. The data storage device may be any removable or permanently-mounted non-volatile memory technology commercially available including but not limited to flash memory (e.g., memory cards, sticks, keyfobs), hard disk (e.g., Microdrive), or other suitable memory. The storage device may store data, state information, operating parameters, or any combination thereof, of the system to prevent loss of such information if power to the system should be interrupted or the system should be disabled. The data storage device may comprise RAM memory. In one embodiment of the invention, the RAM memory may comprise 1, 2, 3, 4, 5, 6, 7, 8, 9, or 10 memory chips. In another embodiment, the RAM memory may comprise 1 to 8 256 MB RAM memory chips. The memory may be 1, 2, 3, 4, 5, 6, 7, 8, 9, or 10 Ramtron FM24C512 memory chips. In another embodiment, the memory may be 1, 2, 3, or 4 Ramtron FM24C512 memory chips. In a further embodiment, the memory may be 4 Ramtron FM24C512 memory chips. The memory chips may input or output data on the I²C buss. The memory may be 8 bits wide in 65536 locations or 512 kilobits of storage. The devices may retain the data when the chips are powered when the processor goes into sleep mode. The chips may be capable of a minimum of 10 billion write or read cycles.

It should be appreciated that the system may also include a battery backup that may be automatically activated upon loss of power. In some embodiments, the storage device may back up data in the processor upon loss of power, whereupon battery power may be provided while data may be continually backed up to the storage device. This arrangement may provide the system with the ability to continue transmitting information even after a loss of power, as well as additional time to store critical data and perform any required procedures.

The processing module 202 may generate COMMAND messages that instruct nodes 101 to disconnect a meter by closing a valve or switch, reconnect a meter by opening a valve or switch, read meter and send commodity usage information, request ACKNOWLEDGE message, check for damage, check for leaks, send damage message, check for tampering, check for pilferage of commodity supply line, or any combination thereof.

In another embodiment, the processing module 202 may be coupled to a Global Positioning System (GPS), emergency alert reception, biometric scanning, environmental monitoring capabilities, or any combination thereof. A GPS receiver may allow for the precise location of the component to be determined, stored in memory, and transmitted to a remote coordinator 104. An emergency alert receiver may allow for the reception of emergency signals from a central agency (e.g., Emergency Alert System (EAS) signals). A biometric scanner (e.g., thumbprint, retinal scanner) may permit only authorized users to access the system. One or more environmental sensors (e.g., temperature, humidity) in communication with the system may allow for the measurement of local environmental conditions, particularly in harsh or remote environments. The processing module 202 may be coupled to a supplemental power supply in addition to the power supply 206. In another embodiment, the processing module 202 may comprising an external adaptor including but not limited to an ingress adaptor.

Synchronization Element 212

The synchronization element 212 configured to keep a synchronized time with at least one second system may be integrated into a processing module 202. In one embodiment, synchronization element 212 is configured to maintain an accurate time that may allow the system to keep time within 1, 2, 3, 4, 5, 6, 7, 8, 9, or 10 microseconds of a second system. In one embodiment, synchronization element 212 is configured to maintain an accurate time that may allow the system to keep time within 1, 2, 3, 4, 5, 6, 7, 8, 9, or 10 milliseconds of a second system. In one embodiment, synchronization element 212 is configured to maintain an accurate time that may allow the system to keep time within 1, 2, 3, 4, 5, 6, 7, 8, 9, or 10 seconds of a second system. This may allow the system to be integrated into a synchronized MESH network as described herein. In another embodiment, a node 101 in a network 108 may comprise a synchronization element 212 configured to track time electrically coupled to a processing module 202.

In one embodiment, the synchronization element 212 may be a hardware oscillator. Clocks may subject to variations due to temperature and battery voltage. Further, if the variations have been compensated for, clocks exhibit deviations called drift. Clock drift is usually expressed in parts-per-million (ppm) which is a count of extra or missing oscillations the clock makes in the amount of time needed for one million oscillations. For example, a stable clock with a 1 ppm drift loses or gains a second every million seconds, or about every 11.57 days.

In one embodiment, the processing module 202 may be coupled to a synchronization element which may be a 1 ppm clock. If nodes started simultaneously, and are programmed to globally awake every 1 million seconds, individual clock drifts would accumulate so that after n wake ups the duration the network must be awake is 2n seconds (to include those that lose a second and those that gain a second). At the end of five years each node may be on for 315 seconds per wake up (not including time to actually send messages and account for transmission collisions.) The system described herein may utilize a method of time correction to simultaneously start nodes 101, add and subtract nodes 101, account for possible node 101 failures, or maintain battery life. In one embodiment, the method comprises software timing synchronization.

In one embodiment of the invention, a first synchronization element 212 may have the same idea about the duration of 1 second as any second synchronization element 212 coupled to a system in the network 108. In another embodiment of the invention, a first synchronization element 212 idea about the duration of 1 second of UTC time may be closed to the idea of the duration of 1 second of UTC time any second synchronization element 212 coupled to a system in the network 108. In a further embodiment, node 101 in the network 108 may last in the field for at least 1, 2, 3, 4, 5, 6, 7, 8, 9, or 10 years on a single set of batteries. In a further embodiment, node 101 in the network 108 may last in the field for at least 1, 2, 3, 4, 5, 6, 7, 8, 9, 10, 11, or 12 months on a single set of batteries. In one embodiment, the wake-up frequency and wake-up duration may be minimized to minimize net battery drain. In one embodiment, the network 108 may use a global wake-up algorithm where that the nodes 101 may wake up simultaneously and may use a collision detection mechanism to transmit information during that period. Once the information is successfully delivered the network 108 goes back to sleep until the next global wake-up according to a schedule set by the remote coordinator 104. In another embodiment, nodes may be added or deleted arbitrarily to the network 108. In another embodiment, the failure of any node 101 to connect to the network 108 may not cause the whole network to fail. In another embodiment of the invention, the network 108 may self-heal.

Another existing problem with synchronized networks is Phase shift which is a periodic mismatch of measured time. If an oscillator frequency changes relative to its neighbors then its counter speeds up or slows down. Slight phase shifts result in a gradual detuning of the network. A phase shift is by definition periodic. Although drift may technically also results in a phase shift, as used herein phase shift refers broadly to oscillator frequency drift. In one embodiment, the nodes 101 are activated independently (e.g., the nodes 101 may wake up at different and essentially random times and thus the nodes' 101 phase shifts may also be random.) Accordingly, in one embodiment of the invention, the synchronization element 212 may receive time synchronization information every Flourish Phase to maintain the system as synchronized as described herein.

The synchronization element 212 may be a clock. The clock may include but is not limited to a crystal oscillator, resonator, or RC circuit. The clock may use any one of four types of "atomic" standards: (1) Global Positions System or satellite receiver using a 1575.42 MHz commercial signal from the GPS satellite. This signal may be a spread spectrum signal with a power requirement about 80 mA at 3.0 VDC (e.g., GPS Receiver MAX2742 commercially available from Maxim Integrated Products of Sunnyvale, Calif.); (2) A rubidium time standard using a hot rubidium 87 source and a cool rubidium 85 gas filter at about 6.8 GHz to generate a precise frequency (e.g., Rubidium Oscillator including a LCR-900 (Low Cost Rubidium) rubidium oscillator commercially available from SpetraTime of Neuchâtel, Switzerland.) After initially setting the time, a rubidium time standard may remain "on time" for over 10 years before it may drift one second off time. A suitable rubidium time standard may be the PRS10 Low Phase Noise Rubidium Oscillator commercially available from Stanford Research Systems of Sunnyvale, Calif. This system may also run from a local power (e.g., utility) or have a large emergency backup battery; (3) NIST Radio Station WWVB that may broadcast a 60 kHz standard. This standard may have a lower power requirement and is highly reliable; and (4) Cell phones. This system may use type (1) and (2) together at a local master station to maintain all the local tower's frequencies. The requirements of the systems described herein may be met by any of the aforementioned standards.

In another embodiment, the network 108 may be synchronized where the systems of the network may be active or inactive within at the same time. In another embodiment of the invention, the network 108 may be synchronized where a first system's synchronization element 212 time is different from any other component by less than 1, 2, 3, 4, 5, 6, 7, 8, 9, or seconds. In yet another embodiment of the invention, the network 108 may be synchronized where a first system's synchronization element 212 time is different from any other system by less than 1 second. In another embodiment of the invention, the network 108 may be synchronized where a first system synchronization element 212 time is different from any other system by less than 1, 2, 3, 4, 5, 6, 7, 8, 9, or 10 milliseconds. In other embodiments of the invention, the network 108 may be synchronized where a first system's synchronization element 212 time is different from any other system by less than 1 millisecond. In another embodiment of the invention, the network 108 may be synchronized where a first system synchronization element 212 time is different from any other system by less than 1, 2, 3, 4, 5, 6, 7, 8, 9, or 10 microseconds. In other embodiments of the invention, the network 108 may be synchronized where a first system's synchronization element 212 time is different from any other system by less than 1 microsecond.

In one non-limiting example, the time of a control unit 106 synchronization element 212 is less than one second different from the time of a remote coordinator's 104 synchronization element 212 or the time of a node's 101 synchronization element. In another non-limiting example, the time of a control unit 106 synchronization element 212 is less than one millisecond different from the time of a remote coordinator's 104 synchronization element 212 or the time of a node's 101 synchronization element. In another non-limiting example, the time of a control unit 106 synchronization element 212 is less than one microsecond different from the time of a remote coordinator's 104 synchronization element 212 or the time of a node's 101 synchronization element.

It has been our observation that end nodes within a MESH network may not all wake up close enough in time to allow for normal seamless communication between nodes and a remote coordinator 104 within a cluster. However, this issue may be eliminated, reduced, or minimized if all the end nodes wake up at the same time (e.g., a node 101 may be synchronized to prevent "drifting".) In one embodiment of the invention, a low power atomic clock module may be provided on each node 101 in order to synchronize all nodes prior to waking up each day. For example, even if drifting occurs, the atomic clock module may resynchronize the time records on each end node at a set time or variable thereof each day within a cluster. Within a few moments thereafter, once all nodes are resynchronized, a node 101 within a cluster may wake up to report their status and readings. Nodes that are out-of-reach of a remote coordinator 104 may use the nodes within their immediate vicinity to reach the nearest remote coordinator 104 via a network 108 path. The nodes may awake at the same time (e.g., within 1 second of each other) to form the bridge and communicate their status, equipment status (e.g., meter readings), effective synchronization may be provided. Synchronization may also be achieved for remote coordinator 104 and the control unit 106 time modules (e.g., clock devices) using a similar approach.

Power Supply 206

The power supply 206 may comprise at least one of a battery, a solar power panel, or a wind turbine. In one embodiment, the battery may be a lead-acid, Ni—Cd, or NiMH battery. In another embodiment, the battery may be a rechargeable battery. In another embodiment, the rechargeable battery may be a NiMH battery. In one embodiment, the power supply 206 may comprise 1, 2, 3, 4, 5, 6, 7, 8, 9, or 10 batteries coupled to the processing module 202.

In another embodiment of the invention, a node configuration 101 further may comprise an emergency back-up battery. In yet another embodiment, the emergency back-up battery may have enough power to run a system for at least one, two, three, four, five, six, or seven days. In a further embodiment, the emergency back-up battery may have enough power to run a system for at least 1, 2, 3, 4, 5, 6, 7, 8, 9, 10, 11, or 12 months. In another embodiment of the invention, the power supply 206 may be powered by electricity conventionally provided by electrical utilities via use of a switch or relay to tap into the electric grid. In another embodiment, a temperature sensor 214 may be coupled to the power supply 206 configured to measure the temperature of the power supply 206 and send the information to the processing module 202.

Transceiver 208

The transceiver 208 may comprise a receiver circuit, a transceiver circuit, and a microcontroller adapted to be coupled to the receiver circuit and the transceiver circuits. In another embodiment of the invention, the transceiver 208 may be a wireless transceiver. In another embodiment of the invention, the transceiver 208 may be an RF transceiver.

The transceiver 208 may use a wireless network including but not limited to 4G and 5G networks 802.11 Wi-Fi Wireless LANs including but not limited to 802.11a, 802.11b, 802.11g; AirPort, BLUETOOTH, CDMA, EDGE, GPRS, GSM, HF/UHF, Infrared (IrDA), Mesh RF, microwave, Point-to-point, TETRA trunk mobile networks, UMTS (3G), UWB, W-CDMA, Wi-Fi®, WiMAX networks, Wireless WANs, and ZIGBEE®. However, this listing of wireless technologies should not be construed as a limitation of the current disclosure. Although described as using GSM, GPRS, MESH, or any combination thereof, communication between the various systems, components, devices, any combination thereof may be achieved via transmission of electric, electromagnetic, optical, wireless signals, or packets that carry digital data streams using a standard telecommunications protocol or a standard networking protocol including but not limited to Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols or systems that may be suitable for transmitting or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used.

Communication between the systems may also use standard wireless protocols including IEEE 802.11a, 802.11b, 802.11g, and via protocols for a wired connection, such as an IEEE Ethernet 802.3. It should also be appreciated that communications may be achieved over the Internet. In yet another embodiment, the transceiver 208 may use a GSM, SMS, GPRS, or MESH wireless network. In another embodiment, the transceiver 208 may use a MESH wireless network. In another embodiment, the wireless network may be a wireless mesh network using 802.11, 802.16, cellular technologies, or combinations of more than one type.

In another embodiment, the wireless network may be a wireless ad hoc Mesh network. In another embodiment, the wireless network may be a synchronized MESH network. In some embodiments a self-healing MESH network where no human intervention is required for the network to establish a path if one or more nodes 101 are out-of-reach or not responding to the remote coordinator 104. In a further embodiment, systems in the MESH network 108 may be synchronized to prevent drifting (e.g., the dissynchronization of the synchronization elements 212 in the systems of the network 108.) For example, if the time kept by a first system begins to "drift" (e.g., differ by more than 1 second from the time kept by the synchronization element 212 of a second system in a network 108.)

In one embodiment of the invention, the wireless mesh network may use a routing protocol including but not limited to AODV (Ad hoc On-Demand Distance Vector), OLSR (Optimized Link State Routing protocol), DSR (Dynamic Source Routing), OSPT (Open Shortest Path First Routing), DSDV (Destination-Sequenced Distance-Vector Routing), B.A.T.M.A.N. (Better Approach To Mobile Adhoc Networking), PWRP (Predictive Wireless Routing Protocol), OORP (OrderOne Routing Protocol) (OrderOne Networks Routing Protocol), TORA (Temporally-Ordered Routing Algorithm), HSLS (Hazy-Sighted Link State), or IWMP (Infrastructure Wireless Mesh Protocol). In another embodiment, the wireless network 108 may use a RCP (Radiant Configuration Protocol) as described herein. In one embodiment, the Radiant Configuration Protocol (RCP) may require a smaller processor, less memory, and consume less power than other routing protocols.

In another embodiment, frequency-hopping in a wireless system may offer the advantage of avoiding other interfering signals and avoiding collisions. Moreover, there may be regulatory advantages given to systems that do not transmit continuously at one frequency. In one embodiment of the invention, the transceiver 208 may change frequencies after a period of continuous transmission or when interference is encountered. In another embodiment of the invention, the transceiver 208 may be a channel-hopping transceiver.

In one embodiment, the transceiver 208 may communicate with other transceivers 208 on bands above and below the 900 MHz band. In one embodiment, the transceiver 208 may listen to a radio frequency channel before transmitting on that channel or before beginning transmission. If the channel is in use, (e.g., by another device such as another reading device, a cordless telephone), then the transceiver 208 may change to a different channel. In one embodiment, the transceiver 208 may coordinate frequency hopping by listening to radio frequency channels for interference and using an algorithm to select a next channel for transmission that avoids the interference. Thus, for example, in one embodiment, if a transceiver 208 senses a dangerous condition and goes into a continuous transmission mode, the transceiver 208 may test the channel before transmission to avoid channels that may be blocked (e.g., in use or jammed.) In one embodiment, the transceiver 208 may continue to transmit data until it receives an acknowledgement message from a control unit 106 or remote coordinator 104 that the message may have been received. In one embodiment, the transceiver 208 may transmit information having a normal priority (e.g., status information) and may wait for an acknowledgement message and the transceiver 208 send information having elevated priority (e.g., an alarm message including but not limited to smoke in the node 101 or excessive temperature in the node) and may continue to send the information until an acknowledgement message may be received.

It should be appreciated that end-to-end communication may be encrypted, allowing for secure transactions. In another embodiment, the encryption may be symmetric (algorithm), secret-key encryption, asymmetric (algorithm), public-key encryption, or Data Encryption Standard (DES).

In another embodiment of the invention, the transceiver 208 may be positioned at a location remote from the processing module 202. The transceiver 208 may be communicatively coupled to a booster or signal relay.

The wireless networking described herein may have further advantages over relying on physical infrastructure which may be expensive to build and maintain and may be also susceptible to destruction or disruption in service due to natural disasters, civil unrest, terrorist attacks, deterioration, or any combination thereof due to lack of maintenance.

Housing

The systems of the present invention may also be hardened to provide resiliency to natural and man-made disasters. This may be accomplished by providing a hardened casing for the system to provide protection for the system components against nuclear, chemical, or biological attacks. Further, the housing may provide protection against transient effects on electronics, electromagnetic pulses (EMP), blasts, or thermal radiation. The housing may protect the system against vandalism, animal damage including but not limited to rodents eating the materials, birds nesting in the component; weather damage including but not limited to rain, flood, heat, cold; water damage, tampering, wind damage, pilfering, theft, or any combination thereof. The housing may protect the system against water damage including but not limited to moisture, humidity, submersion, vapor, leaks; extreme temperatures (e.g., over 100° C. or under 0° C.), pressure, shock, vibrations, radiation, dust, particulate matter, debris, or corrosive conditions (e.g., acidic, basic). In one embodiment of the invention, the housing may protect a system from damage due to humidity, steam, water, temperature, vibration, dirt, soil, mud, dust, chemicals, or any combination thereof. In another embodiment, the systems may be constructed of hardened materials that may protect the system against damage.

Sensor 214

In one embodiment of the invention, the sensor 214 may detect disturbances in the flow of water, gas, electricity, cable service, internet service, sewage, or telephone service. In one embodiment, the sensor 214 may be programmable and may alert the processing module 202 with information alerting the processing module to events including but not limited to carbon monoxide, chemicals, damage due to weather, vandalism, earthquakes, weather, deterioration, fire, leaks, light, low battery, pilfering, power outages, reporting collected data irregularity, smoke, supply limitations, tampering, temperature, or other conditions affecting the distribution and consumption of the commodity.

Upon detecting damage or other distribution to the system or flow of a commodity, the sensor 214 may send the information to the processing module 202 that may generate an ALARM message that is sent to a transceiver 208 and broadcast over a network 108. The ALARM message may be received by a remote coordinator 104. The remote coordinator 104 may process the ALARM message in a processing module 202 and issue a COMMAND message that is sent via a transceiver 208 to a node 101 over a network 108. A remote coordinator 104 may forward the ALARM message to a control unit 106 which may receive the ALARM message by its transceiver 208 and the processing module 202 may process the ALARM message and issue a COMMAND message. The COMMAND message may be sent to the remote coordinator 104 that receives the COMMAND message and may forward it over a network 108 following the same path used by the ALARM message generated by the node 101. In one embodiment, the system may utilize a RCP network protocol where the ALARM indication may be stored locally by a processing module 202 and may forwarded to the remote coordinator 104 during the next Flourish phase.

Nodes 101 as described herein may be adapted to monitor or control any given piece of equipment, meter, or infrastructure component. A node 101 may be installed into existing equipment, meter, or infrastructure without disturbing, damaging, or inferring with the function of any existing equipment, meter, or infrastructure. In particular, nodes described herein may be used to upgrade cable, telephone, gas lines, water mains, oil pipelines, or factory equipment.

In an alternative embodiment of the invention, the meters may measure industrial and commercial waste, emissions, pollution, and other discharge (e.g., waste water, carbon dioxide, industrial fluid waste) in real time and remotely allowing metering of emissions or waste. In another embodiment, the meters may be integrated with a sensor, valve, relay, switch, or any combination thereof to regulate the efflux (e.g., outflow, output) of emissions or waste from an industrial or commercial site. In another embodiment, the meter may monitor cable or telephone usage (e.g., cellular phones).

Figure 14:
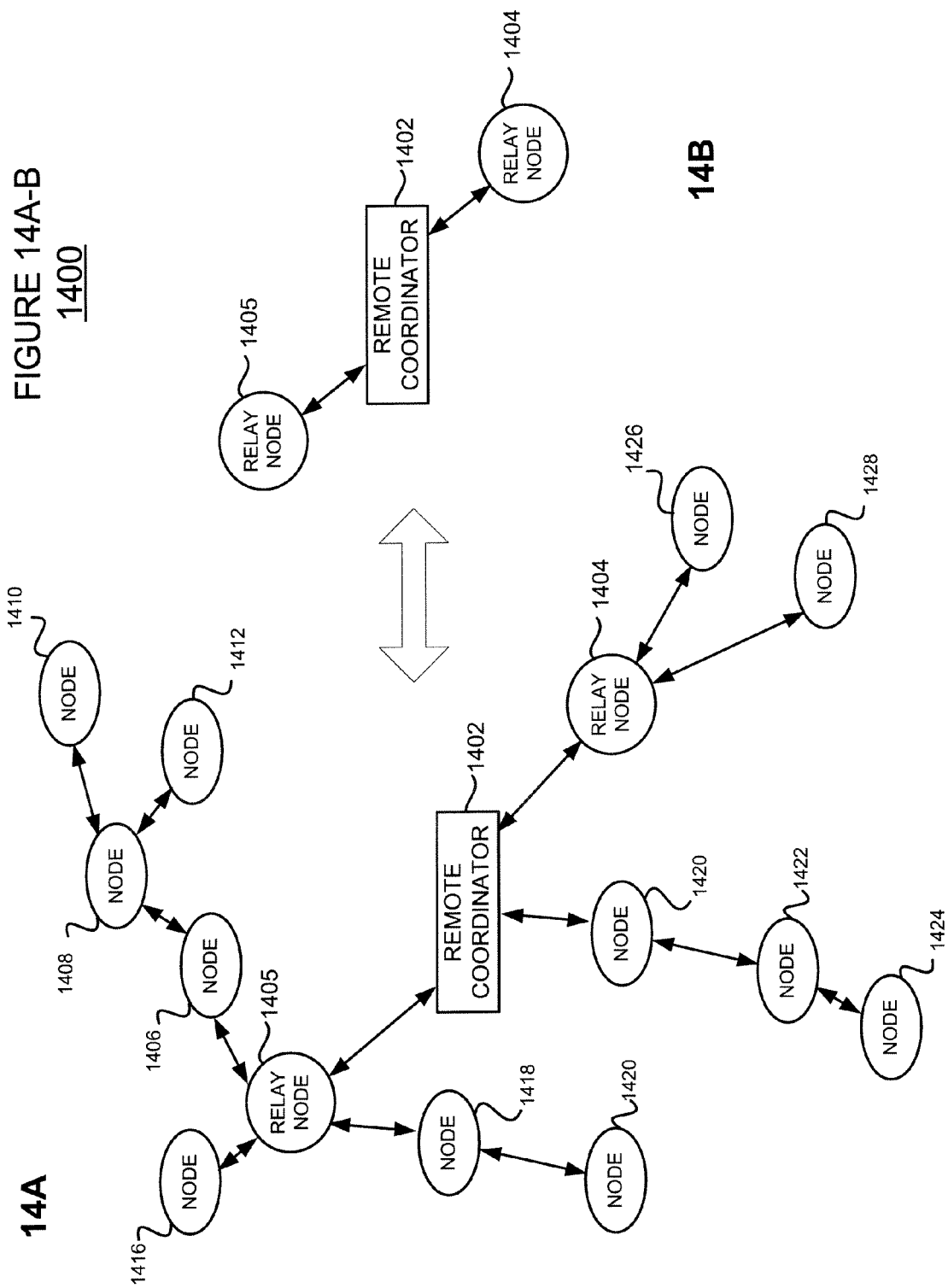
FIG. 14A depicts an illustrative an exemplary network during a Flourish Phase when the remote coordinator, relay node, and nodes may be active, according to various embodiments of the invention.
FIG. 14B shows the same exemplary network during a Dormant Phase when the remote coordinator and relay nodes are Dormant, and the nodes are in sleep node, according to various embodiments of the invention.

In one embodiment, a node 101 may not coupled to any equipment but only acts to route messages in the network 108 as shown in FIG. 14 and FIG. 15 and may be referred to as a routing node or a relay node.

A node 101 may be installed into a preexisting equipment or infrastructure (e.g., retrofit) and may not disrupt the preexisting meter, lines, pipes, infrastructure, or equipment functions. In one embodiment, a kit may be used to upgrade existing meters to be incorporated into a system described herein.

It should be appreciated that a node 101 may be constructed in a variety of configurations and still operate as intended. Further, a node 101 may be modular, single integrated unit, constitute separate components, or an assemblage. The system described herein may be networked with other systems described herein.

Water Meter Node

FIG. 3 depicts an illustrative diagram for a water meter node 101 configuration 300 wherein the water meter 304 may be coupled to a valve 302 configured to open or close a commodity supply line 316 in response to a message from a processing module 202. It should be appreciated that the commodity may be any fluid. According to exemplary embodiments, the commodity may be water. In one embodiment, the commodity supply line 316 is a water line, sewage line, or gas line. In one embodiment of the invention, cold water from utility mains flow via a service line into an actuated shut-off/turn-on valve 302 coupled to a displacement water meter 304, coupled to an energy harvesting device 306 to the customer line. In one embodiment of the invention, the shut-off/turn-on valve may be actuated by a solenoid.

An energy harvesting device 306 may be coupled to the water meter 304 that may use the commodity flow to provide power to the power supply 206, according to various embodiments of the invention. A detailed description of water meter 304 and the energy harvesting device 306 is provided in conjunction with FIGS. 17 through 19.

The system according to this embodiment comprises a mechanical energy harvesting device 306 for converting water flow mechanical energy into electrical energy, said device comprising a pair of magnetically coupled rotors driven by water flow and having a plurality of magnets affixed thereto that rotate around a set of coils, thereby inducing a current in the coils, an energy storage and power supply interface comprising at least one rectifier circuit electrically coupled to the coils, at least one capacitor charged by the at least one rectifier circuit, at least one battery, and a power supply interface 314 for permitting the power supply 206 to be charged by at least one capacitor and for selecting either the capacitor or the battery to supply continuous power to the processing module 202 and to manage charging of the battery. In one embodiment, the system also comprises a water flow counting device comprising a plurality of flux change detectors that detect flux changes caused by a magnet rotating about a shaft, rotation of said shaft driven by a flow sensor in a water flow chamber, a processing module electrically coupled to the power supply 206 and power supply interface 314 and the water flow counting device coupled to a processing module 202 communicatively coupled to a transceiver 208 communicatively coupled to an antenna 210 for enabling two-way communication between the wireless water meter monitoring system and other systems, and a sensor 214 electrically coupled to the power supply 206 and power supply interface 314 and the processing module 202 for recording sensor data and comprising at least one sensor 214.

Valve 302

The valve 302 may be configured to open or close a commodity supply line 316 in response to a message from a processing module 202. The valve 302 may be powered by rechargeable batteries. The valve 302 may be coupled to an actuator that opens or closes the valve 302 in response to a message from a processing module 202. For example, the actuator may be a solenoid. The valve 302 may be a gate valve, such as a wedge or knife type gate valve. It should be appreciated that other types of valves may be used as known in the art in alternate embodiments. In alternative embodiments, the valve may be installed in a supply line, near the installation of the meter.

The water meter 304 may be able to measure the water flowing into a customer's premise and be able to shut off the water supply through the commodity supply line 316 or turn on the water supply through the commodity supply line 316. The water meter 304 may be able to report the amount of water used to a remote information handler and be able turn the water supply on or off by remote command. The water meter may be able to extract energy from the flowing water to recharge the rechargeable batteries via an energy harvesting device 306 described herein. The Water Meter may comply with all parts of the American Water Works Association, AWWA, C700-02 standard, herein incorporated by reference in its entirety.

In one embodiment, the valve may be comprise a solenoid valve mechanism which may have a power usage requirement of less than 600 milliCoulombs per activation of the valve with coil inductance of a maximum of 100 mH, switch close time of 200 milliseconds, and battery voltage of less than 8.7 VDC.

The valve 302 may be coupled to the solenoid that may be used to release the valve 302 based on a COMMAND message received by the processing module 202 of the water meter node (not shown). The valve 302 may comprise a spring loaded valve. In various embodiments, this valve may be manually tensioned into an open position with an external switch or valve control. The coupling to the processing module 202 may be through an interface 308. The interface 308 may be provide control coupling between the valve 302 and the processing module 202. The interface 308 may provide a communications path from the solenoid mounted on valve 302 and the processing module 202. The processing module 202 may send one or more messages via the interface 308 to the valve 302 to open or close the valve 302 to open or close a commodity supply line 316. After this action occurs, the processing module 202 may send an ACKNOWLEDGE message to confirm that the valve may have been opened or closed to the transceiver 208 which send the ACKNOWLEDGE message on the network 108.

Water Meter 304

A conventional water meter may comprise a water chamber having a water input, a water output, and a water flow measuring device, such as a rotating, nutating or oscillating disk, or other flow meter, that drives the gauge on the top surface of the meter. The meter chamber may be usually made of a non-corrosive metal such as copper or bronze. Also, the pipe connecting the meter chamber usually includes a manual shut off valve 306 that may be manually engaged to prevent water from flowing from the commodity supply line 316 to the consumer through the water meter 304, to facilitate the repair or replacement of the water meter 304 or other elements within the customer premises.

According to exemplary embodiments, the water meter 304 may be any of various types of meters used on water lines for measuring and control of water flow. For example, a multi-jet meter, single-jet meter, positive displacement meter, vertical turbine meter, horizontal turbine meter, compound meter, fire meter, fire hydrant meter, or a magnetic flow meter may be used. It should be appreciated that other types of meters may be used with exemplary embodiments. The water meter 304 may be manufactured and configured to conform to applicable industry specifications which govern its use. For example, if water meter 304 is to be used in residential water supply systems in the United States, the water meter 304 must conform to American Water Works Association ("AWWA") specifications.

As shown in system 300, the water meter 304 may be coupled to an interface 310. The interface 310 may be similar to that as described for the valve 302. The interface 310 may provide a communications path between the water meter 304 and the processing module 202.

Energy Harvesting Device 306

According to exemplary embodiments, the meter 304 may have an energy harvesting device 306 coupled thereto. The energy harvesting device 306 may utilize the torque from the flow of a commodity to self-power a node 101. The energy harvesting device may comprise a rotor that rotates in the flow of a commodity. The rotor may then be coupled to a shaft that generates electricity through the use magnets coupled to a the shaft. The magnets may rotate with the shaft and be electrically coupled to a set of coils from which electricity may be obtained. The energy harvesting device 306 may use the water meter 304's components. For example, the water meter 304 may use a nutating disc for measurement of the flow of water. Accordingly, the nutating disc wobbles in response to flow of water through the meter and may use a spindle to turn a shaft, whose revolutions are counted to determine the flow amount of the water. According to exemplary embodiments, the energy harvesting device 306 may use that shaft to harvest energy by coupling the magnets to the shaft. It should be appreciated that water meters, such as water meter 304, may use other flow measuring means, such as turbines. For example, water meter 304 may use a Francis turbine for flow measurement.

The energy harvesting device 306 may comprise a mechanical energy converter located in the water chamber. The energy harvesting device 306 may comprise an impeller, nutating disk, blade assembly or other surface area device rotating about a drive shaft to which torque is imparted by the flow of water. This rotating shaft may be used to energize one or more components in a battery charger shown in FIG. 20. The battery charger may include one or more capacitors, one or more batteries, control logic, or switches for supplying system power to various components of the system according to the various embodiments of the invention.

In one embodiment of the invention, water flowing through the water meter's chamber rotates a turbine, impeller, blade and shaft assembly, or other mechanism that rotates with the flow of water, or causes a nutating disk assembly or other volume measuring assembly to be actuated. The mechanical energy created in the form of the shaft rotation, may be used to drive a drive magnet. The rotation of the drive magnet creates a time varying magnetic flux density that drives a registration magnet, which, in various embodiments, may be located above the portion of the meter assembly through which water is flowing. The rotation of the registration magnet may drive the generator, either directly, such as via a drive shaft, or indirectly, through a mechanical gear assembly. In various embodiments, this may comprise spinning a pair of magnetically coupled rotors around a set of coils. The time changing magnetic flux caused by the rotation of the magnetically coupled rotors induces a time varying current in the coils generating an electrical current. The current created is output to a charge power supply interface 314. In various embodiments, the power supply interface 314 may communicate the current to the input of a rectifier circuit that converts alternating current (AC) to direct current (DC) that may be used to create a stored charge in a capacitor. This stored charge may be used to provide power to the system. This stored charge may also be used to charge the battery of the power supply 206.

In one embodiment, the energy harvesting device 306 for compound water meters may be installed on the yoke of the water distribution system. In another embodiment, the energy harvesting device 306 may be coupled with a water meter's 304 nutating disc or water meter's piston 304. The energy harvesting device 306 may generate at least 1, 2, 5, 10, 15, 20, or 25 milliCoulombs of charge per second (15 milliAmpere). In another embodiment, the energy harvesting device 306 may generate at least 15 milliCoulombs of charge per second (15 milliAmpere) or about 0.898 Coulombs of charge per gallon.

In one embodiment, the electricity generated by the energy harvesting device 306 may be provided to a power supply 206 via an interface 314. In another embodiment, the electricity generated by the energy harvesting device 306 may be provided to the water meter 304. In exemplary embodiments, the energy harvesting device 306 may not disturb the flow of the commodity.

Power Supply Interface 314

The power supply interface 314 may comprise a power management system. The power management system may comprise an analog to digital converter (ADC) to allow software on the processor to directly measure power supply status (voltage and current), detect whether the energy may be being generated from the flow of water, and log this data. Expected battery life may be computed with this data to generate alarms before the batteries get too low.

In addition, the power supply interface 314 may be a power manager capable of shutting down power consuming activities (tasks) depending on whether battery power may be low or that there may be nothing new to report (e.g., no meter change)

In one embodiment, the power management function may be concentrated in the power supply interface 314 software, where the use of the different levels of "sleep" offered by the processing module 202 may allow the power management software to extend the life of a battery power supply by budgeting power usage according to need. This may allow the node 101 to operate for longer periods of time than it would be able to if it ran on full power continuously.

A battery charging module may used to coupled to the processing module 202 via an interface 204 to the energy harvesting device 306. The battery charging module may be coupled to a leak control device. In addition, the battery charging module may be coupled to the power supply 206. The energy harvesting device 306 may output power to a power interface 314. The power interface 314 may supply power to the processing module 202 to a sensor 214. The power interface 314 may also supply power to a solenoid or other actuator of the water valve 302.

The processing module 202 may be coupled to a transceiver 208 and comprise program logic executed by the processing module 202. The sensor 214 may comprise water pressure sensors, temperature sensors, water quality sensors, or other sensors. Alternatively, or in combination, the sensor 214 may be a single sensor module including but not limited to a board or chip-based sensor lab that performs a variety of diagnostic tests on the water. The sensor 214 information may be communicated periodically or in real time to the processing module 202 via communication bus, such as universal asynchronous receiver/transmitter (UART), serial peripheral interface (SPI) bus, inter-integrated circuit (I²C), 1-Wire or USB. Also, the processing module 202 may poll the one or more sensor 214 periodically or on demand to obtain information corresponding to water conditions, current or past. The water meter node 101 may also comprise a water counting module that may be electrically coupled to the power interface 314 and communicatively coupled to the processing module 202 via a data bus.

The power interface 314 may include an energy harvesting device 306 driven by the mechanical energy of water flow. The energy harvesting device 306 may convert the mechanical energy of the rotating shaft into electrical energy. After conversion by a rectifier, the electrical energy generated by the energy harvesting device 306 may charge a capacitor of the battery charger that may charge a power supply 206 comprising at least one battery. A power interface 314 may select either the energy harvesting device 306 or the power supply 206 to supply output power. In various embodiments, the power interface 314 may include decision logic for selecting either energy harvesting device 306 or the power supply 206 based on a current state of either or both devices, or in accordance with a predetermine power management scheme stored in a memory device of the power interface 314 or another memory structure external to the power interface 314. In various embodiments, by placing the battery charger between the energy harvesting device 306 and the power supply 206, the number of charge cycles of the power supply 206 may be significantly reduced over direct charging techniques, thereby increasing the effective life of the system. Also, the power interface 314 may help to insure that the power supply 206 may be charged by the battery charger only after the power supply 206 has been fully discharged to avoid battery memory problems and increase the usable life of the power supply 206.

In the exemplary system shown in FIG. 3, a first sensor 214A may be used to selectively wake up a controller in the processing module 202 from a sleep or low power state. For example, the processing module 202 may default to a sleep state to reduce power consumption. When the first sensor 214A senses a magnetic flux change caused by rotation of the drive magnet, it may send a signal to wake up the processing module 202 via an interrupt pin on the processing module 202, causing the processing module 202 to prepare to begin recording water consumption.

It should be appreciated that information collected by a water meter node may include current water meter reading information as well as other information associated with the node including but not limited to current state, power information, temperature information, water pressure information, backflow indication, and any other sensor-based information from one or more electronic sensors in communication with a node 101.

A water/gas meter node 101 may be installed into a preexisting equipment or infrastructure (e.g., retrofit) and may not disrupt the preexisting meter, lines, pipes, infrastructure, or equipment functions. In one embodiment, a kit may be used to upgrade existing water meters to be incorporated into a system described herein.

It should be appreciated that a water meter node 101 may be constructed in a variety of configurations and still operate as intended. Further, a water meter node 101 may be modular, constitute separate components, or an assemblage. The system described herein may be networked with other systems described herein.

Gas Meter Node

FIG. 4 depicts an illustrative diagram for a gas meter node configuration 101, wherein a valve 402 configured to open or close a commodity supply line 316 in response to a message from a processing module 202 may be coupled to the intake on a gas meter 404, according to various embodiments of the invention. In one embodiment, the commodity supply line 316 may be a gas line.

In one embodiment of the invention, the gas meter 404 may be a diaphragm meter, rotary meter, turbine meter, orifice meter, ultrasonic flow meter, or Coriolis meter.

In one embodiment, the gas valve 402 may be coupled to a solenoid that receives messages from the processing module 202. The processing module 202 may send a message via an gas valve interface 406 to the gas valve 402 to open or close the gas valve 402 to open or close a commodity supply line 316. After this action occurs, the processing module 202 may send an ACKNOWLEDGE message to confirm that the valve may have been opened or closed to the transceiver 208 which send the ACKNOWLEDGE message on the network 108. In one embodiment, the gas valve 402 may be installed in a supply line, near the installation of the meter.

A gas node 101 may be installed into a preexisting equipment or infrastructure (e.g., retrofit) and may not disrupt the preexisting meter, lines, pipes, infrastructure, or equipment functions. In one embodiment, a kit may be used to upgrade gas existing meters to be incorporated into a system described herein.

It should be appreciated that a gas node 101 may be constructed in a variety of configurations and still operate as intended. Further, a gas meter node 101 may be modular, single integrated unit, constitute separate components, or an assemblage. The system described herein may be networked with other systems described herein.

Electricity Meter Node

FIG. 5 depicts an illustrative diagram for an electricity meter node configuration 101, wherein a switch 502 configured to open or close a commodity supply line 316 in response to a message from a processing module 202 may be coupled to the input of an electricity meter 508, according to various embodiments of the invention. In one embodiment of the invention, the electricity meter 508 may be an electromechanical meter, solid state meter, or multiple tariff (e.g., variable rate) meter. In one embodiment, the commodity supply line 316 may be power supply line including but not limited to an electricity power line.

The switch 502 may be configured to open or close a commodity supply line 316 in response to a message from a processing module 202. The switch 502 may be powered by rechargeable batteries. The switch 502 may be coupled to an actuator that opens or closes the switch 502 in response to a message from a processing module 202. In one embodiment, the switch 502 may be coupled to an actuator that receives messages from the processing module 202. The processing module 202 may send a message via an interface 504 to the switch 502 to open or close the switch 502 to open or close a commodity supply line 316. After this action occurs, the processing module 202 may send an ACKNOWLEDGE message to confirm that the switch may have been opened or closed to the transceiver 208 which send the ACKNOWLEDGE message on the network 108. In one embodiment, the switch may be installed in a power supply line 502, near the installation of the electricity meter 508. In one embodiment of the invention, the switch 502 may be a latching relay, Reed relay, mercury-wetted relay, machine tool relay, contactor relay, solid-state relay, solid-state contactor relay, Buchholz relay, forced-guided contacts relay, or overload protection relay.

For example, embodiments of the invention may be applied to multi-resident dwellings. In this example, eight electricity meters 508 may be added to a single switch 502 connected to a single node 101. In one embodiment, the switch 502 may be coupled to more than one electricity meter 508. In one embodiment, the switch 502 may be coupled to 1, 2, 3, 4, 5, 6, 7, 8, 9, or 10 electricity meters 508. In another embodiment, the switch 502 may be coupled to 10, 20, 30, 40, 50, 60, 70, 80, 90, or 100 electricity meters 508. In one embodiment, for instance, the switch 502 may have 8 ports. In another embodiment, 256 switches 502 may be added to each node 101 using an 8-bit addressing method.

An electricity meter node 101 may be installed into a preexisting equipment or infrastructure (e.g., retrofit) and may not disrupt the preexisting meter, lines, pipes, infrastructure, or equipment functions. In one embodiment, a kit may be used to upgrade existing meters to be incorporated into a system described herein.

It should be appreciated that an electricity node 101 may be constructed in a variety of configurations and still operate as intended. Further, an electricity node 101 may be modular, single integrated unit, constitute separate components, or an assemblage. The system described herein may be networked 108 with other systems described herein.

Equipment Node

FIG. 6 depicts an illustrative diagram for an equipment node configuration 101, wherein the equipment 608 may be coupled to an actuator 606 that controls the equipment in response to a message from a processing module 202, according to various embodiments of the invention.

In one embodiment of the invention, an equipment node configuration 101 may be coupled via a control interface 602 with an actuator 606 to control at least one piece of equipment 608. The equipment may be part of an assembly line, machine, computer, device, vending machine, parking meter, street lamp, utility box. In another embodiment, the equipment may be a utility meter including but not limited to a water, gas, or electricity meter. In another embodiment, the equipment may be a portion of a commodity supply network including but not limited to an oil pipeline, gas pipeline, or water main. In another embodiment, the equipment may be infrastructure including but not limited to escalators, street lamps, utility boxes, traffic lights, or elevators.

The actuator 606 may be a processing module controller (PLC) that controls the equipment 608, according to various embodiments of the invention. In one embodiment, the processing module 202 may be coupled to a processing module controller that controls the equipment 608 in response to messages from the processing module 202. For example, the equipment node configuration of FIG. 6 may be used for automation of electromechanical processes including but not limited to control of machinery on factory assembly lines, control of amusement rides, or control of lighting fixtures. The equipment node configuration of FIG. 6 may be may also be used in different industries and machines such as packaging and semiconductor machines. A PLC may be designed for multiple inputs and output arrangements, extended temperature ranges, immunity to electrical noise, and resistance to vibration and impact. PLCs may operate electric motors, pneumatic or hydraulic cylinders, magnetic relays or solenoids, analog outputs. A PLC may be coupled to a processing module 202 to open or close water valve 302, gas valve 402, or switch 502.

It should be appreciated that a node 101 may be constructed in a variety of configurations and still operate as intended. Further, a node 101 may be modular, single integrated unit, constitute separate components, or an assemblage. The system described herein may be networked with other systems described herein.

Remote Coordinator 104

Figure 7:
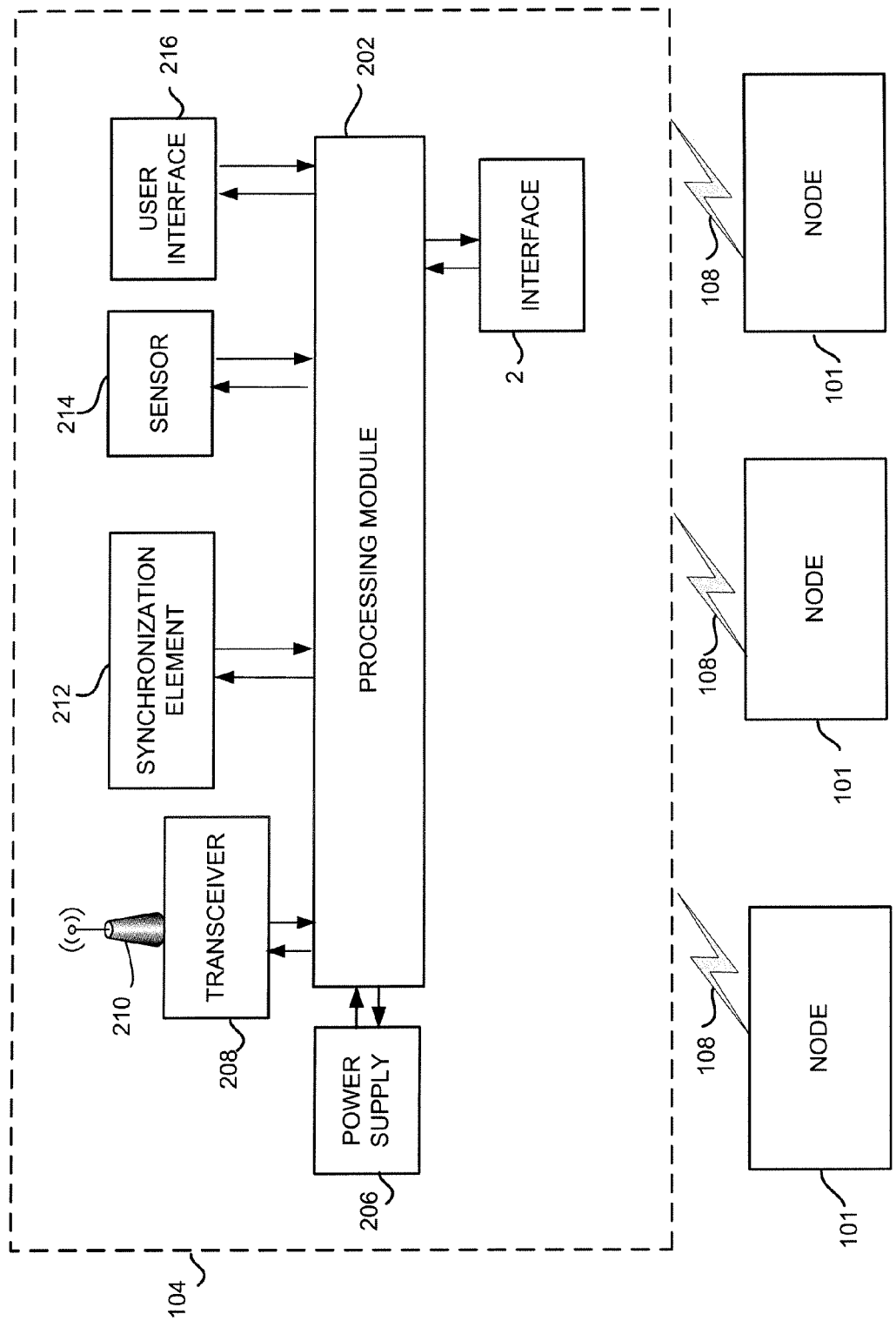
FIG. 7 depicts an illustrative diagram for a remote coordinator configuration, where the remote coordinator may be networked to three nodes, according to various embodiments of the invention.

FIG. 7 depicts an illustrative diagram for a remote coordinator 104 configuration 104, wherein the remote coordinator 104 may be networked 108 to three nodes 101, according to various embodiments of the invention.

In one embodiment, a remote coordinator 104 may comprise a processing module 202 coupled to at least one interface 204 that may allow connection to equipment, a power supply 206, a transceiver 208 configured to send and receive messages communicatively coupled to an antenna 210, coupled to a synchronization element 212, a sensor 214, and a user interface 216. A user interface 216 may be coupled to the processing module to may allow a user to control the remote coordinator 104 and may comprise a display, keyboard, or USB port. A Remote Coordinators 104 may have two main interfaces. One may be an IEEE 802.15.4 wireless interface to the nodes 101 and a second interface communicates with the Control unit 106. This interface may be Ethernet, DSL, GPRS, and the like. Remote coordinators 104 may be mounted on a telephone or power pole to give the radio maximum coverage to nodes 101. Remote coordinators 104 may be always powered on. In one embodiment, a Remote Coordinator may be coupled to a constant power source.

A remote coordinator 104 may maintain the a cluster's time synchronization by generating a time synch message in a processing module 202 sending the TIME SYNCH message to the transceiver 208 which may broadcast the TIME SYNCH message over a wireless network 108 to nodes 101 in a cluster 102. In one embodiment, a remote coordinator 104 may send a TIME SYNCH message at least once a day. In one embodiment, the remote coordinator 104 may comprise a processing module 202 coupled to a synchronization element 212, wherein the synchronization element 212 may be a rubidium temperature crystal oscillator, controlled temperature crystal oscillator, clever time crystal oscillator (CTXO), time standard unit from SpectraTime. In one embodiment of the invention, the synchronization element 212 may synchronize the time of all nodes 101 in a cluster 102 to be at least within 1 second, 1 millisecond, or 1 microsecond of each other. In another embodiment, the remote coordinator 104 may broadcast a TIME SYNCH message which may be received by a node 101 by a transceiver 208 that may be sent to the processing module 202 at the node 101 which may synchronize the node 101 time with the time of the remote coordinator 104 in response to the TIME SYNCH message.

In another embodiment, a remote coordinator 104 may maintain a schedule of activity and inactivity (e.g., Flourish and Dormant Phases) for the nodes 101 within a cluster 102. A remote coordinator 202 may maintain a schedule of activity by generating a SCHEDULE message in a processing module 202 sending the time SCHEDULE message to the transceiver 208 which may broadcast the SCHEDULE message over a wireless network 108 to nodes 101 in a cluster 102. In one embodiment, a remote coordinator 104 may send a SCHEDULE message at least once a day. In one embodiment, the remote coordinator 104 may comprise a processing module 202 coupled to a synchronization element 212, wherein the synchronization element 212 may be a rubidium temperature crystal oscillator, controlled temperature crystal oscillator, clever time crystal oscillator (CTXO), time standard unit from SpectraTime. In one embodiment, a TIME SYNCH message may be used to synchronize the synchronization elements 212 in the systems in a network 108. In one embodiment of the invention, the synchronization element 212 may synchronize the schedule of all nodes 101 in a cluster 102 to be active or inactive within 1 second of each other in response to a TIME SYNCH message. In another embodiment, the remote coordinator 104 may broadcast a TIME SYNCH message which may be received by a node 101 by a transceiver 208 that may be sent to the processing module 202 at the node 101 which may synchronize the node 101 time with the time of the remote coordinator 104 in response to the TIME SYNCH message.

In one embodiment, a remote coordinator 104 may broadcast a SCHEDULE message to the network 108 to set the activity and duration of the nodes 101 in a network 108. In one embodiment, the nodes 101 may only be active when necessary for receiving messages, sending messages, or periodic status updates. In a further embodiment, a SCHEDULE message may be sent by a remote coordinator 104 to a branch or subtree to partition that subtree from the rest of the network 108 to minimize radio transmission collisions.

In another embodiment, the nodes 101 in a network 108 may become active due to a sensor 214 detecting a disruption to the system or commodity supply line (including a power supply line). The sensor detecting the disruption sends the information to the processing module 202 in the node 101 which generates an ALARM message that may be sent to the transceiver 208. The transceiver 208 may be communicatively coupled to an antenna 210 that sends the ALARM message to the remote coordinator 104. In a further embodiment, an ALARM message may be queued to transmit to the remote coordinator 104 during the next Flourish phase of the network 108.

In one embodiment, a remote coordinator 104 may comprise a serial RS232 communication port as an interface 204 that may be coupled with a GSM modem. A remote coordinator 104 may be a fixed staffed position including but not limited to control room. In another embodiment, a remote coordinator 104 may be a fixed automated position including but not limited to a control box or control panel. In still another embodiment, the remote coordinator 104 may be mobile including but not limited to truck, van, automobile, low flying aircraft, helicopter, laptop, PDA, or hand-held electronic device computer.

In one embodiment, a remote coordinator 104 may also comprise a sensor 214 coupled to a processing module 202. Upon detecting damage or disruption to the commodity supply, the sensor 214 may send the information to the processing module 202 that may generate an ALARM message that may be sent to a transceiver 208 and broadcast over a network 108. The ALARM message may be received by a control unit 106. The control unit 106 may receive the ALARM message by its transceiver 208 and the processing module 202 may process the ALARM message and issue a COMMAND message.

A remote coordinator 104 may be networked with at least one node 101 or a cluster of nodes (e.g., a plurality of nodes). In one embodiment, a remote coordinator 104 may be networked with 1, 2, 3, 4, 5, 6, 7, 8, 9, or 10 nodes 101. In one embodiment, a remote coordinator 104 may be networked with 11, 12, 13, 14, 15, 16, 17, 18, 19, or 20 nodes 101. In another embodiment, a remote coordinator 104 may be networked with 10, 20, 30, 40, 50, 60, 70, 80, 90, or 100 nodes 101. In one embodiment, a remote coordinator 104 may be networked with 1, 2, 4, 8, 16, 32, 64, 196, or 296 nodes 101. A plurality of nodes 101 may be arranged in series or parallel in cluster 102 networked to a remote coordinator 104. A first remote coordinator 104 may act as booster or relay for a second remote coordinators 104 to transmit messages from a control unit 106 or to a control unit 106. A first remote coordinator 104 in a first cluster 102 may act as booster or relay for a second remote coordinators 104 in a second cluster 102 to transmit messages from a control unit 106 or to a control unit 106.

A remote coordinator 104 may be programmed with program logic in a processing module 202 that may comprise instructions for routine status control and maintenance of the individual nodes 101 within a cluster 102 in the absence of messages from a control unit 106. For instance, a remote coordinator 104 may act in the absence of messages from a control unit 106 in emergency by following a preprogrammed emergency protocol. For example, a remote coordinator 104 may send a COMMAND message to close a gas valve 402 to shut off a gas supply line 316 after an earthquake. A remote coordinator 104 may send a COMMAND message to close a gas valve 402 to shut off a gas supply line 316 and activate sprinklers during a fire.

In yet another embodiment, a remote coordinator 104 may be coupled to a GSM or GPRS adapter that parses messages received through the GSM or GPRS modem. A remote coordinator 104 may also comprise a state database that maps each individual node to monitor node status. In one embodiment, a remote coordinator 104 maintains a virtual map of nodes based on the number of nodes 101 in series from a remote coordinator 104 or directly networked to a remote coordinator 104. The map may be constructed based on information received from the path used by messages sent to the nodes in a network and their return path to the remote coordinator 104.

It should be appreciated that a protocol translator may also be provided. For example, a protocol translator on a remote coordinator 104 may have two command sets: one for the communication between the GSM modem and the other between a remote coordinator 104 and a node 101.

In one embodiment of the invention, a remote coordinator 104 may perform random self-tests and self-diagnostics in accordance with program logic to monitor the status of the nodes 101 within a network. For example, a remote coordinator 104 may contain program logic in the processing module 202 that initiates a regular real-time monitoring of nodes 101 within a cluster 102. The collection of status information from nodes 101 within a cluster 102 may be concentrated and transmitted by a remote coordinator 104 to a control unit 106 to may allow for prediction or prevention of potential problems including but not limited to damage, deterioration, or needed maintenance.

It should be appreciated that a remote coordinator 104 may be constructed in a variety of configurations and still operate as intended. Further, a remote coordinator 104 may be modular, single integrated unit, constitute separate components, or an assemblage. The system described herein may be networked with other systems described herein.

Control Unit 106

Figure 8:
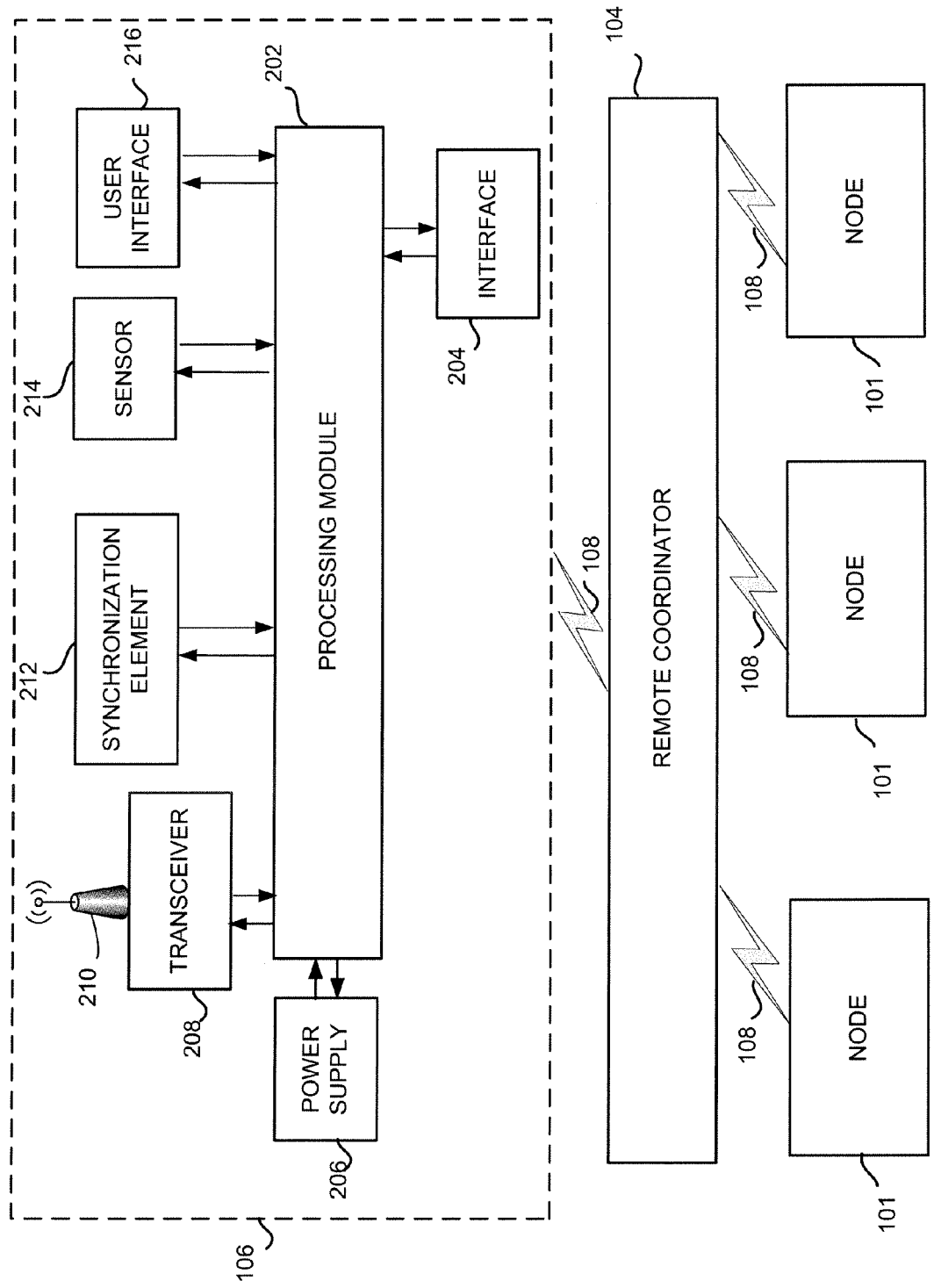
FIG. 8 depicts an illustrative diagram for a control unit configuration, where the control unit may be networked to three remote coordinators, each of which may be networked to three nodes, according to various embodiments of the invention.

FIG. 8 depicts an illustrative diagram for a control unit configuration 300, where the control unit 106 may be networked 108 to at least one remote coordinator 104 that may be networked to three nodes 101, according to various embodiments of the invention.

In one embodiment, a control unit 106 may comprise a processing module 202 coupled to at least one interface 204 that may allow connection to equipment, a power supply 206, a transceiver 208 configured to send and receive messages communicatively coupled to an antenna 210, coupled to a synchronization element 212, a sensor 214, and a user interface 216.

The processing module 202 may comprise a processor that communicates by a local interface with memory. The interface may be middleware. An operating system and application specific software may be contained in the memory. The application specific software may including one or more of the process described herein. In one embodiment of the invention, the interface at the control unit 106 the Customer Interface System (CIS) may be electronically coupled with middleware that may be communicatively coupled with a GSM modem and a RF transceiver. The CIS may be SAP, Oracle, JDE, or any other software which manages business processes. In some embodiments, the CIS may integrate through a common interface (e.g., to a middleware software). In some embodiments, the CIS Server may generate a COMMAND message to disconnect meter by closing a valve or switch, reconnect meter by opening a water valve 302, gas valve 402 or switch 502, read meter to provide commodity usage information, request confirmation from a node 101; check for damage or leaks; and check for tampering or pilferage. The processing module 202 may comprise an integrated circuit comprising a central processing unit. Further, the processing module may be a microcontroller. A commercially available microcontroller suitable for use in this invention may be an AVR chip from Ateml, Inc. The user interface 216 may be coupled to the processing module to may allow a user to control the control unit 106 and may comprise a display, keyboard, or USB port.

The control unit 106 may be any command control center. A control unit 106 may refer to a fixed staffed position including but not limited to a utilities headquarters or control room. A control unit 106 may refer to a fixed automated position including but not limited to a control box or control panel. A control unit 106 may be mobile including but not limited to truck, van, automobile, low flying aircraft, helicopter, laptop, PDA, or hand-held electronic device computer.

A control unit 106 may be networked with at least one remote coordinator 104 or a plurality of remote coordinators 104. In one embodiment, a control unit 106 may be networked with 1, 2, 3, 4, 5, 6, 7, 8, 9, or 10 remote coordinators 104. In one embodiment, control unit 106 may be networked with 11, 12, 13, 14, 15, 16, 17, 18, 19, or 20 remote coordinators 104. In another embodiment, a control unit 106 may be networked with 10, 20, 30, 40, 50, 60, 70, 80, 90, or 100 remote coordinators 104. A plurality of remote coordinators 104 may be arranged in series or parallel networked to a control unit 106.

It should be appreciated that a control unit 106 may be constructed in a variety of configurations and still operate as intended. Further, a control unit 106 may be modular, single integrated unit, constitute separate components, or an assemblage. The system described herein may be networked with other systems described herein.

Network with Three Clusters

Figure 9:
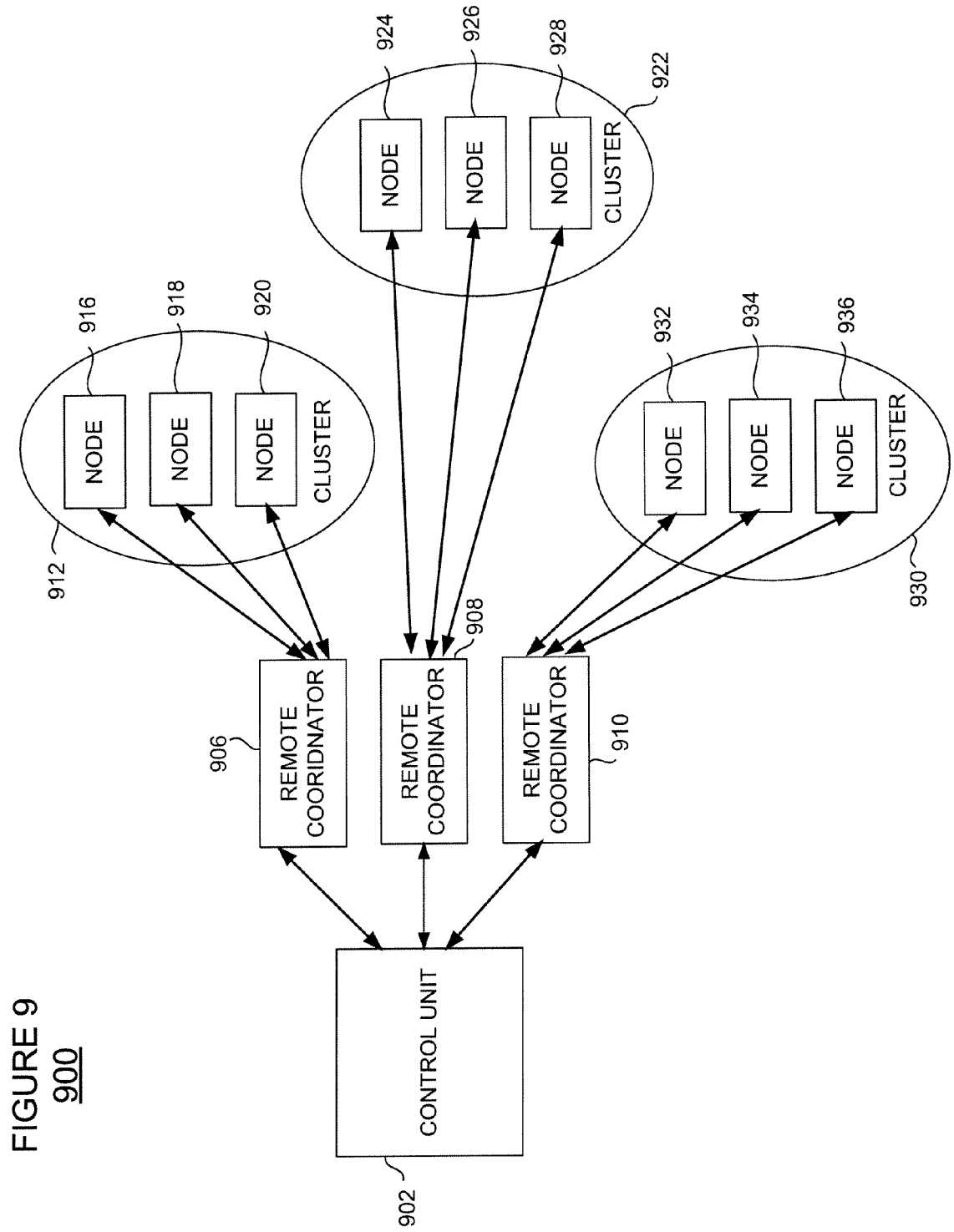
FIG. 9 depicts an overall system architecture for providing remote monitoring and control of nodes, comprising a control unit networked to three remote coordinators, each networked to a cluster comprising three nodes, according to various embodiments of the invention.

FIG. 9 depicts an overall system architecture for providing remote monitoring and control of nodes 101 comprising a control unit 902 networked 108 to three remote coordinators 906 908 910 each networked 108 to a cluster 912 922 930 may comprise three nodes 916 918 920, 108 109 110, and 932 934 936 according to various embodiments of the invention.

A node 101 communicates with a remote coordinator 104 which communicates with a plurality of nodes 101 may be organized into clusters 102 that communicates with a control unit 106. Nodes 101 may operate as repeaters for nodes 101 not coupled to a meter or equipment. In one embodiment, the nodes 101, remote coordinator 104, and control unit 106 may be networked together and synchronized to be active (Flourish phase) and inactive (Dormant Phase) within 1 second of each other by coupling a synchronization element 212 to processing module 202 that may synchronize the synchronization elements 212 of the systems. In a further embodiment, the nodes 101, remote coordinator 104, and control unit 106 may be networked together and synchronized to be active (Flourish phase) and inactive (Dormant Phase) within 1 millisecond of each other by coupling a synchronization element 212 to processing module 202 that may synchronize the synchronization elements 212 of the systems. In another embodiment, the nodes 101, remote coordinator 104, and control unit 106 may be networked together and synchronized to be active (Flourish phase) and inactive (Dormant Phase) within 1 microsecond of each other by coupling a synchronization element 212 to processing module 202 that may synchronize the synchronization elements 212 of the systems. Each node 101 may communicate with another node 101 either directly or indirectly through other nodes 101.

In this non-limiting example, the nodes may be logically grouped in clusters 102 in correspondence to the number of links to communicate with remote coordinator 104. As indicated above, nodes 916 918 920 may communicate directly with a remote coordinator 906 the network 104. In at least this non-limiting example, as shown in FIG. 9, the nodes 916 918 920 may be the nodes 101 in FIG. 9 that may communicate directly with remote coordinator 906 because remote coordinator 906 may be within the communication range of each node 916 918 920. Thus, in this non-limiting example in FIG. 9, nodes 916 918 920 may be organized into a cluster 912 that communicates with a remote coordinator 906 via a direct bidirectional wireless network with the remote coordinator 906. Nodes 924 926 928 may be organized into a cluster 922 that communicates with a remote coordinator 908 via a direct bidirectional wireless network with the remote coordinator 908. Nodes 932 934 936 may be organized into a cluster 930 that communicates with a remote coordinator 910 via a direct bidirectional wireless network with the remote coordinator 910.

In one embodiment, of nodes 101 may wirelessly communicate via an RF modem configured to communicate two ways via RF links. Furthermore, each node 101 may include an RF modem and one or more application dependent devices that perform functions such as the following non-limiting examples: data acquisition, information display, power up. Thus, as a non-limiting example, nodes 101, such as node shown in FIG. 2, may be coupled to a water meter, gas meter, electricity meter, or an equipment as shown in FIGS. 3, 4, 5, and 6 such that information that may be collected may be communicated by the nodes 916 918 920 to the remote coordinator 906 for communication to the control unit 902. Likewise, the nodes 916 918 920 may be coupled to controlled devices, such as a water valve 302, gas valve 402, or switch 502, which may turn on and off the commodity supply (e.g., power supply line) upon an instruction communicated by the remote coordinator 906.

For example, a control unit 902 may send a message to a remote coordinator 906 via a direct bidirectional wireless link. Remote coordinator 906 may receive the message and may send an acknowledge message to the control unit 902 via a direct bidirectional wireless link. The remote coordinator 906 may send the message from the control unit 902 to the nodes 916 918 920 may be organized into a cluster 912 via a direct bidirectional wireless link. The nodes 916 918 920 may send an acknowledge message to the remote coordinator 906 via a direct bidirectional wireless link.

In another embodiment, a sensor 214 in node 926 may detect a leak and may send a message to the remote coordinator 908 via a direct bidirectional wireless link. The remote coordinator 908 may send an acknowledge message to node 926 which may repeat the message until the acknowledge message may be received. The remote coordinator 908 may send the node 926 a command message to close a valve or activate an alarm. The remote coordinator 908 may forward the ALARM message to the control unit 902. The control unit 902 may send an acknowledge message to remote coordinator 908 which may repeat the message until the acknowledge message may be received. The node 926 may receive the COMMAND message to close a valve or activate an alarm and execute the action. After the action may be executed, the node 926 may send an acknowledge message to remote coordinator 908.

In another embodiment, as shown in FIG. 9 a node 936 may broadcast a message requesting a TIME SYNCH message to the network 910. The request message may be received by nodes 934 932 in the cluster 930 or the remote coordinator 910. The nodes 934 932 in the cluster 930 may wait until the remote coordinator 910 may send a SCHEDULE message to synchronize the cluster 930. The SCHEDULE message may be received by the node 936 sending the request message. If not SCHEDULE message may be received by the other nodes 934 932 in the cluster 930 after a preprogrammed period of time, the other nodes 934 932 in the cluster 930 may send a TIME SYNCH message to the requesting node 936. The other nodes 934 932 in the cluster 930 may wait 1, 2, 3, 4, 5, 6, 7, 8, 9, or 10 minutes for a TIME SYNCH message from the remote coordinator 910 before sending the TIME SYNCH message to the requesting node 936. In one embodiment, the nodes 934 932 in the cluster 930 may wait 1, 2, 3, 4, 5, 6, 7, 8, 9, or 10 seconds before sending a SCHEDULE message to node 936.

In order to minimize RF traffic and reduce collisions between the various nodes 100 of the network, the remote coordinators 906 908 910 may be configured to consolidate the messages for both inbound and outbound traffic. In the case of inbound traffic, a remote coordinator 906 may group together messages from the nodes 916 918 920 in a cluster 912 during a Flourish phase of its schedule into one consolidated message forwarded to a control unit 902.

In another embodiment of the invention, a cluster 912 may overlap with another cluster 502 to provide redundancy of coverage for remote monitoring and control (e.g., two or more nodes may control the same equipment, a potion of infrastructure, commodity distribution network). In one embodiment of the invention, the nodes 101 within a cluster 912 may be redundant or duplicative. It should be appreciated that a cluster 912 922 930 may be constructed in a variety of configurations and still operate as intended.

Network with Three Clusters

Figure 10:
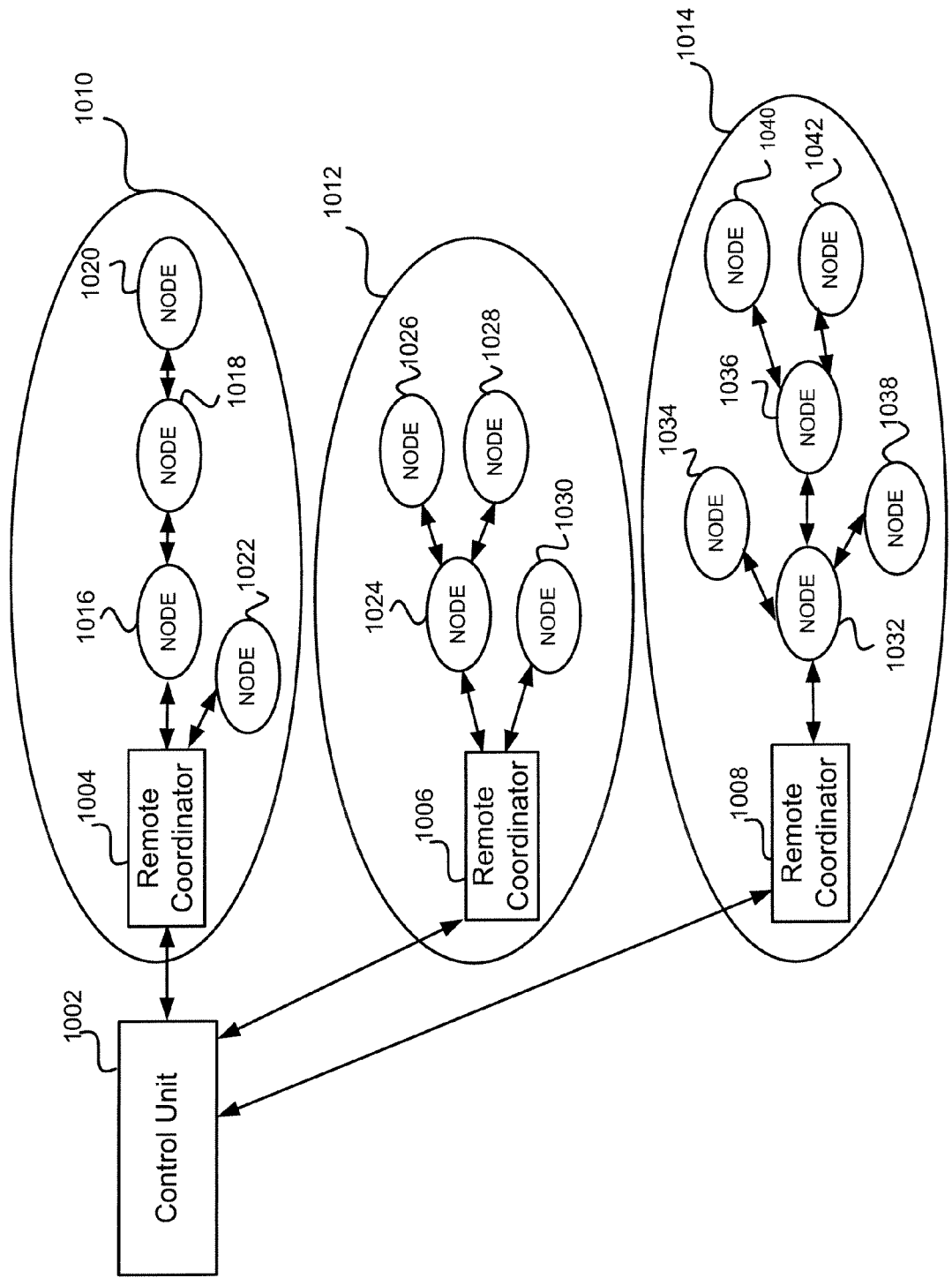
FIG. 10 depicts an overall system architecture for providing remote monitoring and control, comprising a control unit networked to three remote coordinators, according to various embodiments of the invention.

FIG. 10 depicts an overall system architecture for providing remote monitoring and control comprising a control unit 1002 networked 108 to three remote coordinators 1004 1006 1008 each networked 108 to a cluster 1010 1012 1014 comprising nodes 1016-1042, wherein at least one node 1016 acts as a relay to transmit messages from a remote coordinator 206 to a meter node 1016, according to various embodiments of the invention.

In one embodiment of the invention, node 1016 acts as a relay node 101 relaying messages from the remote coordinator 1004 to node 1018. In turn, node 1018 may act as a relay to pass messages from node 1016 to node 1020. In messages sent from the remote coordinator 1004 to the leaf node 1020 in this series arrangement, the remote coordinator 1004 may include the Meter ID of node 1016 node 1018 and node 1020. The message containing all three Meter ID may be received by node 1016 which may remove its Meter ID, send an ACKNOWLEDGE message to the remote coordinator 1004, and may pass the message now containing the Meter ID for node 1018 and node 1020 to node 1018. Node 1018 may receive the message containing the Meter ID for node 1018 and node 1020, send an ACKNOWLEDGE message to node 1016, remove its Meter ID, and may pass the message now only containing the Meter ID for node 1020 to node 1020. Node 1020 may receive the message and send an ACKNOWLEDGE message to node 1018.

In another embodiment of the invention, node 1024 acts as a relay node 101 relaying messages from the remote coordinator 1006 to nodes 1026 and 1028. In messages sent from the remote coordinator 1006 to the leaf node 1028 in this series arrangement, the remote coordinator 1006 may include the Meter ID of node 1024 and node 1028. The message containing all three Meter ID may be received by node 1024 which may remove its Meter ID, send an ACKNOWLEDGE message to the remote coordinator 1006, and may pass the message now containing the Meter ID for node 1028 to node 1028. Node 1028 may receive the message containing the Meter ID for node 1028, send an ACKNOWLEDGE message to node 1024, remove its Meter ID, and send an ACKNOWLEDGE message to node 1024.

In another embodiment of the invention, node 1032 acts as a relay node 101 relaying messages from the remote coordinator 1008 to nodes 1036. In turn, node 1036 may act as a relay to pass messages from node 1032 to nodes 1040 and node 1042. In messages sent from the remote coordinator 1008 to the leaf node 1042 in this series arrangement, the remote coordinator 1008 may include the Meter ID of node 1032 node 1036 and node 1042. The message containing all three Meter ID may be received by node 1032 which may remove its Meter ID, send an ACKNOWLEDGE message to the remote coordinator 1008, and may pass the message now containing the Meter ID for node 1036 and node 1040 to node 1036. Node 1036 may receive the message containing the Meter ID for node 1036 and node 1040, send an ACKNOWLEDGE message to node 1032, remove its Meter ID, and may pass the message now only containing the Meter ID for node 1040 to node 1040. Node 1040 may receive the message and send an ACKNOWLEDGE message to node 1036. In this manner, a node 101 may act as a relay node 101 for one than one node 101.

Figure 11:
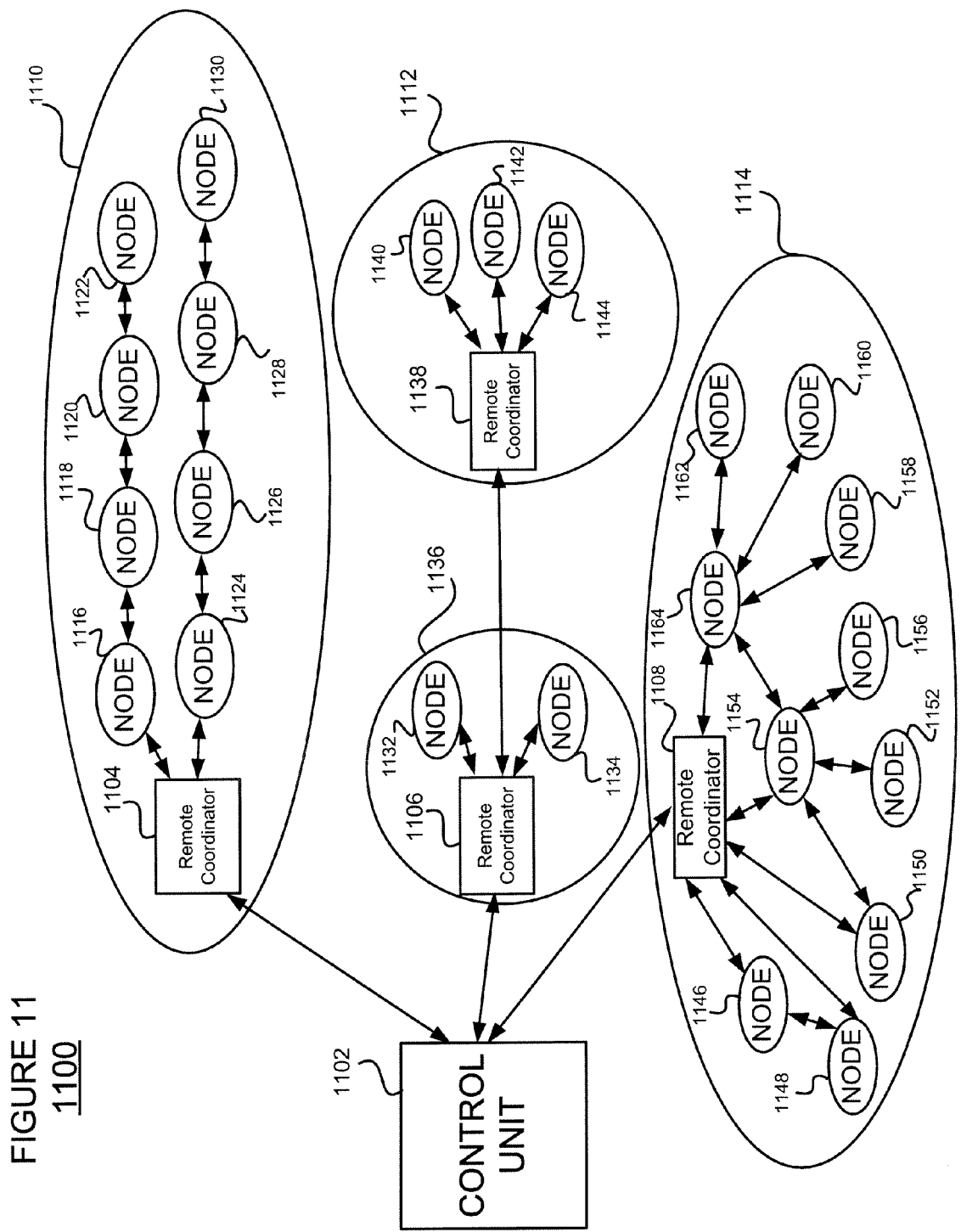
FIG. 11 depicts an overall system architecture for providing remote monitoring and control comprising a control unit networked to three four coordinators each networked to a cluster comprising nodes, according to various embodiments of the invention.

FIG. 11 depicts an overall system architecture for providing remote monitoring and control. The system has a control unit 1102 networked via the network 108 to four coordinators 1104 1106 1108 1138 each networked via the network 108 to a cluster 1110 1112 1114 1136 comprising nodes 101, wherein at least one remote coordinator 1106 acts as a relay to transmit messages from a control unit 1102 to a first cluster 1106 to a second remote coordinator 1138 of a second cluster 1112, according to various embodiments of the invention.

In one embodiment, a control unit 1102 may send a message to a first remote coordinator 1106 comprising the PANID for both a first remote coordinator 1106, a second remote coordinator 1138, and a leaf node 1140. The first remote coordinator 1106 may received the message, may remove PANID from the message, forward the message onto the second remote coordinator 1138 via the network 108, and send an ACKNOWLEDGE message to the control unit 1102. The second remote coordinator 1138 may receive the message comprising the PANID of the second remote coordinator 1138 and the leaf node 1140. The second remote coordinator 1138 may remove may be PANID from the message, forward the message onto the leaf node 1140, and send an ACKNOWLEDGE message to the first remote coordinator 1106 the network. The leaf node 1140 may receive the message, execute the command, and send an ACKNOWLEDGE message to the second remote coordinator 1138 the network. The leaf node 1140 may also collect meter usage information and send a message to the control unit 1102 the network along the same path.

Commodity Distribution Network

Figure 12:
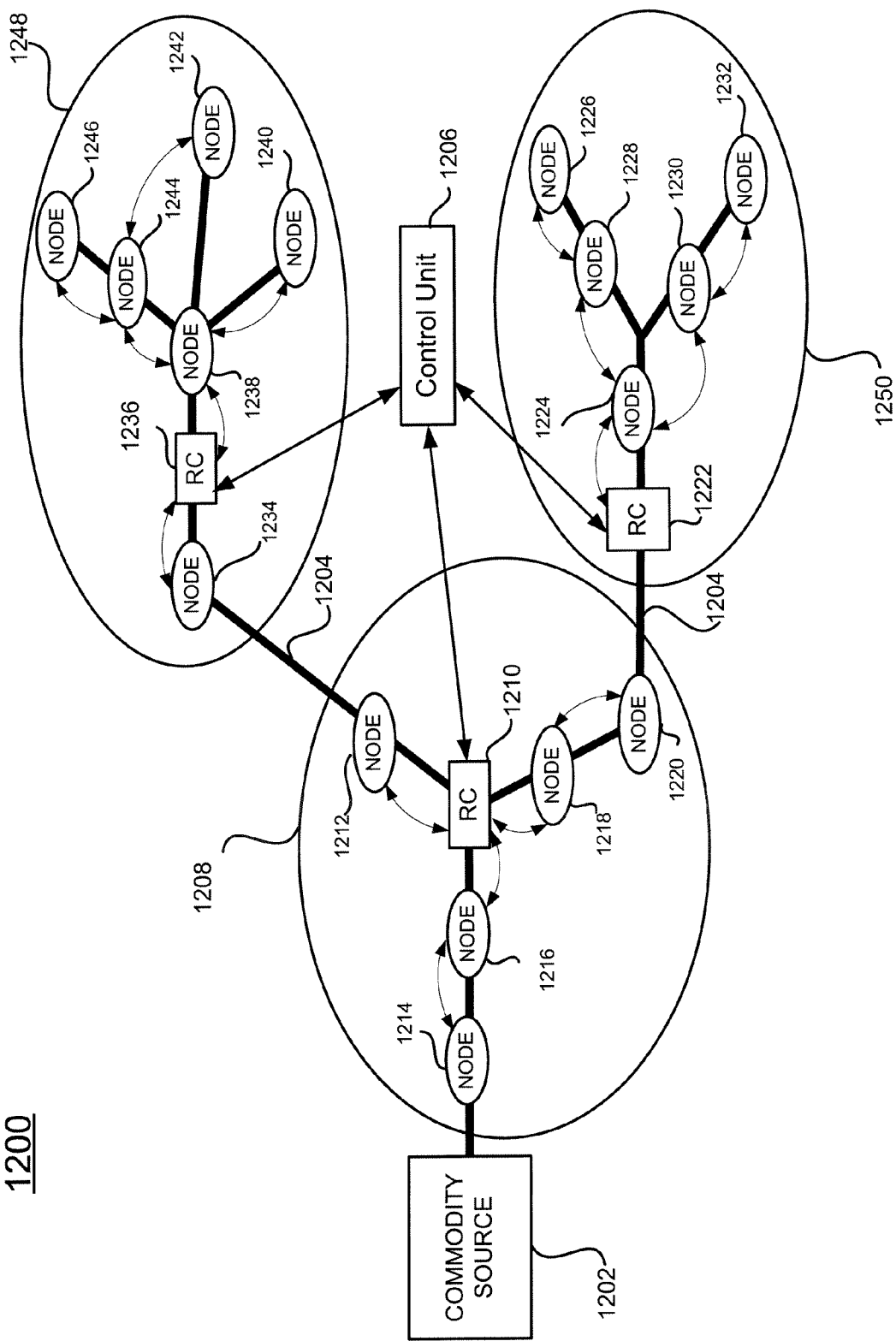
FIG. 12 depicts an overall system architecture for providing remote monitoring and control over a commodity distribution network, comprising a control unit networked to three remote coordinators, each networked to a cluster comprising nodes, according to various embodiments of the invention.

FIG. 12 depicts an overall system architecture for providing remote monitoring and control over a commodity distribution network 1204 comprising a control unit 1206 networked 1204 to three remote coordinators 1210 1222 1236 each networked 1204 to a cluster 1208 1248 1250 comprising nodes 101, according to various embodiments of the invention. Each node 101 may monitor or control a portion of the commodity distribution infrastructure (e.g., a section of oil pipeline, a sewage line, irrigation channel, transformer).

The system and method described herein may be adapted to monitor and control the status and operation of an oil pipeline (e.g., commodity supply network). A control unit 1206 may be located at the oil fields (e.g., source of the commodity). The control unit 1206 controls the distribution and monitors the status of the deli of the oil (e.g., delivery of the commodity). The control unit 1206 may monitor or control at least one cluster 1250 comprising at least one remote coordinator 1222 and at least one node 1224 installed long the length of a pipeline (e.g., oil) via a wireless network 1204. As shown in FIG. 8 a plurality of remote coordinators 104 may monitor or control a plurality of nodes 101 installed along the length of the oil pipeline. Each remote coordinator 104 may monitor or control a plurality of nodes 101 in a cluster 102. Each cluster 102 may be arranged along branch points and side pipelines from the main pipeline. A remote coordinator 104 may also relay information (e.g., status, commands, messages) from the control unit 106 to a node 101 within their cluster and between other remote coordinators. Several nodes 101 within the system may be integrated into equipment. For instance, a node 101 may comprise a programmable logic controller (PLC) to open and closing of valves installed in the pipeline (e.g., stop and start the flow of the oil). The system and method installed on the pipeline may allow for the remote control and monitoring of the oil pipeline network and to detect and quickly repair damage.

In one embodiment, the remote coordinator 1236 may act in accordance with preprogrammed emergency protocol in response to ALARM messages. For instance, in one non-limiting example, a sensor 214 may detect damage to the commodity distribution network 1204, the sensor 214 may send the information to the processing module 202 in node 1246 which generates an ALARM message that may be sent to the transceiver 208 and sent the network 108 to its parent node 101, node 1244. Node 1244 may receive the ALARM message from node 1246 and forward the message the network 108 to node 1238 and send an ACKNOWLEDGE message to node 1246. Node 1238 may receive the ALARM message forward it via the network 108 to the remote coordinator 1236 and send an ACKNOWLEDGE message to node 1244. The remote coordinator 1236 may receive the message and send an ACKNOWLEDGE message to node 1238. The remote coordinator 1236 may send a COMMAND message to node 1246 to shut off the flow of a commodity through a commodity distribution network 1204 in response to the disruption in the commodity flow via the same message path. The remote coordinator 1236 may forward the ALARM message to the control unit 1206.

FIG. 12 depicts an overall system architecture for providing remote monitoring and control over a commodity distribution network including but not limited to oil pipeline, gas lines, telephone lines, electricity lines, cable networks, telephone line networks, gas pipelines, or water lines, according to various embodiments of the invention. Each node communicates the status of the portion of the commodity distribution infrastructure with a remote coordinator that collects, processes, and, optionally stores the information that may be communicated with the control unit.

Exemplary Network Tree

Figure 13:
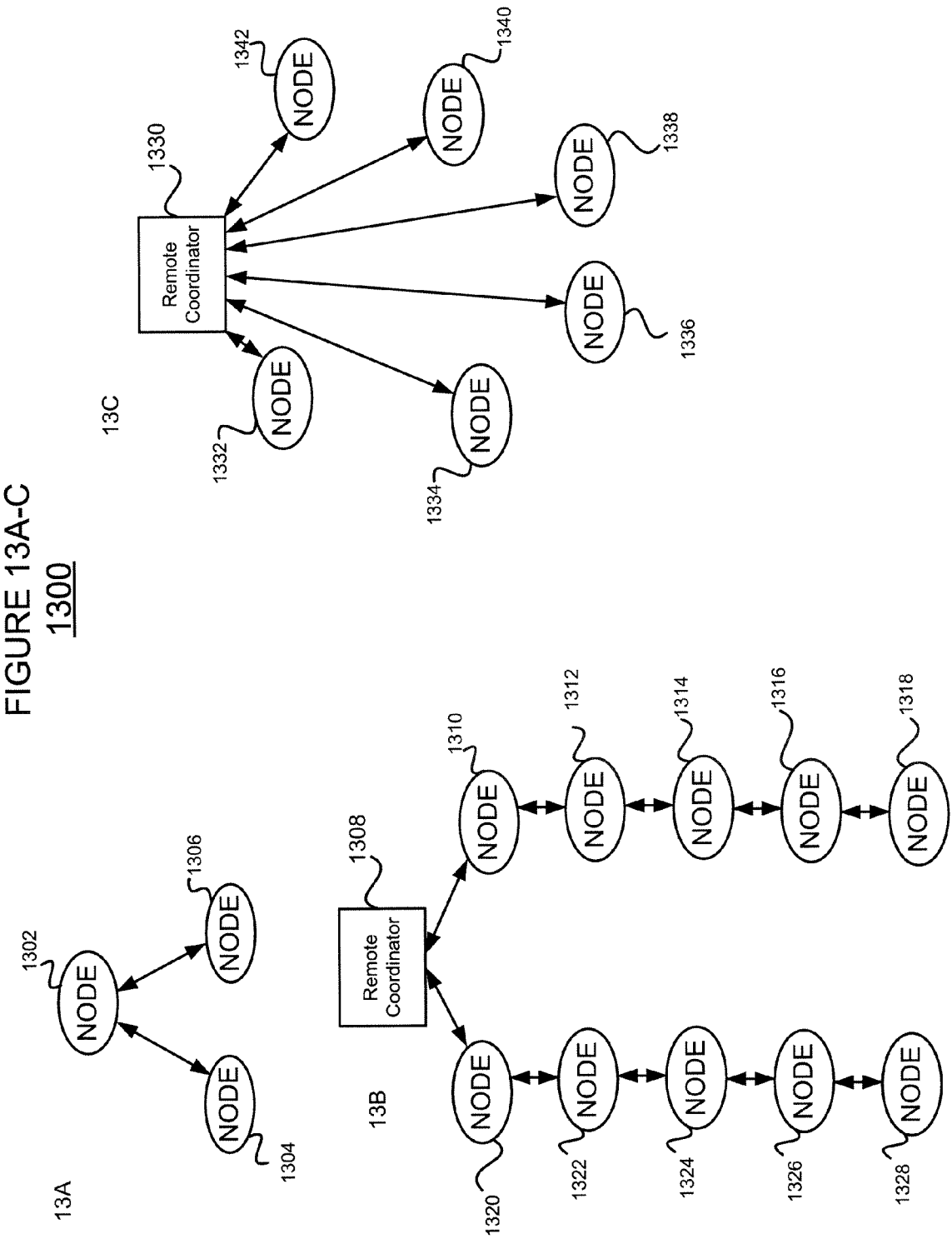
FIG. 13A depicts an illustrative simple tree network comprising a parent node networked with two child nodes, according to various embodiments of the invention.
FIG. 13B depicts an illustrative deep tree network comprising a remote coordinator 104 networked to two series of nodes, according to various embodiments of the invention.
FIG. 13C depicts an illustrative broad tree comprising a remote coordinator networked to five nodes in parallel, according to various embodiments of the invention.

FIG. 13 depicts illustrative elements a simple tree network, deep tree network, and a broad tree network. FIG. 13A depicts an illustrative simple tree network comprising a parent node networked with two child nodes. In one embodiment, each node 1304 1306 may have one (1) parent node 1302. FIG. 13B depicts an illustrative deep tree network comprising a remote coordinator 1308 networked to two series of nodes 1320 1322 1324 1326 1328 and 1310 1312 1314 1316 1318. FIG. 13C depicts an illustrative broad tree comprising a remote coordinator 1330 networked to five nodes 1332 1334 1336 1338 1340 1342 in parallel, according to various embodiments of the invention.

In one embodiment of the invention, a network 108 may construct itself as a tree of nodes 101. The total number of nodes 101 in a network 108 may vary according to the depth of the network due to a 128 byte payload limit of an 802.15.4 message. In one embodiment, a deep tree may require more time to flourish, as many hops are required to reach the last node (leaf) at the edge of the tree. In another embodiment, broad tree may require fewer hops, but may be subject to more transmission collisions since many sibling children may try to get the attention of their parent. Generally, a node 101 at the end of a network 108 path may be referred to as a "leaf node."

Exemplary Network Tree

FIG. 14 depicts an illustrative an exemplary network 108 during a Flourish Phase (FIG. 14A) when the remote coordinator 1402, relay nodes 1404 1405, and nodes 1406-1428 may be active. FIG. 14B shows the same exemplary network during a Dormant Phase when the remote coordinator 1402 and relay nodes 1404 1405 may be Dormant and the nodes 101 may be in sleep node, according to various embodiments of the invention.

To conserve battery power in the nodes 101, the network 108 may be generally dormant. The life span of the network 108 may be scheduled by a remote coordinator 1402 such that nodes 1406-1428 may be actively on the network less than one percent of the time. During that time (called the flourish phase) each node 1406-1428 may send a message comprising meter readings, its status, alarms (if any), and may receive commands. The combination of a dormant phase and a flourish phase is called a cycle. The reason the word "dormant" is used rather than "sleep" is because the Remote coordinator 1402 and routing nodes 1404 1405 do not sleep but may stay powered on and may communicate with one another.

Systems running on battery power may conserve their energy. In one embodiment, the processing module 202 operates a software application that may allow one (1) node 101 to be transmitting at a time each node 101 may listen for silence before it may transmit a message. The more traffic in the area of the node 101 the more collisions may result in slower communications to and from that node 101 (and its children). The longer the delays of any node 101 the longer the nodes 101 along its path may stay awake. A remote coordinator 104 may choose to split the tree network into a set of sub-trees (branches) to minimize the effect of the whole network having to wait for a few slow paths. In one embodiment, the software application is 802.15.4 MAC.

Radiant Configuration Protocol (RCP)

In one embodiment of the Radiant Configuration Protocol the whole network tree comes up every time from scratch via a distributed local protocol where nodes 101 may go to Flourish Phase simultaneously and listen for messages. In another embodiment, subtrees of the whole network tree are scheduled to become active at separate times to reduce collisions. Such subtree partitioning may be dynamic and may be ordered by any parent of more than one child.

In one embodiment, the remote coordinator 1402 may construct a spanning tree for routing based on path messages. The spanning tree may be dynamically extensible allowing messages to be sent to nodes it knows routes for early on without waiting for the whole tree to report. In one embodiment, the Radiant Configuration Protocol allows for late corners (known as orphans) to be added to tree and serviced. In another embodiment, the ACKNOWLEDGE message of path enables each node to enter operational phase. In another embodiment, a receipt of path trace may be followed by sending a ACKNOWLEDGE message to the child node comprising source address (parent), opaque ID of this transaction, and acceptance or denial of adoption.

Network 108 Topology

The networks 108 formed using the Radiant Configuration Protocol described herein may be connectable as MESH networks. The mesh of nodes 101 may not fully connected nor are they randomly connected. Although each instance of the network connections formed may be different, it takes the topology of a tree, and the route from the remote coordinator 104 to each node 101 may be an explicit path. The concepts of tree and path are taken from graph theory in mathematics.

One active Remote coordinator 104 may be in each network and may be its root. The remote coordinator 104 may communicates with the control unit 106 where resides the user interface that may issues command messages and responses to alarm messages.

In one embodiment, a node 1405 may act a repeater and may be referred to as a routing node 1405. In one embodiment, a routing node 1405 may not coupled to equipment. A routing nodes may have at least one 802.14.5 interface. Routing nodes 101 may be always powered on. In another embodiment, a routing node 101 may be coupled to a constant power source.

In another embodiment, a node 101 may be coupled to a meter or equipment as shown in FIGS. 3, 4, 5, and 6. A node 101 may comprise contains an 802.14.5 RF section, a processor, and meter interface circuitry. The interface circuitry to each type of supported meter may be different. In one embodiment, each node 1410 1412 may have one parent node 1408 and may trace a message path to the remote coordinator 1402 to construct a network tree. Each communication path may be considered an "edge" in graph theory. Edges of a tree may differ between instances of the tree, as they are formed each time the network awakes. It may be seen that in a typical tree of N nodes there may be a total of (N−1) connections/edges. The only way fewer edges may form may be there are orphan nodes 101.

An orphan may be an unconnected node 101, for example a node 101 that may be not connected to the network 108. Since connections are formed each flourish phase it may be possible that some nodes 101 which connected in previous cycles do not connect. There may be possible conditions that might result in a connection failures that cause a change in the quality of the radio signals impinging upon the antenna 210 of the orphan node 101. Many of these conditions may be temporary, and therefore the orphan node 101 may rejoin the network 108 when the condition ceases.

One PAN-ID Per Tree

The IEEE 802.14.5 standard introduces the notion of a unique identifier for a network. The typical network this standard deals with may be a Wireless Personal Area Network (WPAN) and the unique network identifier in the standard may be called the PAN-ID. One PAN-ID may be allowed per cluster. In another embodiment, one PAN-ID may be allowed per remote coordinator 104. The PAN-ID may be programmed into each node 101 during installation time.

In one embodiment, a network path may be the set of hops a message may travel from a source to a destination. In another embodiment, a path trace may be the list of hops a message may travel from a source to a destination. A path trace may be constructed each instance of a flourish phase for each node, and may be used for routing.

In one embodiment, a network paths may be acyclic (e.g., not-a-cycle). Topologically, a cycle may be formed when a path may be formed where a node 101 appears more than once. Alternatively, a path may be formed which begins and ends in the same node 101 that may result in a "livelock" where each node 101 in this (topological) cycle would be constantly passing the same messages around in a circle. In one embodiment, nodes 101 may test for such routing loops (cycles) as paths are constructed.

Path Types—Messages May Use any One of the Following Types of Paths.

Broadcast Message

A broadcast message may be transmitted by a first node 101 to notify any second node 101b within listening range of the existence of the first node 101a. In one embodiment, this is called an "I AM" message. Any second nodes 101b within range may record the signal strength of this message and of other messages they receive. This may allow nodes to choose a parent. The message may be transmitted at a power sufficient for the first node 101a to be able to sustain for the duration of a flourishing phase but not high enough that it may create orphans.

Parent to Child

In one embodiment, a path consists of one hop. Parent nodes 101 may use this path type to transmit a message, for example to disown or to deny adoption of an orphan node 101. 101. In a further embodiment, messages may be distributed to children depth-first. That is, in each sub-tree (partition) leaf nodes may be serviced first, followed by its parents, up to the remote coordinator 104.

Child to Parent

In another embodiment, a message may travel only a single hop. For example, such a path may be used after children select their parents and notify them. Message that use this path are acknowledged with a parent-to-child acknowledgement.

Remote Coordinator 104 to Node 101

In a further embodiment, a remote coordinator 104 constructs a spanning tree for each instance of a flourish phase. Message that may use this path may be acknowledged with a node 101-to-remote coordinator 104 ACKNOWLEDGE message.

Node 101 to Remote Coordinator 104

In a further embodiment, a node 101 may use this path during construction of the path trace, to report alarms, or meter status. Message may use this path are acknowledged with a remote coordinator 104-to-node 101 ACKNOWLEDGE message. In one embodiment, a node 101 may not communicate with another node 101 except as discussed herein. In another embodiment, a first node 101 may communicate with any second node 101.

WPAN Network Timeline

The configuration sub-phase may be begun by the nodes 101 waking up at the same time. Each node 101 may be discovered and message routing paths may be determined. The operational sub-phase begins for a node 101 as soon as its path to the remote coordinator 104 may be acknowledged. The operational sub-phase may be where the remote coordinator 104 may initiate commands and schedules to individual nodes. It also when maintenance may be carried out and alarms are propagated. The remote coordinator 104 determines when the shutdown sub-phase begins. When each node 101 may have gone to sleep the network enters the dormant phase of the next cycle.

Dormant Phase

Remote coordinators 104 and routing nodes may always be powered on and listening, so they are not powered down during Dormant phase. They may not be in constant contact with the nodes 101, but may be idle most of the time.

Remote Coordinators 104 During Dormant Phase

The following tasks may be accomplished by remote coordinators 104 in the dormant phase.

Generate reports on demand—The control unit 106 may not generally aware of when the whole network was last awake. However it may request status of any nodes on the network. All data provided to the control unit 106 may be time-stamped so that the user at the control unit 106 may know the freshness of the data.

Queue up commands for next flourish phase—The timeline of the network may be the responsibility of the Remote coordinator 104. The control unit 106 may issue any number of commands which may be executed next flourish phase. Examples of commands are may change to the schedule, valve actuations, or maintenance actions.

Process command results from last cycle (immediately following sleep directive)—Immediately following a flourish phase the first order of business may be to validating redundant alarms and may pass some of them onto the control unit 106. This may be because later alarms may override earlier alarms due to late arriving nodes and network congestion.

Listening for rogues—The 802.15.4 receiver may be left on to detect any unexpected traffic. Unexpected traffic may include a valid node which may have lost its schedule. It may also include security threats. Both cases are reported to the control unit 106 as alarms.

Redundancy synchronization—Redundancy may allow a backup remote coordinator 104 to automatically come on line in the event of a loss of service due to an equipment failure or maintenance action. This may require the backup to stay in sync with the live node to accommodate a live switch-over. This feature may be optional and for the future. IPv6 may be used as a networking layer, to take advantage of existing protocols used in the TCPIP/UDP industry. The remote coordinator 104 may be connected directly to an IP interface.

Routing nodes during Dormant Phase—Routing nodes 101 need not communicate with nodes 101 during dormant phase. However, if redundancy may be supported they may be in communication to synchronize with their redundant copy to facilitate a live switch over in case of failure or maintenance.

Listening for rogues—The 802.15.4 receiver may be left on to detect any unexpected traffic. Unexpected traffic may include a valid node which may have lost its schedule. It may also include security threats. Both cases are reported to the control unit 106 as alarms.

Redundancy synchronization—Redundancy may allow a backup remote coordinator 104 or Routing node to come on line in the event of a failure or maintenance action. This requires the backup to stay in sync with the live node to accommodate a live switch-over. This feature may be optional and for the future. IPv6 may be used as a networking layer, to take advantage of existing protocols used in the TCPIP/UDP industry. Routing nodes have only 802.15.4 interfaces and so need to support IP, for example by using the CAP protocol.

Nodes during Dormant Phase—The dormant phase may be so named because all the nodes are presumed to be asleep. Node processing module 212 may run without communicating on the network 108. This may allow the node 101 to accomplish certain independent tasks.

Clock Drift Adjust—Each node 101 may comprise a synchronization element 212 that enables software to track time. The synchronization element 212 may be a clock that may be used to wake up the processor from sleep, among other things During each flourish phase the nodes 101 may resynchronize to the same reference time. A node 101 may estimate how much it drifts by accumulating the variance between its clock with the "official" clock at the remote coordinator 104. It may often be necessary for a node 101 to awaken during dormant phase and correct for calculated clock drift, enough to may allow the next wake up to occur synchronized with its neighbors, and then go back to sleep. This sequence may be repeated as often as may be necessary to compensate for clock drift.

Meter Assessment—If a customer wants a meter reading e N units of time and N<cycle time, the processor may periodically wake up and take a meter reading and store it away (if there may be a change from last reading) with a timestamp on an outgoing message list. When the next flourish phase arrives, the node may automatically report all this data to the remote coordinator 104.

Alarm Assessment—Alarms may occur at any point in the life of a Node. Some may occur during flourish phase and other during dormant phase. In dormant phase, the following alarms may be assessed either because they may cause the node to awaken (interrupt) or because it was audited during a pre-scheduled clock drift adjustment or meter assessment. Alarms may be time-stamped and placed at the head of the outgoing message list. A side effect may be that the latest alarm may be reported first, allowing the remote coordinator 104 and control unit 106 to unwind the alarm's history if it escalated during dormancy.

Battery Voltage Low—A low battery alarm may be emitted when the battery may have only enough power to survive less than 48 hours at the nodes current level of operation.

Check for Tampering—If the node module may have been opened or otherwise fiddled with some sort of switch opening may be noted and an alarm sent.

Valve Position Alarm—If the valve position may be not the same as the desired position an alarm may be emitted. The valve position may be determined without resorting to waiting for the meter to log another 1000 gallons of flow using valve and energy harvesting device status along with meter data.

Checks for Leaks—If the volume of water being used may be unusually high for a long period of time (user settable threshold) an alarm may be generated.

Scheduled Wake Up for Next Flourish Phase—The last action in dormant phases may change the state of the Node into flourish phase. A timer was armed according to the estimated PAN clock and the schedule commanded last flourish phase. A new network instance forms itself using the Radiant Configuration Protocol.

Flourish Phase Summary—Generally, all nodes in a (PAN) subtree network power up their RF receivers for the duration of the flourish phase. The network constructs itself anew each cycle in the flourish phase, where any given node 101 may choose a different parent than it had last cycle. The flourish phase may be subdivided into three sub-phases. Sub-phases do not overlap within a single node, however any two nodes in a PAN may be in separate sub-phases depending upon their needs and their timing. Each sub-phase may be further divided into polyphases. Polyphases may overlap within a sub-phase of a single node 101.

Ephemeral—Any tree that may be generated may be guaranteed only to last for that instance. The network's structure may not persist across network instances due to may change in many dependent variables including but not limited to battery levels, RF signal propagation properties, interference, clock drift, and temperature differences. The Remote coordinator 104 declares the start and finish of each flourish phase. Each node 101 may be synchronized in time to be listening for the remote coordinator 104 to initiate configuration. The remote coordinator 104 decides when to stop the flourish phase which leaves when all nodes are sleeping or a timeout.

Configuration Sub-phase—Configuration may be accomplished with a new protocol called the Radiant Configuration Protocol (RCP). It is called "Radiant" because messages are emitted from the remote coordinator 104 outward to the extremities of the network, and often "reflect" from the leaves of the network back towards the center. Main characteristics of RCP may be that the whole tree comes up new each time from scratch. RCP is a distributed routing protocol. It builds routes with nodes 101 only needing to know their direct neighbors (parent and children). Topologically the configuration treats nodes as if they were in a mesh, where each node listens to all other nodes. The nature of the configuration protocol is such that the mesh may be reduced to subtrees, each ultimately using the remote coordinator as the root.

Dormant phase meter readings may occur periodically. If a customer wants a meter reading e N units of time and N<cycle time, the processor may periodically wake up and take a meter reading and store it away (if there may be a change from last reading) with a timestamp on an outgoing message list.

In one embodiment, the remote coordinator 104 may declare the start and finish of each flourish phase.

With reference to FIG. 14A, a remote coordinator 1402 (root node) may start a Flourish Phase by issuing an "I AM" message comprising the following information Source address (remote coordinator 104 always=1) and Order number (remote coordinator 104 always=1). The path quality value of the I AM message may be constructed as which may be the lowest RSSI yet encountered along the chain. If a node 1410 receives an I AM message with an RSSI lower than the path quality it inserts that path quality into the chain. This may allow leaves to select the strongest overall path, even when their closet neighbor/parent-(candidate) may be quite strong (e.g., node 1408). The I AM message may also include time synchronization data to allow the processing module 202 in a node 1410 to synchronize its synchronization element 212 with other nodes 1406-1408 and 1412-1428 in the network 108. The nodes 1406-1428 in the network 108 ("listeners") may record the source address, order, and signal strength. In one embodiment, the remote coordinator 1402 may emit a maximal path quality number since it communicates with the control unit 106 under different conditions.

In FIG. 14A, the remote coordinator 1402 may broadcast an "I AM" message that may ripple through the mesh from the center (e.g., remote coordinator 1402) outwards to the outmost leaf nodes (e.g., 1410 1428 1426 1424.) The nodes 1406-1428 in the network 108 listen for an "I AM" message until no more are heard. In one embodiment, no need exists for the network 108 to account for late corners because if a node 101 wakes up after the routing tree 1402 may be constructed it may present itself as an orphan node discussed in detail in FIG. 16D. Further, if a node 1410 wakes up before the path trace has already been sent up then let it be added, it may come with a whole path of other nodes behind it.

If no "I AM" message may be detected after a time period the node 1410 issues the ORPHAN message ("I AM" message with Order=0). In one embodiment, the processing module 202 may run a Time Out program logic to measure the amount of time between the beginning of a Flourish Phase and the time that an I AM message may be received by a node 1410. In one embodiment of the invention, the Time Out function of program logic in the processing module 202 may send an ORPHAN message via a transceiver 208 over the network 108 after at least about 1, 2, 3, 4, 5, 6, 7, 8, 9, or 10 milliseconds. In one embodiment of the invention, the Time Out function of program logic in the processing module 202 may send an ORPHAN message via a transceiver 208 over the network 108 after at least about 1, 2, 3, 4, 5, 6, 7, 8, 9, or 10 seconds. In a further embodiment, the Time Out function of program logic in the processing module 202 may send an ORPHAN message via a transceiver 208 over the network 108 after at least about 1, 2, 3, 4, 5, 6, 7, 8, 9, or 10 minutes.

If a node 1408 receives an ORPHAN message it may respond to the orphan node 101 with JOIN message. In another embodiment, a remote coordinator 1402, routing node 1405, or control unit 106 may received the ORPHAN message and send the JOIN message that synchronization data to allow the orphan node 1410 to re-synchronize with the network 108.

Again in reference to FIG. 14A, a node 1420 may chose a parent node 1418 by examining each recorded I AM message. If the node 1420 receives the I AM message of a signal strength that may be at least above a reliability threshold, the node 1420 may issue "I AM" message including Order=chosen parent order+1, and path quality value. In one embodiment, the node 1418 with lowest order numbered "I AM" message may be heard as parent. If signal strength is below threshold the node 1420 may wait until issuing their own "I AM" message. In one embodiment, the wait period duration is inversely proportional to signal strength. In one embodiment of the invention, the wait period duration may be at least about 1, 2, 3, 4, 5, 6, 7, 8, 9, or 10 milliseconds. In one embodiment of the invention, the wait period duration may be at least about 1, 2, 3, 4, 5, 6, 7, 8, 9, or 10 seconds. In one embodiment of the invention, the wait period duration may be at least about 1, 2, 3, 4, 5, 6, 7, 8, 9, or 10 minutes.

In one embodiment, the strongest "I AM" message received by node 1420 may be chosen to be its parent, here node 1418. The leaf nodes 1420 may then issue a PATH TRACE message comprising the source address of leaf node, an opaque ID created by leaf to use to track trace and it finds its way to remote coordinator 1402, and synchronization parameters to its parent node 1418. In one embodiment of the invention, a node that has a parent but no children may be a leaf node (e.g., nodes 1420, 1424, 1428, 1426, 1410). In one embodiment, the PATH TRACE messages adaptively travel towards the center recording each hop. For example, the PATH TRACE message may be sent by node 1420 to node 1418.

Node 1418 may received the PATH TRACE message from node 1420 and may send an ACKNOWLEDGE message to node 1420 which may act as an adoption message for the orphan node 1420. Node 1418 may forward the PATH TRACE message including its own source address to the relay node 1405. The relay node 1405 may received the PATH TRACE message from node 1418 including the source address for both node 1420 and node 1418 and may send an ACKNOWLEDGE message to node 1418. The relay node 1405 may forward the PATH TRACE message to the remote coordinator 1402. The remote coordinator 1402 may receive the PATH TRACE message including the source address of the relay node 1405, node 1418, and node 1420 and may send an ACKNOWLEDGE message to the relay node 1405. The remote coordinator 1402 may send a SCHEDULE message to the leaf node 1420 in reverse path including synchronization data.

Node 1420 may either accept or deny node 1420 as its child. The acceptance of based on a cycle was detected by the parent in the so-far constructed path, available resources, sufficient memory. In one embodiment, if there are more nodes 101 in the trace than another child the other child may be disowned. A DISOWN message may be received from a parent tells the child to choose the next best parent if any. If no other parents are available it sends an ORPHAN message.

If parent candidate denies adoption or does not respond, node 1420 may send path trace to next best parent, if any. If no other parents are available return trace message to child, node 1420 may backtrack path trace and try another using similar routing as command routing PDU—a wormhole list that may be built from leaf to root. An opaque ID generated by the leaf node may be used as an identifier. The accumulated ordered list of leaf to root tuples is called a PATH TRACE.

In another embodiment, if ACKNOWLEDGE message for the path come back toward leaf with a pass or fail. The leaf node may look for another parent. If no other parent available: acknowledge child with a failure ORPHAN message periodically.

Exemplary Flourish and Dormant Phases

FIG. 15 depicts an illustrative an exemplary network 108 during a Flourish Phase (FIG. 15A) which may last for about 40 seconds when the remote coordinator 1502, relay nodes 1518 1519, and nodes 101 may be active. As used herein, in the "tree" network topology, "flourish phase" refers broadly to the construction and use of an ephemeral instance of the network 108 that may adaptively grow anew each cycle. FIG. 15 depicts how the above tree network 108 may look as it cycles through dormant and flourish phases. Notice how the tree network 109 may differ each cycle.

FIG. 15B shows the same exemplary network during a Dormant Phase which may last for about 1 hour when the remote coordinator 1502 and relay nodes 1518 1519 are Dormant and the nodes 101 are in sleep node, according to various embodiments of the invention. FIG. 15C is a second Flourish Phase which may last for about 55 seconds when the remote coordinator 1502, relay nodes 1518 1519, and nodes 101 may be active but the path the message travel may have changed. FIG. 15D shows the same exemplary network during a Dormant Phase which may last for about 2 hours when the remote coordinator 1502 and relay nodes 1518 1519 are Dormant and the nodes 101 are in sleep node. FIG. 15E is a second Flourish Phase which may last for about 25 seconds when the remote coordinator 1502, relay nodes 1518 1519, and nodes 101 may be active but the path the message travel may have changed.

In one embodiment, the Radiant Configuration Protocol may allow for a synchronized alternation between a the high-power usage Flourish Phase and the low-power usage Dormant Phase. This alternation between the Flourish Phase and Dormant Phase allows for great power saving and may allow the system to operate longer on battery power. In another embodiment, the Radiant Configuration Protocol utilizes redundancy of its system to allow the network 108 to avoid "orphan nodes" which are nodes that may not be connected and communicating to the network during a Flourish Phase. The orphan node may send an ORPHAN message to allow the system to ensure that all the nodes 101 in a network 108 are included in each Flourish Phase and remain synchronized with the other components of the network 108.

In one embodiment, the Flourish Phase may last at least about 1, 2, 3, 4, 5, 6, 7, 8, 9, or 10 seconds. In a further embodiment, the Flourish phase may last at least about 5, 10, 15 20, 25, 30, 35, 40, 45, 50, 55, or 60 seconds. In another embodiment, the Flourish phase may last at least about 1, 2, 3, 4, 5, 6, 7, 8, 9, or 10 minutes. In a further embodiment, the Flourish phase may last at least about 5, 10, 15, 20, 25, 30, 35, 40, 45, 50, 55, or 60 minutes. In another embodiment, the Flourish Phase may last at least about 1, 2, 3, 4, 5, 6, 7, 8, 9, or 10 hours.

In one embodiment, the Dormant Phase may last at least about 1, 2, 3, 4, 5, 6, 7, 8, 9, or 10 seconds. In a further embodiment, the Dormant phase may last at least about 5, 10, 15 20, 25, 30, 35, 40, 45, 50, 55, or 60 seconds. In another embodiment, the Dormant phase may last at least about 1, 2, 3, 4, 5, 6, 7, 8, 9, or 10 minutes. In a further embodiment, the Dormant phase may last at least about 5, 10, 15, 20, 25, 30, 35, 40, 45, 50, 55, or 60 minutes. In another embodiment, the Dormant Phase may last at least about 1, 2, 3, 4, 5, 6, 7, 8, 9, or 10 hours. In a further embodiment, the Dormant phase may last at least about 1, 2, 3, 4, 5, 6, or 7 days. In another embodiment, the Dormant phase may last at least about 1, 2, 3, or 4 weeks.

Radiant Configuration Protocol with Exemplary Messages

Figure 16A:
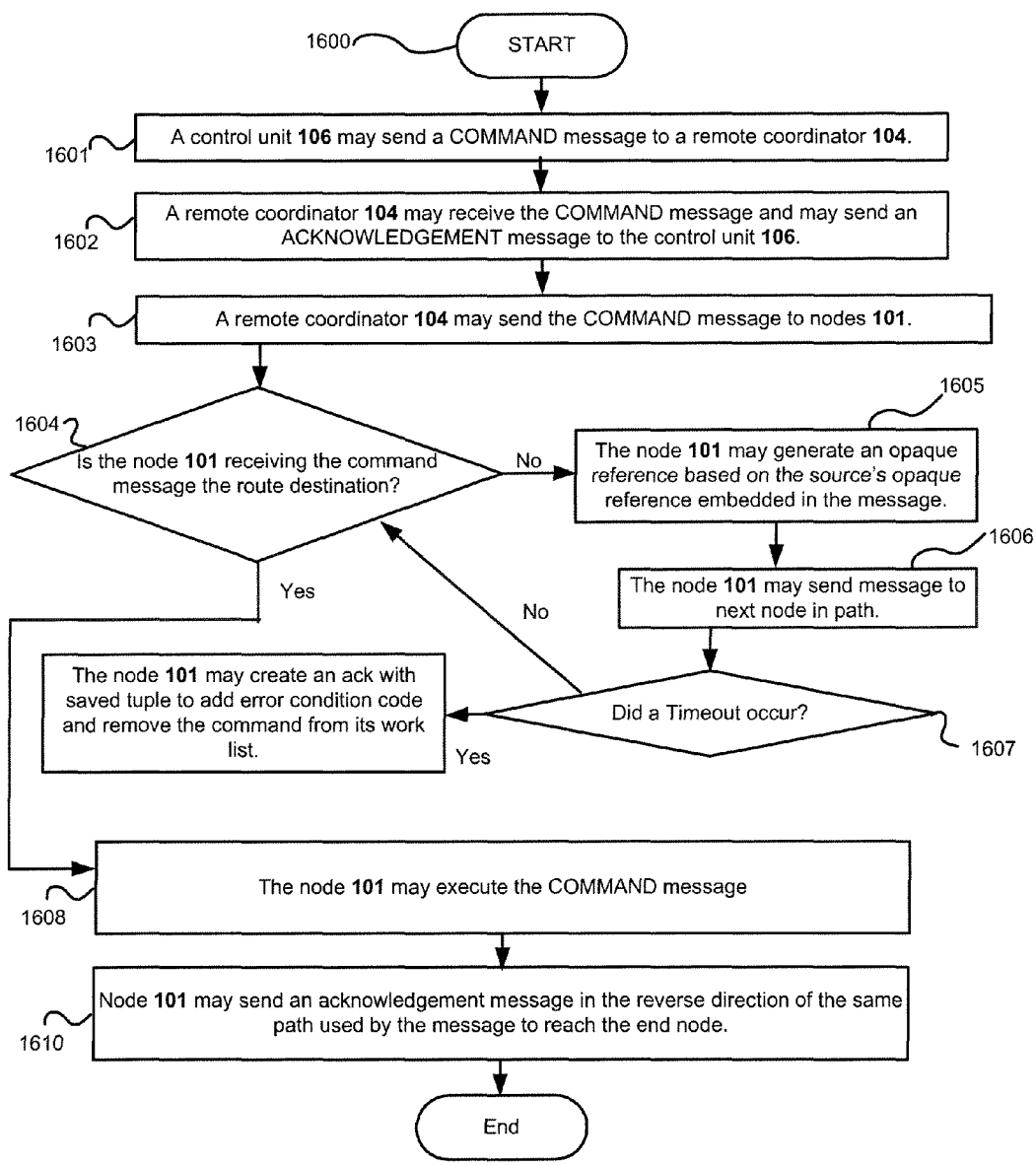
FIG. 16A depicts a flow chart showing an example of an example of a COMMAND message generated by control unit and sent to a remote coordinator and then sent via a network to a node, according to various embodiments of the invention.
Figure 16D:
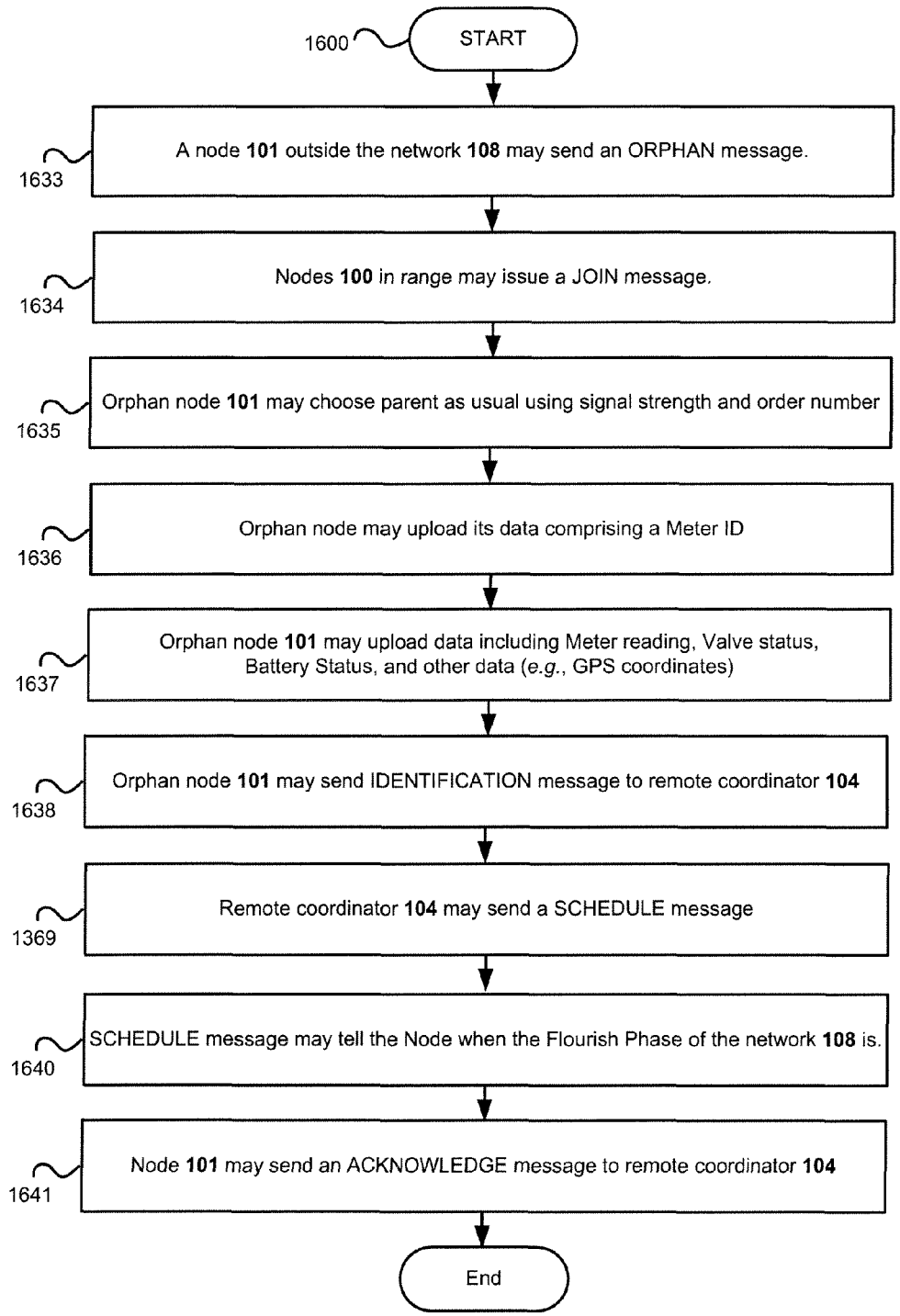
FIG. 16D depicts a flow chart showing an example of an Orphan Node adoption message into a network, according to various embodiments of the invention.
Figure 16F:
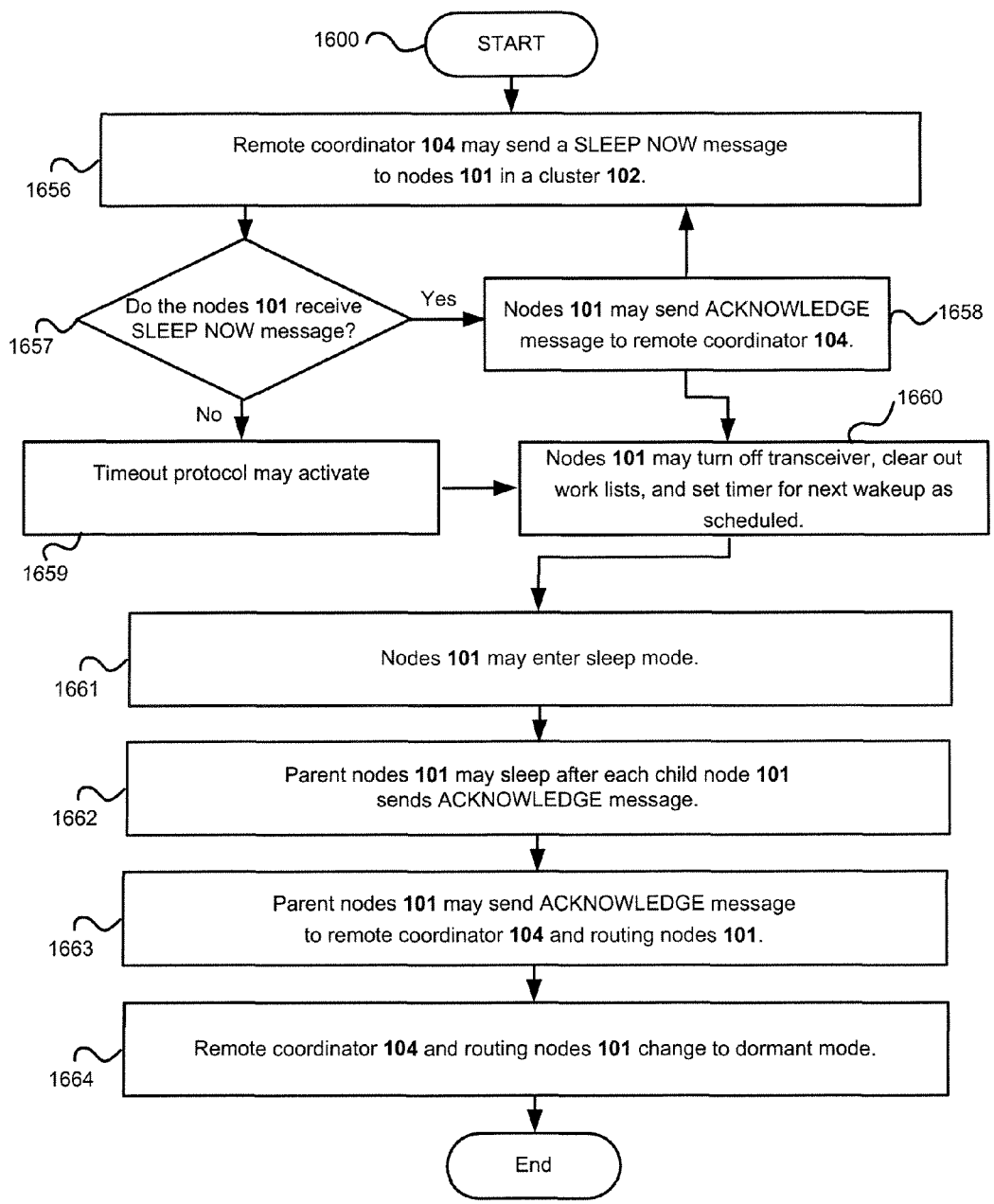
FIG. 16F depicts a flow chart showing a detailed overview of a Radiant Configuration Protocol with exemplary messages sent during the Shutdown Phase, according to various embodiments of the invention.

FIG. 16A depicts a flow chart showing an example of an example of a COMMAND message generated by control unit 106 may be sent to a remote coordinator 104 and then sent via a network to a node 101. FIG. 16B depicts a flow chart showing an overview of a Radiant Configuration Protocol showing an example of messages send during the beginning of a Flourish Phase. FIG. 16C depicts flow charts showing an overview of a Radiation Configuration Protocol showing an example of a message sent from a leaf node and traveling towards a remote coordinator 104 along a network, according to various embodiments of the invention. FIG. 16D depicts a flow chart showing an example of an Orphan Node adoption message into a network. FIG. 16E depicts a flow chart showing an example of an ALARM message generated by a node 101 and sent via a network using a Radiation Configuration Protocol to reach a remote coordinator 104. FIG. 16F depicts a flow chart showing a detailed overview of a Radiant Configuration Protocol with exemplary messages sent during the Shutdown Phase, according to various embodiments of the invention.

Radiant Configuration Protocol.

The Radiant Configuration Protocol (RCP) is a constrained mesh networking protocol which reduces an arbitrary mesh of nodes into sub-trees of nodes and tears them down again after applications messages have completed.

In one embodiment of the invention, the mesh of nodes 101 may not be fully connected nor are they randomly connected. Although each instance of the network connections formed may be different, it takes the topology of a tree, and the route from the remote coordinator 104 to each node is an explicit path.

Message Structure

The path trace family of messages may contain an ordered chain of 64-bit node addresses (terminated by a 0 address) of variable length. The path trace ordered set may be contained inside the message so it does not need to be stored by each node. Each node needs to know only their parent address and each of their children's addresses.

As path trace propagates node to node, each node prepends its address as it goes towards remote coordinator (depth decreases) and may requires buffering. The disown message may be sent to an increasing depth (toward leaf.)

A path of decreasing depth (towards remote coordinator 104) traces upward traces towards a remote coordinator 104 and a path of increasing depth path traces downward away from the remote coordinator 104 towards a leaf node 101. This may allow the same message to be used in either direction (e.g., for selection of parent, as well as deselection by disowning.) This may allow an ACK to signify message received and allows late arriving path changes to be handled by scanning the message.

The Radiant Configuration Protocol is so named because it configures a set of nodes in an arbitrary mesh into an ordered set of trees, each joined at the center root, known as the remote coordinator. The objective of the protocol is for the remote coordinator to determine a path to each node on the network and communicate over that path to obtain each node's data. The network may be built from scratch each time, and may be therefore "ephemeral". The ephemeral nature of the network means that only the remote coordinator node need to create a network map. The network coordinator 104 may be the master node in that it initiates all message passing to its child nodes. Each of those child nodes in turn may be a master of its own children, and so on, to the "leaves" of the tree which are nodes that do not have children. In general, a node issues a message only in response to its parents query. The term "radiant" may be used because the network constructs itself the center (remote coordinator node). The remote coordinator broadcasts a message which its (soon-to-be) children hears. Children in turn broadcast their own messages. The messages "radiate" outward to the leaf nodes. Leaf nodes begin the process of choosing their parents by analyzing all messages it heard. Each parent, in turn, chooses its own parent until the remote coordinator may be reached.

In one embodiment, after sending a message, a node 101 may wait at least about 1, 2, 3, 4, 5, 6, 7, 8, 9, or 10 seconds after sending a first message and before receiving an ACKNOWLEDGE message before resending the first message. In a further embodiment, sending a message, a node 101 may wait at least about 5, 10, 15 20, 25, 30, 35, 40, 45, 50, 55, or 60 seconds after sending a first message and before receiving an ACKNOWLEDGE message before resending the first message. In another embodiment, after sending a message, a node 101 may wait at least about 1, 2, 3, 4, 5, 6, 7, 8, 9, or 10 minutes after sending a first message and before receiving an ACKNOWLEDGE message before resending the first message. In a further embodiment, after sending a message, a node 101 may wait at least about 5, 10, 15, 20, 25, 30, 35, 40, 45, 50, 55, or 60 minutes after sending a first message and before receiving an ACKNOWLEDGE message before resending the first message.

In one embodiment, a transceiver 208 may send information until a handshaking-type acknowledgement may be received. Thus, rather than sleep if no COMMAND messages or acknowledgement messages may be received after transmission, a transceiver 208 relay send its information and waits for an acknowledgement message. A transceiver 208 may continue to send information and wait for an acknowledgement message until an acknowledgement message may be received. In one embodiment, a transceiver 208 accepts an acknowledgement from a remote coordinator 104 and it then becomes the responsibility of the remote coordinator 104 to make sure that the data may be forwarded to the control unit 106. In one embodiment, the remote coordinator 104 may not generate the acknowledgement message, but rather may forward an acknowledgement from the control unit 106 to a node 101. The two-way communication ability of a node 101 provides the capability for the reading device to control the operation of a node 101 and also provides the capability for robust handshaking-type communication between remote coordinator 104 and a node 101. Regardless of the normal operating mode of a node, in one embodiment, a remote coordinator 104 may instruct a node 101 to operate in a relatively continuous mode where the node 101 repeatedly takes readings and may transmit the readings to the remote coordinator 104.

COMMAND Message (FIG. 16A)

FIG. 16A depicts a flow chart showing an example of an example of a COMMAND message generated by control unit 106 may be sent to a remote coordinator 104 and then sent via a network 108 to a node 101.

Command Polyphase

The command polyphase may be where most of the daily work occurs. Messages are sent from the remote coordinator 104 throughout the network to actuate valves and take readings. Messages may also be initiated from each Node to inform the remote coordinator 104 what happened in the previous dormant phase: meter readings and alarms are sent along the with the current meter reading and alarm conditions. The command polyphase occurs at the same time as scheduling and maintenance polyphases. Other COMMAND message may pertain to the system infrastructure. A remote coordinator 104 may fine-tune a network by adjusting individual are path-based network timeouts or radio configurations and by partitioning collision prone children into separate subtrees. Commands have only one source. Unicast commands are directed to one destination. Multicast commands may be network wide or specify a path. All commands may be acknowledged. In the unicast message the acknowledgement flows along the path, being handed along hop by hop. Multicast commands result in a flurry of acknowledgements as each node 101 processes the command before handing it to its children. Each parent tracks if their children acknowledge and resend if they do not acknowledge before a configured timeout period. The remote coordinator 104 processes commands in a way that may be tolerant of repeated messages. Due to the unreliable nature of the network the same report or acknowledgment may arrive through different paths. For instance, one of the hops along a path could have been slow to process the command, causing the message to be repeated. The initiator (source address) of each command may create a unique identifier with each command. This identifier may be used to match responses and acknowledgements and may be unique within each cycle. Timestamps may be sent with all messages (not just commands). These timestamps have short life spans: they are used solely for pair-wise synchronization and so change at each hop a message takes along a path.

A control unit 106 may send a COMMAND message to a remote coordinator 104 which may be relayed along a path to individual nodes. In particular, the COMMAND message may be an alarm message or a request for meter status. Meter status COMMAND messages include but are not limited to messages to request meter reading, valve position, battery status, timestamp, or opaque transaction ID. Another COMMAND message may include a message to open or close a valve or for electricity meters, a COMMAND message to open or close a switch.

FIG. 16 depicts an exemplary command structure where each command may have a routing PDU at the beginning of the message payload using worm-hole style of addressing comprising an ordered set of nodes that may comprise the path to the destination node. The order of nodes in path from 1st hop to destination followed by a delimiter and the path list delimiter needed to demarcate it from rest of payload.

In FIG. 16A, a control unit 106 may send a command message to a remote coordinator 104. 1601 The remote coordinator 104 may receive the command message and may send an acknowledgement message to the control unit 106. 1602 The remote coordinator 104 may send the message to nodes 101 in a cluster 102. 1603 As each node 101 in the path receives the command message they may: splice off their logical address with a 16-bit and makes the payload smaller by 2 bytes each hop. If the node 101 receiving the command message may be not the route destination, the node 101 may generate an opaque reference based on the source's opaque reference embedded in the message and keep this aside tupled along with the destination node address. 1604-1605 The node 101 may count the distance in hops to the destination and set a timeout proportional to the distance. The node 101 may then send message to next node 101 in path. 1606 When the COMMAND message reaches the destination node 101, the node may execute the COMMAND message. 1608. When an acknowledgement message returns to the node, it may relay the acknowledgment message to the parent. 1609 The acknowledgment message may comprise the destination node address, the command result (e.g., valve closed, commodity usage data, switch closed), and opaque reference data. The node 101 may then remove the message from its work list. If a timeout occurs due to the node 101 being active for longer than a preset duration of time, the node 101 may create an ACK with saved tuple to add error condition code and remove the command from its work list. 1607 When the message reaches its route destination, the node 101 may execute the command message. 1608 The node 101 may add command to work list with saved opaque reference. When a command message completed, the node 101 may create and send an ACK message comprising the command result, node address, and opaque reference. 1610

Upon receipt of a command message, a node 101 may send a Command acknowledgement message. 1608 In one embodiment, a remote coordinator 104 may wait to receive a command acknowledgment message in response to a command message sent to nodes. The acknowledgment message may not contain routing information since they may percolate to the root of the tree (remote coordinator 104). Examples of command acknowledgment messages include but not limited to a acknowledgement message payload comparing the command condition, the destination node address which may not be the intended destination unless successfully routed. If a node 101 in middle of a tree times out, the node 101 may send a command acknowledgement timeout message based on tree depth (e.g., the distance in depth to destination (by scanning routing path chain) from each ancestor and opaque reference ID from original command).

In a COMMAND initiator message each node 101 automatically issues commands in outgoing command list. This acknowledgement from remote coordinator 104 follows path back to from the node 101 to the issuing remote coordinator 104 may use routing tree to establish path.

A remote coordinator 104 may also forward the a message received from control unit 106 to a node 101 and await an ACKNOWLEDGE message from the node 101. Once a node 101 response may be received, a remote coordinator 104 may forward the responses to the CIS system through a GSM modem. For each message sent by a remote coordinator 104, it may track the unique transaction ID and may expect an acknowledgments back from a node 101. If a time out occurs without an acknowledgement, a remote coordinator 104 may attempt to re-execute the failed transaction and on failure, a remote coordinator 104 may communicate the error back to the CIS system at the control unit 106 with the appropriate error message (e.g., time out, node 101 not reachable).

Exemplary COMMAND messages Re-synchronization and re-activation of the network disruptions
Flourish Phase (FIG. 16B)

In one embodiment, the radiant configuration protocol sequence begins with nodes entering flourish phase simultaneously and listening for "I AM" messages. 1611 A remote coordinator 104 emits the first "I AM" message. 1612 Nodes that may hear the remote coordinator 104's I AM message silently records it with the quality of the receive signal (RSSI). 1613 Nodes that could hear the remote coordinator 104's I AM immediately may emit their own unique I AM message. 1614 They may also pass along the RSSI they measured from the remote coordinator 104's message. Nodes 101 that receive I AM message may set a short random timer and wait unit it times out. 1614 After timeout, nodes 101 may listen for a quiet channel and then may transmit its own unique I AM message. 1615 Remaining nodes 101 may issue their own I AM message only once, after they have determined that all hearable messages may have been received. 1616 The I AM messages continue to "radiate" outward and may pass along a path quality number. 1617 This number may be based on the lowest RSSI seen along that chain. The nodes may record the RSSI of all heard messages along with the lowest RSSI recorded along the chain and store them into a list of parent candidates. Nodes may also determine if I AM messages follow their own. 1618 These messages are not recorded. A leaf node may know its a leaf node if no I AMs may be heard after they issue their own. 1620 A node 101 may choose a parent based on path quality and RSSI of the recorded messages. 1621 This completes the first radiated emissions along the nodes.

Leaf Node Path Trace (FIG. 16C)

FIG. 16C depicts a flow chart showing an overview of a Radiation Configuration Protocol showing an example of a message sent from a leaf node and traveling towards a remote coordinator 104 along a network 108, according to various embodiments of the invention. The next sequence starts at the leaf nodes and travels towards the Remote coordinator 104. A leaf node 101 may issue a path trace message to their chosen parent node. 1622 Any node 101 receiving the message may reject or accept the message. 1623 If the message may be rejected, the node 101 may chose the next best parent on the list of parent candidates. 1624 If, on receiving a path trace message from a child, a node 101 accepts the message, the node 101 may record the child's address and concatenates its own address to the message. 1625 The node 101 may send a message to its chosen parent. 1626 On receiving a PATH TRACE message from a child, a node 101 may record the child's address and concatenate its own address to the message. 1627. A node 101 may relay the message it to its children. 1628 The PATH TRACE message may continue until the path trace finds its way to a remote coordinator 104. 1629 In this way the path trace may backtrack to find a way to the remote coordinator 104. The remote coordinator 104 may construct a spanning tree from each path trace. 1630 The Remote coordinator 104 may acknowledge the paths by constructing a list of addresses of all nodes, leaf node last. 1631 A node 101 may send an acknowledge message to a remote coordinator 104. 1632 The node 101 may begin an operational sub-phase polyphase.

Orphan Node (FIG. 16D)

FIG. 16D depicts a flow chart showing an example of an Orphan Node adoption message into a network 108. For example, in FIG. 16D a node 101 outside the network 108 may announce itself as an orphan. 1633 Nodes 101 in range may issue a JOIN message. 1634 The Join message may comprise source address, order number, and synchronization data. The Orphan node may choose parent as usual using signal strength and order number. 1635 Orphan node may upload its data comprising a Meter ID (if a routing node 101 or redundant remote coordinator 104 no Meter ID message may be sent). 1636 The Orphan node 102, 103, 104 may upload data including Meter reading, Valve status, Battery status, and other data (e.g., GPS coordinates). 1637 An orphan node 101 may send an identification message to the remote coordinator 104. 1638 Remote coordinator 104 may issue a SCHEDULE message. 1639 The SCHEDULE message may tell when next wake up of network 108 is. 1640 The Node 101, now within the network 108, may send an acknowledgment message to the remote coordinator 104. 1641

Alarm Polyphase Alarm Message (FIG. 16E)

FIG. 16E depicts a flow chart showing an example of an ALARM message generated by a node 101 and sent via a network 108 using a Radiation Configuration Protocol to reach a remote coordinator 104.

Exemplary ALARM messages are generated in response to a sensor 214 detecting (1) tampering with gas, water, and electricity lines; (2) tampering with gas, water, and electricity, meters; (3) siphoning off of gas, water, and electricity from the supply lines (e.g., pipelines, cable lines); (4) unauthorized reconnection of gas, water, and electricity at the customer premises (commercial, industrial, and residential); (5) Damage to grid due to natural disasters (e.g., earthquake, flood, fire, landslide/mudslide, severe frost); (6) Damage to grid due to wear and tear, especially weather wear (e.g., water damage over time, heat damage over time, general non-specific deterioration of the grid over time). 1641 The sensor 214 may send the information to the processing module 212. The processing module 212

A command message may be generated by a control unit 106 or remote coordinator 104. A command message may instruct a node 101 to execute a command including but not limited to opening or closing a valve or switch.

An alarm message may be generated by a node 101 or remote coordinator 104 in response to damage, pilfering, or vandalism. A sensor may detect a low battery, smoke in the meter compartment, or other damage. 1642 In response the sensor may send information to the processing module 202 which may generate an ALARM message. 1643 The processing module 202 may send the ALARM message to a transceiver 208. 1645 Transceiver 208 may send ALARM message via antenna 210 over a network 108 to a remote coordinator 104. 1646 If the node 101 receiving the COMMAND message is not the route destination 1647, the node 101 may generate an opaque reference based on the source's opaque reference embedded in the message. 1648 The node 101 may send the ALARM message to the next node 101 in the path. 1649 If a timeout occurs, 1650 the node 101 may create an ACK with saved tuple to add error condition code and remove the ALARM message from its work list. 1651. The remote coordinator 104 may receive the ALARM message. 1652 and may send the node 101 a COMMAND message via the same path the ALARM message used to reach the remote coordinator 104. 1653 Upon receipt of the acknowledgement message, the node 101 may stop sending the ALARM message. The remote coordinator 104 may forward the ALARM message to a control unit 106. 1654 The control unit 106 may send an ACKNOWLEDGE message to the remote coordinator 104. 1655

Alarms are may be placed at the head of the outgoing message queue. Alarms are time-stamped and placed at the head of the outgoing message list. A side effect may be that the latest alarm may be reported first, allowing the remote coordinator 104 and CONTROL UNIT 106 to unwind the alarm's history if it escalated during dormancy. A low battery alarm may be emitted when the battery may have only enough power to survive less than 48 hours at the nodes current level of operation. Leak alarm. If the volume of water being used may be unusually high for a long period of time (user settable threshold) an alarm may be generated.

During an Alarm Polyphase a message may be sent from any node 101 after setup to alert a remote coordinator 104 of condition that needs attention from parent may send alarm on its own to control unit 106 at any time. In one embodiment, all node 101 alarm messages are propagated to remote coordinator 104 and then relayed to the control unit 106. In another embodiment, all node 101 alarm In a further embodiment, messages are prorogated to a remote coordinator 104 and some are selected by program logic to be sent to the control unit 106. A non-limiting example may be a low battery alarm if a child node lost or too weak during a Flourish period. Additionally, alarm messages including water leak messages, tampering messages, and valve failure messages if a valve closed and meter registers water or trickle charge.

Also the alarm may alter a remote coordinator 104 and, in turn control unit 106 of pilfering, vandalism, damage, tampering, or any combination thereof monitored and controlled by a node 101.

Sleep Message (FIG. 16F)

FIG. 16F depicts a flow chart showing a detailed overview of a Radiant Configuration Protocol with exemplary messages sent during the Shutdown Phase, according to various embodiments of the invention.

FIG. 16F depicts a flow chart showing a detailed overview of a Radiant Configuration Protocol with exemplary messages sent during the Shutdown Phase. During a Shutdown phase, a remote coordinator 104 may send a SLEEP NOW message to nodes 101 in a cluster 102. 1656 The nodes 101 may receive the SLEEP NOW message. 1657 If the nodes receive the SLEEP NOW message, they may issue ACKNOWLEDGE message to the remote coordinator 104. 1658 If the nodes do not receive the SLEEP NOW message propagated through the network, a timeout protocol activates after a maximum session duration may be reached. 1659 In one embodiment, a node 101 may be active in a Flourish Phase for 1, 2, 3, 4, 5, 6, 7, 8, 9, or 10 minutes. After a set maximum session duration may be reached, the node 101 may initiate the protocol to enter a sleep mode. In one embodiment, the maximum session duration for a node 101 may be 1, 2, 3, 4, 5, 6, 7, 8, 9, or 10 minutes. The nodes may turn off transceiver, clear out work lists, and set timer for next wakeup as scheduled. 1660 The nodes may enter sleep mode. 1661 The parent nodes sleep after each child acknowledges sleep. 1662 Parent nodes may send ACKNOWLEDGE message to remote coordinator 104 and routing nodes. 1663 Remote Coordinator 104 and routing nodes may change to dormant mode. 1664

Shut down Sub-phase—The remote coordinator 104 may decide when the network should shutdown and go dormant. If all commands have been acknowledged and e node 101 may have reported it begins shutdown immediately. If some nodes have not reported the remote coordinator 104 may wait. The shutdown occurs on a path by path level since some paths may have less nodes and there may be no reason to keep them awake.

Each node 101 may acknowledge the go-to-sleep command before the path completely sleeps. The sleep command acknowledgment may be designed so that the leaf nodes sleep first Their acknowledgment may be sent to their parent, which sleeps when all the children have acknowledged sleep. The acknowledgement thus winds back up the tree towards the remote coordinator 104. Not all of the acknowledgements may successfully make their way to the remote coordinator 104 in which case the remote coordinator 104 may retry. After a number of thresholds the remote coordinator 104 may issue an alarm.

Radiant Configuration Protocol with exemplary messages sent during the Operational Phase comprising at least one Maintenance Polyphase, Scheduling Polyphase, Command Polyphase, and Alarm Polyphase. The operations sub-phase may be where the meter work may be done, now that the network may have been configured. Operations are a mixture of the following polyphases (recall, one polyphase may overlap with another polyphase). Radiant Configuration Protocol with exemplary messages sent during the Operational Phase comprising at least one Maintenance Polyphase, Scheduling Polyphase, Command Polyphase, and Alarm Polyphase. Exemplary Messages are shown in Table 1.

TABLE 1

EXEMPLARY MESSAGES

| MESSAGE | Description of action executed by node 101 |
| --- | --- |
| READ SENSOR | Collect information from sensor 214, send to processing module 202, and send message including sensor 214 information via transceiver 208 |
| READ METER | Collect information from meter, send to processing module 202, and send message including commodity usage information via transceiver 208 |
| CLOSE VALVE | Close valve 302 402 to stop the flow of a commodity through a commodity supply line 316 |
| OPEN VALVE | Open valve 302 402 to may allow the flow of a commodity through a commodity supply line 316 |
| CLOSE SWITCH | Close switch 502 to stop the flow of a commodity through a commodity supply line 316 |
| OPEN SWITCH | Open switch 502 to may allow the flow of a commodity through a commodity supply line 316 |
| GET SOFTWARE VERSION | Returns software version |
| ACKNOWLEDGE | Acknowledge receipt of last sent message |
| DOWNLOAD DATA | Downloads a line of new software |
| DOWNLOAD VERIFY | Verities downloaded software image |
| SET SENSOR UNITS | Metric or English measurements |
| SET RF TRANSMIT POWER | May allow for dense MESH conditions |
| GET BATTERY VOLTAGE | Important to create alarms for battery and energy harvesting device |
| TIMING PROTOCOL | A family of commands to keep the network synchronized |
| SET PASSWORD | Passwords to may allow maintenance |
| SET ENCRYPTION KEY | AES-128 encryption of all commands |
| SET PANID | Sets a node's network ID |
| GET PANID | Gets a network ID from a node |
| GET RSSI | Gets a nodes receive signal strength |
| GET CHANNEL | Gets the RF channel a node 101 is using |
| GET CHANNEL MASK | Sets the RF channel a node 101 is configured to use |
| LEAVE NETWORK | Forces a node 101 out of a cluster 102 or network 108 |
| JOIN | Forces a node 101 to join a cluster 102 or network 108 |
| GET NET STATUS | Gets a joined/non-joined status of a node |
| GET PARENT | Gets a node's parent's ID |
| GET CHILDREN | Gets a list of a node's children's' ID |
| SET AUTO JOIN | On next powerup/reset auto-join or not |
| SET SLEEP DELAY | For nodes at the end of a path, sets the time to sleep between sending information messages |
| SLEEP NOW (FORCE SLEEP) | Forces a node 101 into sleep mode |
| GET ROLE | Determines if the component is a node 101 or remote coordinator 104 |
| SET ROUTE | Set role as a node 101 or a remote coordinator 104 |
| SET TRACKING PERIOD | Sets timeout for children's initial messaging |
| SET ADDRESS MODE | Selects MAC (64-bit) vs. NWK (16-bit) address |
| PING | Determines if node 101 is within range of transceiver 208 |
| SET WAIT TIMEOUT | Sets maximum time to wait before ending repeating message transmission |

TABLE 1-continued

EXEMPLARY MESSAGES

| MESSAGE | Description of action executed by node 101 |
|---|---|
| GET WAIT TIMEOUT | Gets the maximum number of attempts to transmit |
| SET REP COUNT | Set number of tries to transmit before stopping transmission |
| GET REP COUNT | Get number of tries to transmit before stopping transmission |
| SET MESSAGE LOAD TIMEOUT | How long to wait for a message end after beginning a message that may have begun to be issued |
| SET LOGICAL ADDRESS | Set logical address |
| GET LOGICAL ADDRESS | Get logical address |

Maintenance Polyphase (FIG. 16)

Maintenance and Installation Polyphase—Nodes may be added to an existing network. The configuration phase does know or care that a Node may be a new install (since really all Nodes are "new" each flourish phase). However at this point the newly installed Node may inform the remote coordinator 104 of its presence and its data.

If a newly installed Node may have a good radio signal to the network a maintenance person need not be on hand when it comes into its first flourish phase. However there may be no guarantee that the radio connection may be established unless it may reach a remote coordinator 104 or relay node 101 without any intermediary hops. In the general case where the meter may be directly reachable to a remote coordinator 104 or Relay node, the node installer may be on hand when the network comes up to make sure the unit connects. Similarly for maintenance purposes, the maintenance person may have their handheld device connected before the next scheduled flourish phase begins. A maintenance operation involves at most only one path, and therefore at most one set of nodes to stay powered on. This string of nodes may stay on until the maintenance action may be completed, at which point a maintenance mode release message may be routed to the remote coordinator 104 to signal that these nodes may be shut down.

Scheduling Polyphase

The control unit 106 application may tell the remote coordinator 104 scheduling parameters such as how often meters need to be read. Scheduling may only happen once per network as each node 101 may be given a schedule in terms of periodicity of the flourish phases, e.g., "wake up and report each hour". Further schedule may change may be made on subsequent scheduling polyphases. Another scheduled parameter may be how often to take meter readings. This may differ between nodes 101 depending upon billing policies. A single PAN may wake up not all at once, but in branches (sub-trees). Partitioning the whole network in this way may lower the number of collisions, if each colliding node may be rescheduled into its own partition. However a separately scheduled branch may contain whole paths. (That is, the path traces used by each node 101 may be a subset of a single scheduled branch.) In one embodiment, relay nodes may always be on, they may belong to more than one scheduled branch. In one embodiment, the remote coordinator 104 may be a part of all schedule branches. Scheduling may change at the discretion of the remote coordinator 104 (and ultimately the control unit 106). If there are no scheduling changes needed on a node this polyphase may be skipped. Scheduling of the network 108 should not be confused with network synchrony. Network synchrony information may be implemented in the message sent and received by a node 101.

During a Scheduling Polyphase the control unit 106 may send out a message to reset synchronization elements 212 according to synchronization results. During a Scheduling Polyphase, only parts of a whole tree need become active at a time. Message congestion may be control by remote coordinators 104 and relay nodes. Any nodes within reach of the remote coordinator 104 or any routing node and its descendants could be grouped together. The remote coordinators 104 track which nodes are on what sub-branches to queue commands for when the sub-branch awakens. In one embodiment, phases may not overlap. If during a Scheduling Polyphase, a particular path may be slow the remote coordinator 104 may automatically split it off into an alternative sub-tree schedule allowing the rest of the network to sleep faster and conserve more energy.

If node 101 may be close enough to remote coordinator 104 or relay node 101 no schedule necessary, however node 101 may be being added to the existing network out of range of remote coordinator 104 or relay nodes it may be necessary to schedule it when installed to meet up with rest of network. In one embodiment of the invention, no pre-scheduling necessary.

In another embodiment, a remote coordinator 104 may send a self test message. Upon receipt of a self test message a node 101 may schedule wake up to do self test in dormant phase where the results may be communicated via the network 108 to the remote coordinator 104 during next command phase. A remote coordinator 104 may send a message to request that the nodes send messages comprising the battery level information, to upload new node 101 data, for example, commodity usage information, or get the temperature of any compartment in the meter node (e.g., the temperature at the battery). See also Culler, D. E. and J. Hui 6LoWPAN Tutorial and IP on IEEE 802.15.4 Low-Power Wireless Networks. 46; and ZigBee (2008). ZigBee-PRO Stack Profile, Revision 05. online, ZigBee Alliance, each of which is hereby incorporated by reference in its entirety.

Exemplary Water Meter Node

FIG. 17 depicts a cross-section of a meter system 1700 according to exemplary embodiments which generally depicts a compound water meter with an energy harvesting device coupled thereto. The description herein of this embodiment may focus on application in a water system, but it may be understood that the meter system 1700 may be used in other types of fluid systems. For example, meter system 1700 may have application in any fluid flow system where the fluid flow may be measured since the fluid may be a commodity and the amount used may be commercially significant. Meter system 1700 may be used in the system 300 as depicted in FIG. 3. As may be appreciated from the disclosures herein, the meter system 1700 may be configured to provide control of fluid flow, measurement of flow fluid, and energy harvesting from the fluid flow. However, while the meter system 1700 depicts these functions as integrated, these features and functions may be provided separately and are not required in all embodiments. Additionally, while meter system 1700 is depicted as a compound water meter, it should be appreciated that the principles of operation described herein may be applied to other water meter types as known in the art. For example, a residential water meter incorporating a nutating disc may have the energy harvesting device coupled therewith and be integrated into the systems according to exemplary embodiments as described herein.

The meter system 1700 may be mounted in a system according to exemplary embodiments such as system 300. The meter system 1700 may encompass the features and perform the functions shown by the various elements of system 300. The meter system 1700 generally may have a meter section 1702, an energy harvesting section 1704, and a control section 1706. The meter system 1700 may be configured and dimensioned as required to fit into various fluid flow sections. Appropriate mounting points and hardware may be provided to secure the meter system 1700 within the system. For example, the meter system 1700 may have mounting points, such as P1 and P2. P1 and P2 may be holes, threaded or non-threaded for mounting hardware. For example, non-magnetic stainless steel bolts may be used.

An inlet valve (not shown) may be mounted to or near the inlet of the meter section 1702. This valve may be of a type as described above in FIG. 3 for valve 302.

The meter section 1702 may have a body 1708 which may have an inlet 1710 and an outlet 1712. The inlet 1710 and the outlet 1712 generally define the fluid flow path through the meter as indicated by the directional arrows 1714 shown in FIG. 17. The body 1708 may be manufactured of an appropriate material for meter use. For example, the body 1708 may be made of a no-lead high copper alloy containing a certain amount of copper. According to exemplary embodiments, the body 1708 may be made of brass or bronze, containing at least 85% copper. In alternative embodiments, other materials may be used in the body 1708. The body 1708 may be assembled with appropriate hardware. For example, non-magnetic stainless steel bolts may be used in assembling the body 1708. Mounted atop the body 1708 may be a casing 1750. An intermediate casing 1760 may be provided between the body 1708 and the casing 1750. In exemplary embodiments, the casing 1750 and the intermediate casing 1760 may be made of sheet metal. It should be appreciated that other materials may be used. For example, plastic may be used. The casings may be mounted using suitable hardware. For example, non-magnetic stainless steel bolts may be used.

For control of the fluid flow through the meter system 1700, as described above, a valve 302 may be mounted on or near the inlet 1710. According to exemplary embodiments, the valve 302 may be integrated into the inlet 1710. A filter 1762 may be installed at, within, or near the inlet 1710 to provide for filtration of particulate matter from the fluid. For protection of the inlet 1710 and the outlet 1712, when the meter system 1700 is not installed in a system, protective caps 1716a and 1716b may be provided.

As depicted in FIG. 17, the meter system 1700 may be a compound meter, having two flow meters sections with the flow between the two sections controlled by an automatic valve assembly. The meter system 1700 may have a positive displacement meter 1720 for low rates of flow. For example, a nutating disc may be used as shown in FIG. 17. A turbine meter 1722 may be used for higher rates of flow. According to exemplary embodiments, the turbine meter 1722 may be a Francis turbine using 3 blades. The turbine meter 1722 may be contained within a turbine casing 1726. The turbine casing 1726 may contain the turbine blades and have one or more inlet ports and outlet ports for the fluid. It should be appreciated that other meter configurations may be used, as well as other turbine configurations. A valve assembly 1724 may be used to port fluid flow between the positive displacement meter 1720 and the turbine meter 1722. The valve assembly 1724 may be an automatic valve such that the fluid is ported automatically between the two sections. According to exemplary embodiments, the valve assembly 1724 may be a spring loaded, poppet type valve. The valve parts may be made of an appropriate material. For example, the valve parts may be made of a no-lead high copper alloy containing a certain amount of copper, stainless steel, or a suitable polymer. The level of copper, stainless steel, or polymer may be 85%. The valve may have a rubber seat. The rubber seat may be replaceable.

In operation, the valve assembly 1724 may be normally closed. In the closed position, fluid flow may be directed entirely through the positive displacement meter. The valve assembly 1724 may open, at a certain flow rate, to may allow the majority of the fluid flow through the turbine meter 1722. The valve assembly 1724 may open or more inlet ports 1728 into the turbine casing 1726. The fluid may exhaust the turbine casing 1726 through one or more outlet ports 1730. Even with the valve assembly 1724 open, fluid may still flow through the positive displacement meter 1720, but at a reduced rate from when the valve assembly 1724 may be closed. The valve assembly 1724 may automatically close upon the fluid flow reducing below a certain level.

In exemplary embodiments, both the positive displacement meter 1720 and the turbine meter 1722 are coupled to a shaft 1732. Both meters drive the shaft 1732 when the meters are actuated by fluid flow. The shaft 1732 may be a single shaft coupling the positive displacement meter 1720 and the turbine meter 1722. The shaft 1732 alternatively may be a two piece composite shaft with the positive displacement meter 1720 driving an inner shaft and the turbine meter 1722 being coupled to an outer sleeve concentric with the inner shaft. The shaft 1732 may have bearings mounted thereto to provide support. The bearings may be of a long-life type that may be capable of functioning in a fluid. For example, nylon bearings may be used. The positive displacement meter 1720 may use a spindle 1734 which contacts a lever piece 1736 mounted on the end of the shaft. For example, as the nutating disc wobbles in response to fluid flow, the spindle 1734 moves in a circular pattern. The spindle 1734 makes contact with the lever piece 1736 and the shaft 1732 may be rotated in response. Likewise, the blades of the turbine meter 1722 are mounted to the shaft 1732 such that when the blades move in reaction to the impingement of the fluid, the shaft 1732 may be rotated. It should be appreciated that the turbine blades may move when the positive displacement meter 1720 moves in response to fluid flow due to the shaft coupling between them such that the turbine meter 1722 may be rotating prior to fluid flow being ported there through by the valve assembly 1724.

Mounted to the shaft 1732 are one or more discs. According to exemplary embodiments, two discs 1740a and 1740b may be used. The discs 1740 rotate in response to the shaft turning. Mounted within the discs 1740 are one or more magnets 1742. For example, the discs 1740 may contain six magnets 1742 are shown in FIG. 18B. The magnets may be of any type as known in the art. For example, the magnets may be Samarium Cobalt magnets, which may be encased in plastic for protection. Alternatively, other ferritic type magnets may be used. As shown in FIG. 18b, the magnets 1742 may be oriented in such a fashion as to alternate the pole orientation. Discs 1740a and 1740b may be configured in the same manner.

Fixed between the discs 1740 may be a series of coils 1744. The discs 1740 and the coils 1744 form the energy harvesting section 1704. The coils 1744 may be wound as shown in FIG. 18A, with a winding direction D as shown by the arrows in FIG. 18A. The coils 1744 may be encased in epoxy. It should be appreciated that the discs 1740 and the coils 1744 may be positioned in relation to one another to ensure the flux lines from the magnets 1742 cut through the coils 1744 to provide for the best generation of electricity. The discs 1740 and the coils 1744 may be alternatively positioned. For example, the coils 1744 may be mounted above the discs 1740 so that the coils 1744 are contained completing in the casing 1750, with the control section 1706. The disc 1740 may be mounted with the body 1708 such that the shaft 1732 may not penetrate the body 1708 into the casing 1750. In such a configuration, the magnets 1742 would have to be of sufficient strength so that the flux lines may cut through the floor of the body 1708 and still have sufficient strength to induce current flow in the coils 1744. FIG. 19 depicts an alternative embodiment with such a configuration.

As described above, the upper section of the meter system 1700 may be the control section 1706. The control section 1706 may have a control printed circuit board ("PCB") 1752, a battery section 1754, a charging cable 1756, and coil pick-ups 1758. The control PCB 1752 may perform the functions of the water meter node 102 as described herein. The energy harvesting section 1704 may be contained all or partially within the control section 1706. The control section 1706 may be contained within the casing 1750. Portions of the control section 1706 may be located outside of the casing 1750. For example, as depicted in the meter system 1700, the battery section 1754 may be mounted on top of the casing 1750. The casing 1750 may further have a removable lid, as shown in FIG. 17. An antenna 210 may be mounted to the control section 1706 to provide for receiving and transmitting appropriate signals as described in this disclosure.

The control PCB 1752 may perform a number of functions. The control PCB 1752 may encompass the components shown in system 300. For example, the control PCB 1752 may encompass the interfaces, the processing module, the power supply, the sensor, the synchronization element, and the transceiver as shown in system 300. It should be appreciated the control PCB 1752 may perform different or additional functions as required in the system it may be installed within. According to exemplary embodiments, the control PCB 1752 may perform alternating current (A/C) to direct current conversion (D/C), regulation of charge flow to the battery section 1754, and calculation of the amount of fluid flow through the meter section 1702. The description of FIG. 22 provides additional details on the operation and configuration of the control PCB 1752.

The control PCB 1752 may have one of more coil pick-ups 1758. The coil pick-ups 1758 are directly connected to the coils 1744 to provide a means for the generated electricity from the coils 1744 to flow to the control PCB 1752. The coil pick-up 1758 connection ends are shown by output wire connections 1802. The electrical current produced in the coils 1744 may be A/C. The control PCB 1752 converts the A/C to D/C. The D/C may be sent via the charging cable 1756 to the battery section 1754. The electrical current may also be used by the control PCB 1752 for its own power needs. The D/C current charges a battery contained in the battery section 1754. The battery section 1754 provides a means to power the meter system 1700 during periods of little to no fluid flow through the meter section 1702. Accordingly, the charging cable 1756 may then function as a power supply cable. The control PCB 1752 may control the charging and power draw from the batteries. The batteries may be of any suitable rechargeable type. For example, Metal Hydride batteries may be used. According to exemplary embodiments, it is preferred to use batteries with no memory problems, such as Nickel Cadmium batteries.

As described above, the control PCB 1752 also performs calculation of fluid flow through the meter section 1702. The control PCB 1752 may measure the frequency of the A/C from the coil pick-up 1758 and determine the shaft revolution count since, as described above, the magnets 1742 are positioned with alternating poles. The shaft revolution count may be converted, using a suitably programmed algorithm based on the meter section 1702 configuration, to fluid flow for reporting as appropriate and as described above.

FIG. 19A through d depict an embodiment of a generation assembly for a meter system. In this embodiment, a disc 1902 may have a magnet 1904 mounted onto or into the disc. The magnet 1904 may be mounted at the periphery of the disc 1902 as shown in FIG. 19A. The disc 1902 may be mounted to a shaft 1906. The disc 1902 rotate as the shaft 1906 rotates. The shaft 1906 may be rotated by a spindle 1908 of a nutating disc meter. As shown in FIG. 19B, the disc 1902 may be mounted external to the metering chamber 1910 containing the nutating disc (not shown).

Mounted external to the meter body 1912 may be a set of coils 1914. According to exemplary embodiments, three coils 1914 may be used. The coils 1914, as shown in FIG. 19D, may be mounted in a pattern such that the magnet 1904 may pass underneath them as the disc 1902 rotates. The coils 1914 may be ferrite with high permeability cores. The magnet 1904 should have sufficient strength to generate flux lines penetrate through the meter body 1912 and to cut the coils 1914 based on the distance that the coils 1914 are mounted from the magnet 1904 in order to generate electrical flow in the coils 1914 in response to the moving magnetic field. For example, a Samarium Cobalt magnet may be used. In other embodiments, a stronger ferrite based magnet may be used.

The coils 1914 further have leads 1916 for connection to external components. For example, the leads 1916 may be connected to a control PCB. A magnetically actuated switch 1918 may be mounted with the coils 1914. The magnetically actuated switch 1918 may be used to count the revolutions of the magnet 1904. The revolutions of the magnet 1904 may be used to calculate the fluid flow through the meter. As shown in FIG. 19D, the magnetically actuated switch may have leads for connected to an external component. For example, a reed switch may be used and be connected to a control PCB, wherein the control PCB may use the revolution count from the reed switch to calculate flow rate through the meter.

Exemplary Nutating Disc Positive Displacement Water Meter

FIG. 20A depicts a cross-section of a meter system 2000 according to exemplary embodiments which generally depicts a water meter with an energy harvesting device coupled thereto. The description herein of this embodiment will focus on application in a water system, but it will be understood that the meter system 2000 may be used in other types of fluid systems. For example, meter system 2000 has application in any fluid flow system where the fluid flow may be measured since the fluid may be a commodity and the amount used may be commercially significant. Meter system 2000 may be used in the system 300 as depicted in FIG. 3. As will be appreciated from the disclosures herein, the meter system 2000 may be configured to provide control of fluid flow, measurement of flow fluid, and energy harvesting from said fluid flow. However, while the meter system 2000 depicts these functions as integrated, these features and functions may be provided separately and are not required in all embodiments. Additionally, while meter system 2000 is depicted as a single water meter, it should be appreciated that the principles of operation described herein may be applied to other water meter types as known in the art. For example, an industrial water meter incorporating a compound meter may have the energy harvesting device coupled therewith and be integrated into the systems according to exemplary embodiments as described herein. The operation of the components of the meter system 2000 may be similar to that of the compound meter described in FIGS. 17 and 18.

The meter system 2000 may be mounted in a system according to exemplary embodiments. For example, the meter system 2000 may be mounted in system 300. The meter system 2000 may encompass the features and perform the functions shown by the various elements of system 300. The meter system 2000 generally has a meter section 2002, and an energy harvesting and control section 2004. The meter system 2000 may be configured and dimensioned as required to fit into various fluid flow sections. The meter system may further have a shut-off/turn-on valve configured to open or close the flow of a commodity through a supply line section 2006 mounted thereto. The shut-off/turn-on valve configured to open or close the flow of a commodity through a supply line section 2006 may be integral to the meter system 2000. In some embodiments the shut-off/turn-on valve configured to open or close the flow of a commodity through a supply line section 2006 may be a separate section which may be added onto the meter system 2000. Appropriate mounting points and hardware may be provided to secure the meter system 2000 within the overall fluid flow system. For example, the meter system 1700 may have mounting points that may be threaded or non-threaded for mounting hardware. For example, non-magnetic stainless steel bolts may be used.

Water, or another fluid commodity, may enter the meter 2000 through an inlet 2008. The flow of water through the meter 2000 is shown by the directional arrows D. The flow of the water from the inlet 2008 into the meter section 2002 may be controlled by a shut-off/turn-on valve 2010. In FIG. 20A, the shut-off/turn-on valve 2010 is depicted in the fully open position. According to exemplary embodiments, the shut-off/turn-on valve 2010 may be machined integral to a main casing 2012 of the meter system 2000. In alternative embodiments, the shut-off/turn-on valve 2010 may be integrated into the main casing 2012 through a retro-fitting process. The shut-off/turn-on valve 2010 may be of a type as described above in FIG. 3 for valve 302.

The shut-off/turn-on valve 2010 may be operated by a geared motor 2014 connected through a gear box 2016 that may include a pinion. For example, the geared motor 2014 may be a 6V DC geared motor. The geared motor 2014 may be designed such that it may be stalled for limited duration of time without damage to either the motor or the gearbox. Such a configuration may allow for detection of the shut-off/turn-on valve 2010 status, such as open or closed, by sensing the stall current and switching off the supply by electronic circuits of the meter system 2000.

According to exemplary embodiments, the shut-off/turn-on valve 2010 may be operated by the geared motor 2014. The geared motor 2014 may be actuated by remote signal and actuate the shut-off/turn-on valve 2010 thereby starting (by opening the shut-off/turn-on valve) or stopping (by closing the shut-off/turn-on valve) the water flow into the inlet 2008. The operation of the geared motor may be controlled through a connection to the energy harvesting and control section 2004, the operation of which will be described below. The spindle 2017 of the shut-off/turn-on valve 2010 may have a sealing ring 2018 at the lower portion that may rest on the seat in the body 2012 to close the shut-off/turn-on valve 2010. The spindle 2017 may be made to go up or down by a nut integral to a gear 2026 mounted at the top between thrust pads 2020. According to exemplary embodiments, the thrust pads 2020 may be nylon. One or more shaft gland seals 2022 may prevent water leakage trough the spindle 2016. The shaft gland seals 2022 may be adjusted by a threaded bush 2013, which may prevent rotation of the spindle 2017.

According to exemplary embodiments, the shut-off/turn-on valve 2010 may allow a determined flow rate through the inlet 2008 without throttling, thereby causing a negligible drop of pressure through the shut-off/turn-on valve 2010. For example, the shut-off/turn-on valve 2010, if used in a residential water meter system will be either fully open or fully closed, however this valve may be partially closed to change the water flow rate. In alternate embodiments, the geared motor 2014 may be a stepped DC motor to allow the partially open positions to be achieved. Further, the shut-off/turn-on valve 2010 of exemplary embodiments may be able to retain its state, such as open or closed, without power. Stated differently, the shut-off/turn-on valve 2010 may stay in its positions without any power applied to the geared motor 2014.

The shut-off/turn-on valve section 2006 may be contained within a protective casing 2024. The protective casing 2024 may be made of an appropriate material. For example the protective casing 2024 may be made of plastic or metal. According to exemplary embodiments, the protective casing 2024 may contain the geared motor 2014, the gear box 2016, the thrust pads 2020, and the shaft gland packing seals 2022.

The meter section 2002 may be within the casing 2012. The meter section 2002 may have an inlet section 2030 and an outlet 2032. The inlet section 2030 may be fed by the inlet 2008. The inlet section 2030 and the outlet 2032 generally define the fluid flow path through the meter as indicated by the directional arrows D shown in FIG. 20A. The inlet section 2030 may have a strainer 2031 that prevents large particle in waters from entering in the meter section 2002 and damaging and/or blocking it. According to exemplary embodiments, the strainer 2031 fits in a cavity in casing 2012 and has parallel groves 2067 (e.g., four finger-like groves) that may hold and keep constant lateral pressure on a chamber 2033. The chamber 2033 may contain a positive displacement meter. The lateral pressure exerted upon the chamber 2033 may prevent water leakage, specifically water leakage from the inlet section 2030 to the outlet 2032. For example, the strainer 2031 may be made of plastic, such that it does not harden or loose elasticity over its usage.

The casing 2012 may be manufactured of an appropriate material for meter use. For example, the casing 2012 may be made of a no-lead high copper alloy containing a certain amount of copper. According to exemplary embodiments, the casing 2012 may be made of brass or bronze, containing at least 85% copper. In alternative embodiments, other materials may be used in the casing 2012. The casing 2012 may be assembled with appropriate hardware. For example, non-magnetic stainless steel bolts may be used in assembling the casing 2012.

As depicted in FIG. 20A, the meter system 2000 may have a positive displacement meter 2034 in the chamber 2033 for metering the flow through the meter section 2002. For example, a nutating disc positive displacement meter may be used as shown in FIG. 20A. According to alternative embodiments, the metering section 2002 may have other types of positive displacement meters. For example, the metering section 2002 may be an oscillating piston type or rotary vane type positive displacement system as shown in subsequent FIG. 21.

In exemplary embodiments, the positive displacement meter 2034 may use a spindle 2036 which contacts a lever piece 2038 mounted on the end of a shaft 2040. For example, as the nutating disc wobbles in response to fluid flow, the spindle 2036 moves in a circular pattern. The spindle 2036 makes contact with the lever piece 2038 and the shaft 2040 may be rotated in response. The shaft 2040 may have one or more bearings mounted thereto (not shown) for support. According to exemplary embodiments, these bearings may be self-lubricating, have a long life and low wear rate. For example, nylon bearings may be used. In alternative embodiments, other materials may be used.

FIG. 20A exemplifies modifications that may minimize leakages in meter chamber 2033 containing the nutating disc 2034 which are provided to prevent its rotation and a separator 2041 in the metering chamber 2033 that may keep the inlet leaking to outlet.

Figure 20B:
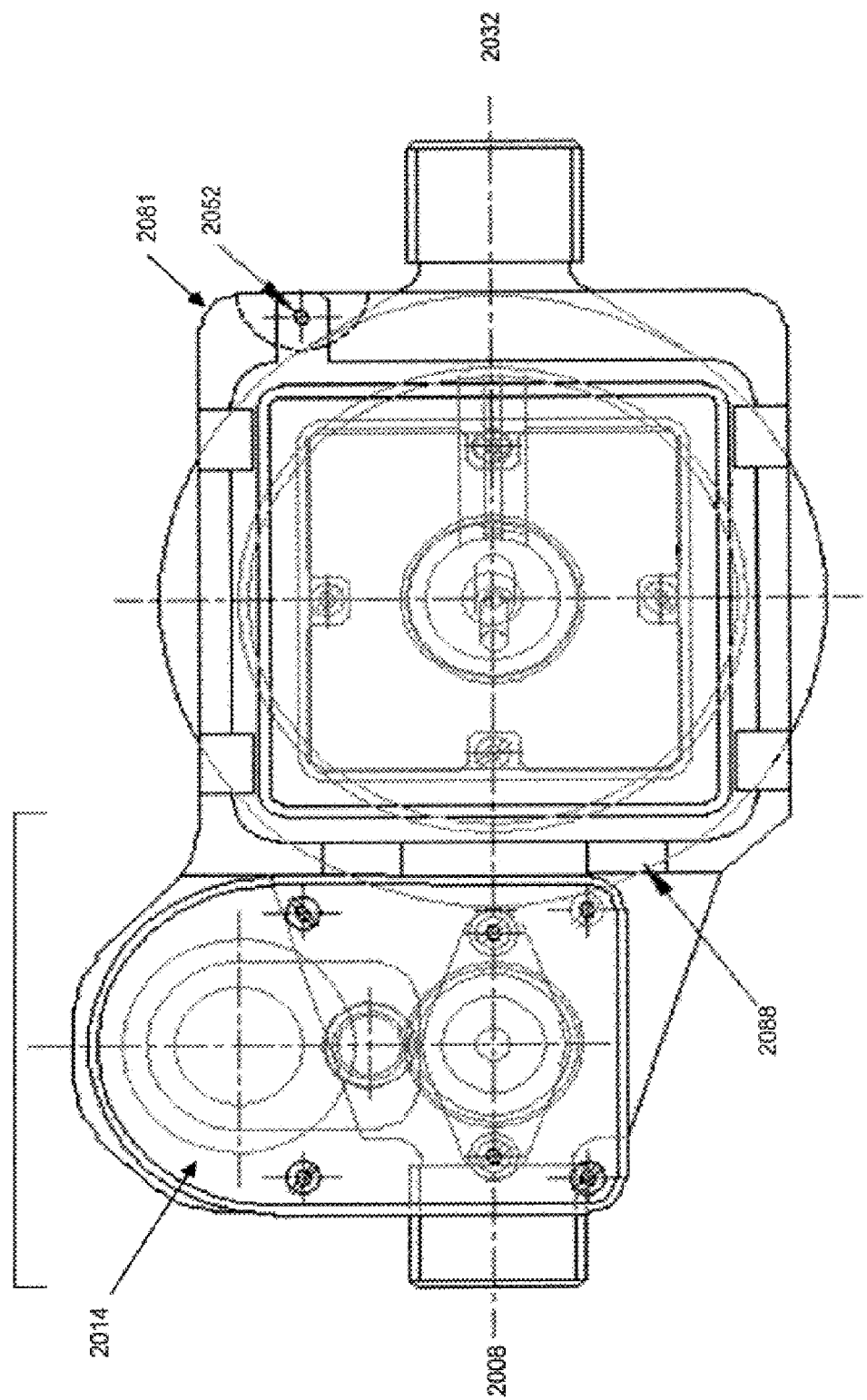
FIG. 20B depicts a top view of an energy harvesting device for a nutating disk type positive displacement water meter, according to various embodiments of the invention.
Figure 20C:
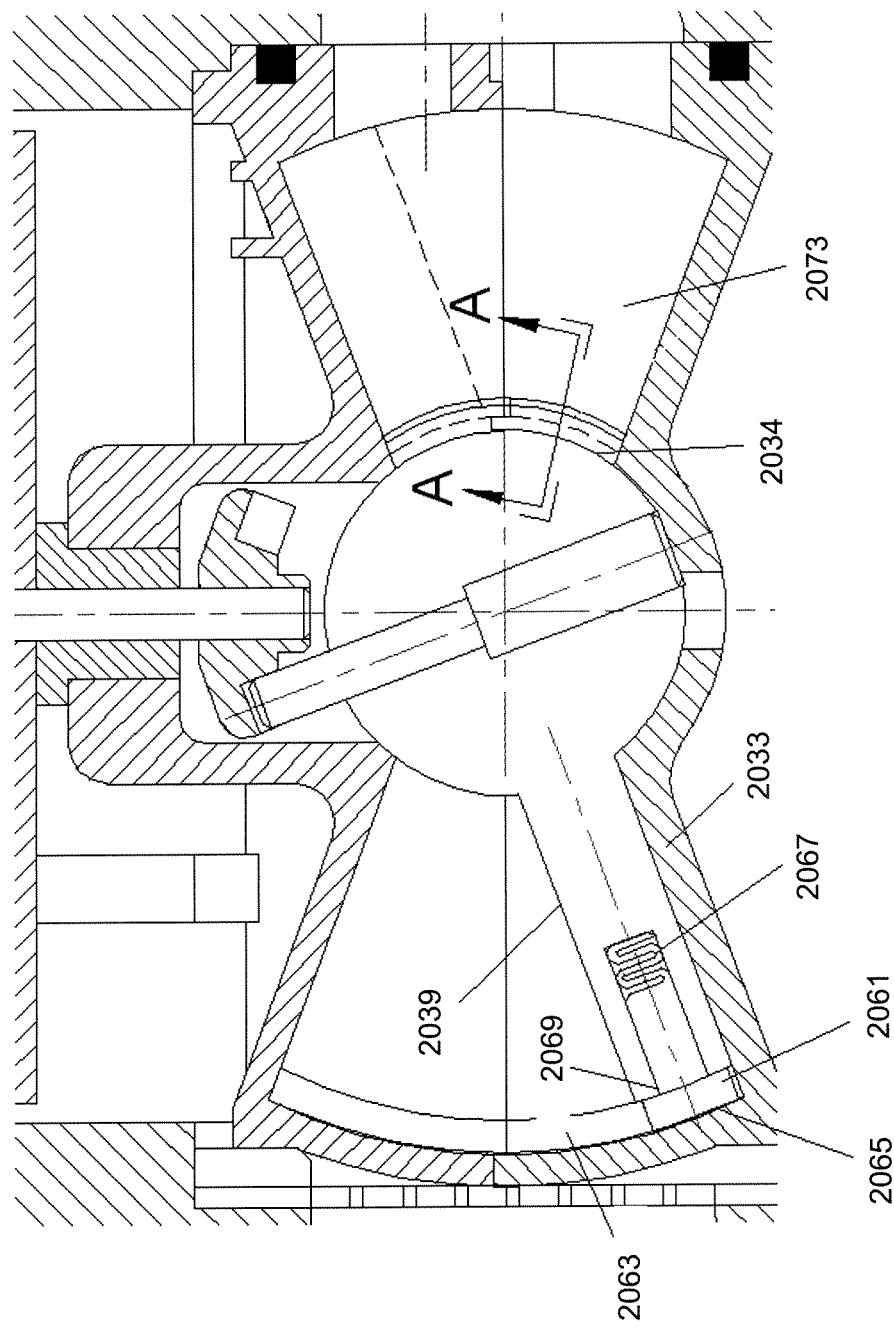
FIG. 20C depicts a view of the positive displacement section of a nutating disk type positive displacement water meter, according to various embodiments of the invention.

FIG. 20C depicts an exemplary anti-rotation roller. The label A-A in FIG. 20C refers to the cross section view of the nutating disc 2034 with separation slider 2080 as shown in magnified view in FIG. 20D." The nutating disc 2034 may be provided with a roller 2061 that slides in a grooved cavity 2063 of measuring chamber 2033. In one embodiment, a separator partition 2073 may slide on the spherical portions of the nutating disc 2039. This roller minimizes the rotation of the nutating disc 2034. At the sliding clearance between face of the roller 2065 and the groove 2063 in the metering chamber 2034 may result in water leakage. After extended operation, the roller face 2065 may wear out increasing this clearance further and adding to the inaccuracy of metering. To reduce this, the roller 2061 may be designed with stem having alternate parallel groves 2067 as shown in the FIG. 20C. This may provide a spring effect to the roller and the roller face 2065 may be kept in contact with the inside of the groove 2063 in measuring chamber 2033. This provides a spring effect to the roller and the roller face 2065 is kept in contact with the inside of the groove 2063 in measuring chamber 2033. This arrangement may not only allow for leakage reduction, but may also takes reduce of minor dimensional deviations/distortion of measuring chamber 2035. As the leakage through the stem of the roller 2069 may be of much smaller magnitude, the cushioned roller may help improving overall performance significantly. This cushion arrangement for roller also helps compensating the wear of the roller, thereby improving working life of the meter.

Figure 20D:
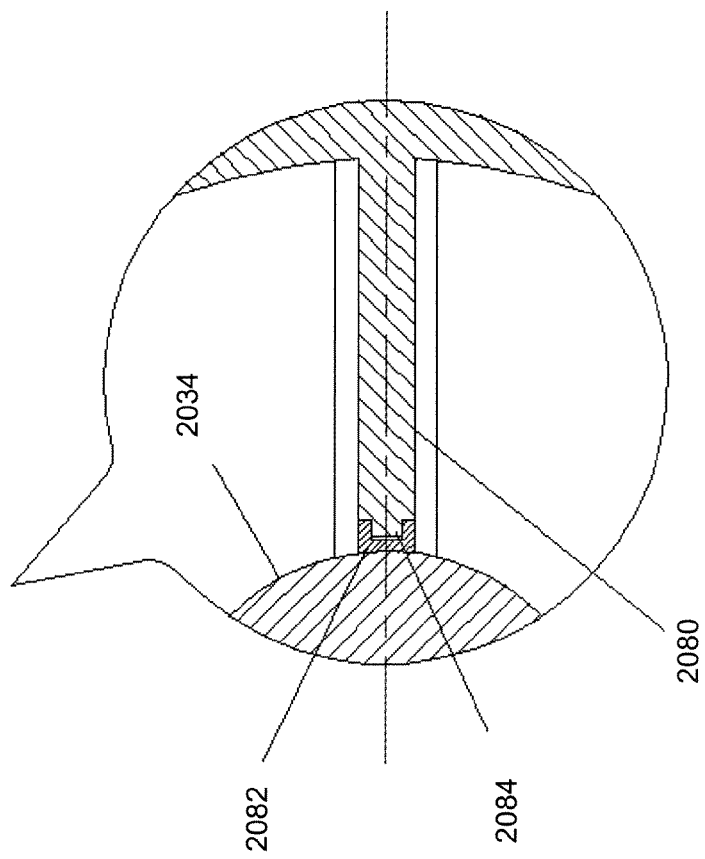
FIG. 20D depicts an overview of the separator sliders using a nutating disk type positive displacement water meter, according to various embodiments of the invention.

FIG. 20D depicts a magnification of the separation slider shown in FIG. 20C (denoted therein as "A-A").* In FIG. 20D, the separator partition 2080 may be assembled with a Polytetrafluoroethylene (PTFE) slider strip 2082 is shown. The separator partition 2080 projected from the measuring chamber 2033 may assist in keeping the inlet water directly leaking to outlet port without going through the metering chamber 2033. In another embodiment of the invention, to minimize the leakage and friction between the separator partition 2080 and nutating disc 2034, the partition edge may be provided with a projection 2084 on which a 'U' shaped PTFE slider strip 2082. This PTFE strip 2082 face may have a profile matching that of spherical portion of the nutating disc 2039. The PTFE 2082 may have a low coefficient of friction.

As shown in FIG. 20A, atop the meter section 2002, may be mounted the energy harvesting and control section 2004. This section may be mounted within a protective box 2050. According to exemplary embodiments, the protective box 2050 may be transparent. An opaque shield 2094 may be present interior to the protective box 2050. The opaque shield may be a sheet having a thickness of 0.5. In alternative embodiments, the opaque shield 2094 may be at least about 0.1, 0.2, 0.3, 0.4, 0.5, 0.6, 0.7, 0.8, 0.9. or 1.0 thick. A top view of the meter system 2000 is shown in FIG. 20B. The protective box 2050 may be mounted on a box mount 2081 without any additional mounting hardware. The protective case 2050 may be mounted atop the meter section 2002 as shown. The meter section 2002 casing 2012 may have a series of projections 2054 to which the energy harvesting and control section 2004 may be mounted. For example, there may be four projections 2054 to which the protective case 2050 containing the section 2004 may be slide into place and held in place. A sealing gasket 2056 may be fitting between the protective case 2050, the inner housing 2058, and the casing 2012 to provide a weather tight seal. According to exemplary embodiments, the protective case 2050 and its contents may be mounted without the need for external tools. The bottom collar of the protective box 2050 may be slide fitted in one or more projections or fingers 2054 on the casing 2012. To ensure its correct positioning, setoff stoppers 2088 may be provided in the casing. An arrangement may provided on the meter section 2002 that may allow the use of a wire seal gasket for preventing tempering of the meter. A hole 2052 may be bored into the casing 2012 for a wire seal. The wire seal may be used as an anti-tamper device.

Figure 20E:
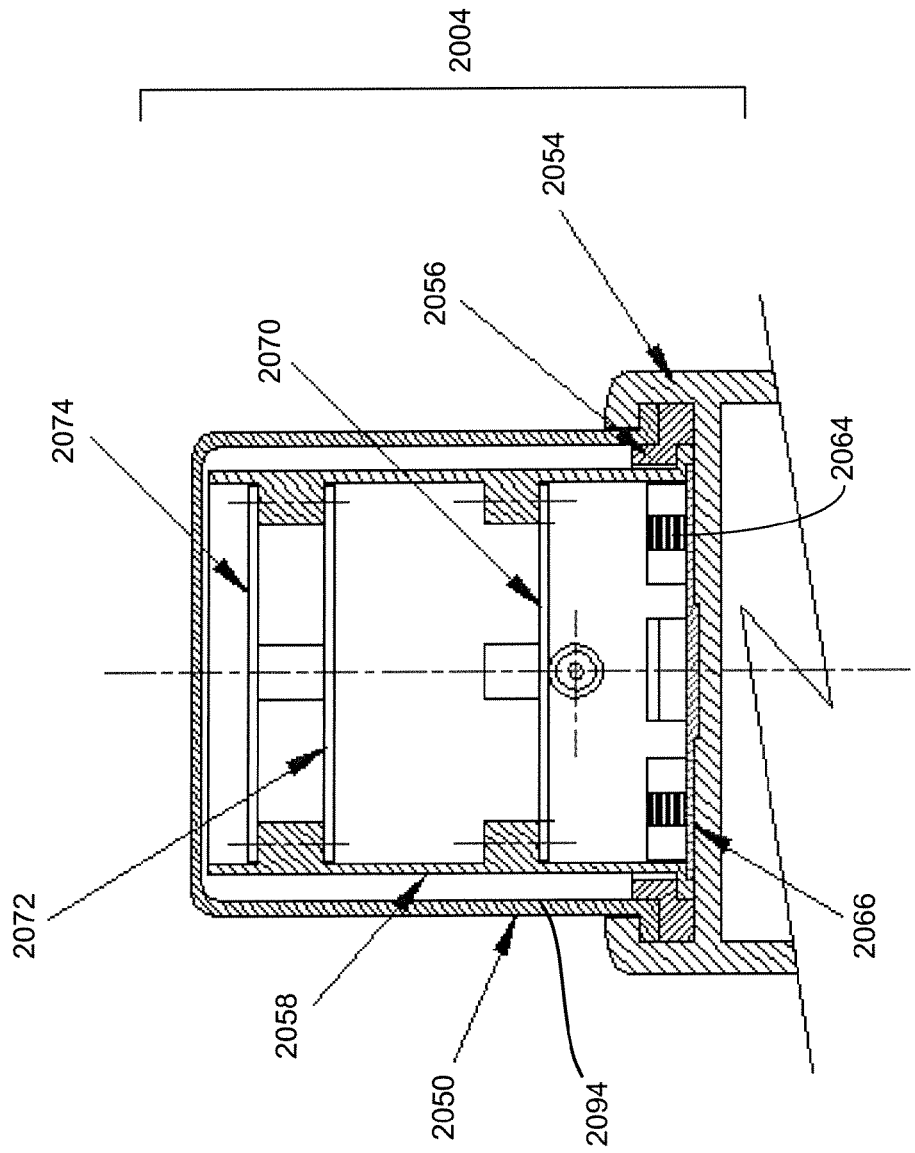
FIG. 20E depicts a cross section view of a control section of a nutating disk type positive displacement water meter, according to various embodiments of the invention.

FIG. 20E provides a cross-section view of the section 2004. Contained with the section 2004 may be components used for the control, output, and energy harvesting of the meter system 2000. An inner housing 2058 may be used to provide mounting for the various components contained therein. Mounted to the shaft 2040 are one or more discs 2060. The disc 2060 may contain one or more magnets 2062. The rotation of the shaft 2040 causes the disc 2060, and hence the magnet 2062 to rotate. Mounted above the disc 2060 may be one or more electrical coils 2064 and a reed switch 2066. As shown in FIG. 20A, the coils 2064 and the reed switch 2066 may be mounted external to the casing 2012 in the section 2004. According to exemplary embodiments, the disc and coil arrangement may be that as described in FIG. 19. The operation of which is described above.

According to exemplary embodiments, the energy harvesting and control section 2004 may have one or more printed circuit boards ("PCB") contained therein. As shown in FIG. 20D, there may be a PCB with counter control and battery charging circuits 2070, a PCB for battery box and charging sockets 2072, and a PCB with a display 2074. The PCBs 2070, 2072, and 2074 may provide various control functions for the meter system 2000. These functions may include, but are not limited to, control of the shut-off/turn-on valve 2010 through the geared motor 2014 and calculating the flow rate through the meter as measuring by the reed switch 2066 count of the magnet revolutions from the rotation of the shaft. To control the geared motor 2014, a connection 2076 is provided between the PCB 2072 and the geared motor 2014. This connection 2076 may provide power and control signal to the geared motor 2014. The energy harvesting and control section 2004 may contain one or more battery sections (not shown). The battery sections may be mounted within the protective case 2050 or external thereto. An antenna 210 may be mounted to the energy harvesting and control section 2004 to provide for receiving and transmitting appropriate signals as described in this disclosure.

FIG. 20E provides a cross-section view of the section 2004. Contained with the section 2004 may be components used for the control, output, and energy harvesting of the meter system 2000. As shown in FIG. 20E, an inner housing 2058 may be used to provide mounting for the various components contained therein. The protective case 2050 may be mounted atop the meter section 2002 as shown. The meter section 2002 casing 2012 may have a series of projections 2054 to which the energy harvesting and control section 2004 may be mounted. For example, there may be four projections 2054 to which the protective case 2050 containing the section 2004 may be slide into place and held in place. A sealing gasket 2056 may be fitting between the protective case 2050, the inner housing 2058, and the casing 2012 to provide a weather tight seal. According to exemplary embodiments, the protective case 2050 and its contents may be mounted without the need for external tools.

Mounted to the shaft 2040 are one or more discs 2060. The disc 2060 may contain one or more magnets 2062. The rotation of the shaft 2040 causes the disc 2060, and hence the magnet 2062 to rotate. Mounted above the disc 2060 may be one or more electrical coils 2064 and a reed switch 2066. As shown in FIG. 20A, the coils 2064 and the reed switch 2066 may be mounted external to the casing 2012 in the section 2004. According to exemplary embodiments, the disc and coil arrangement may be that as described in FIG. 19. The operation of which is described above.

According to exemplary embodiments, the energy harvesting and control section 2004 may have one or more printed circuit boards ("PCB") contained therein. As shown in FIG. 20D, there may be a PCB with counter control and battery charging circuits 2070, a PCB for battery box and charging sockets 2072, and a PCB with a display 2074. The PCBs 2070, 2072, and 2074 may provide various control functions for the meter system 2000. These functions may include, but are not limited to, control of the shut-off/turn-on valve 2010 through the geared motor 2014 and calculating the flow rate through the meter as measuring by the reed switch 2066 count of the magnet revolutions from the rotation of the shaft. To control the geared motor 2014, a connection 2076 is provided between the PCB 2072 and the geared motor 2014. This connection 2076 may provide power and control signal to the geared motor 2014. The energy harvesting and control section 2004 may contain one or more battery sections (not shown). The battery sections may be mounted within the protective case 2050 or external thereto. An antenna 210 may be mounted to the energy harvesting and control section 2004 to provide for receiving and transmitting appropriate signals as described in this disclosure.

Exemplary Piston Type Positive Displacement Water Meter

Figure 21A:
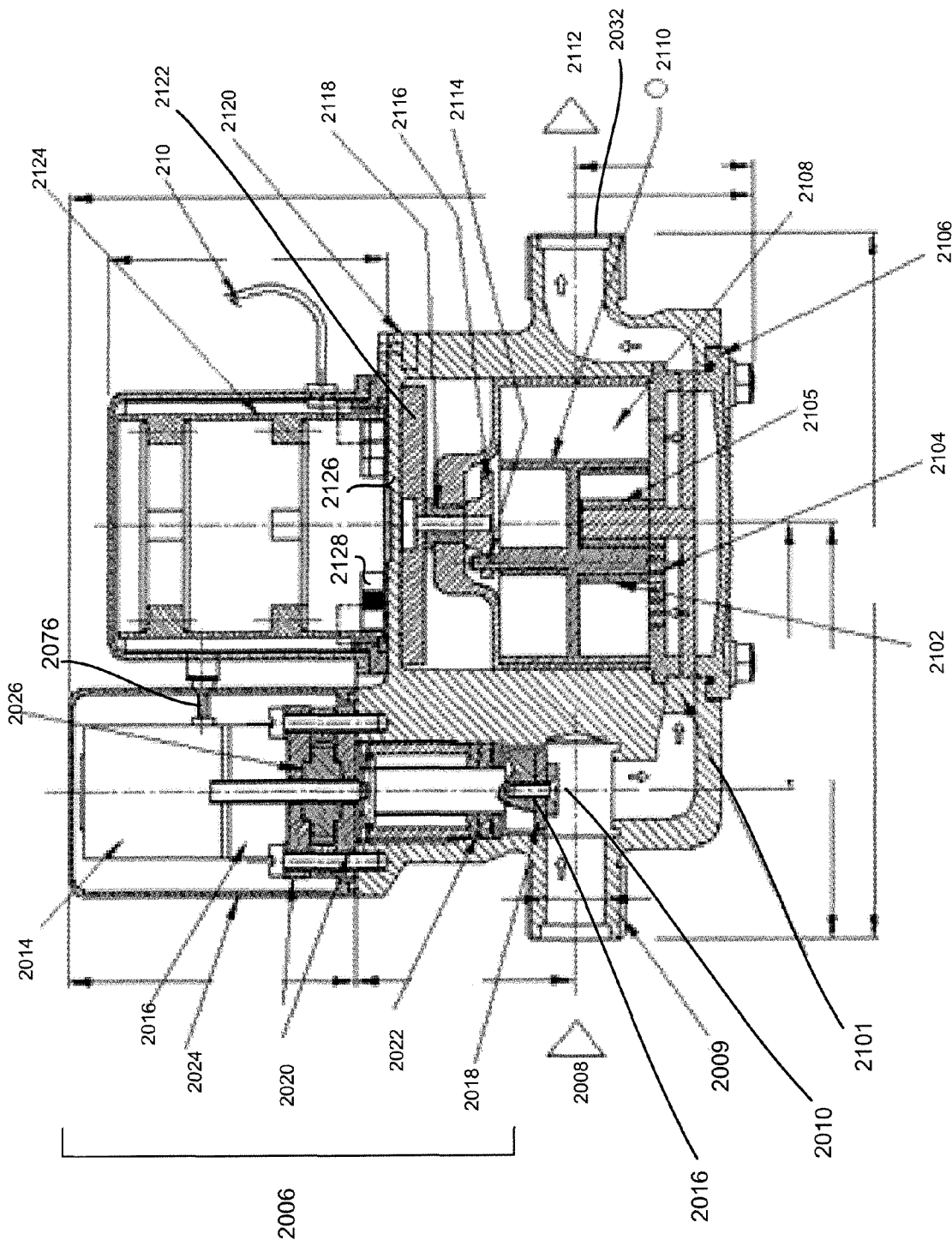
FIG. 21A depicts energy harvesting using a piston type positive displacement water meter, according to various embodiments of the invention.

FIG. 21A depicts energy harvesting using a piston type positive displacement water meter, according to various embodiments of the invention. In one embodiment, FIG. 21A provides an embodiment of an energy harvesting meter containing a piston type positive displacement remote controlled unit. The meter function may be based on the continuous filling and discharging of the measuring chamber (positive displacement) with controlled clearances between the piston and the chamber to ensure minimum gap leakage for precise measurement of each volume cycle. As the piston oscillates, its' center hub rotates a magnet, whose movement may be sensed through the meter wall by electromagnetic sensors or by follower magnets as part of our generator. Each revolution of the magnet may be equivalent to a fixed volume of fluid, which may be converted to any engineering unit of measure for totalization, indication or process control.

FIG. 21A depicts an exemplary water meter, with an energy harvesting device similar to that described in FIG. 20 above, using a piston type 2110 positive displacement remote controlled meter. The meter function may be based on the continuous filling and discharging of the measuring chamber 2108 (positive displacement) with controlled clearances between the piston 2110 and the chamber 2108 to reduce gap leakage for more precise measurement of each volume cycle. As the piston 2110 oscillates, its' center hub 2116 rotates a magnet 2122 via the crank 2118, whose movement may sensed through the meter wall 2126 by electromagnetic sensors 2128 or by follower magnets as part of the generator. Each revolution of the magnet 2122 may be equivalent to a fixed volume of fluid, which may be converted to any engineering unit of measure for totalization, indication, or process control. The remaining elements of this system have already been described in FIG. 20 and are referred to by the same reference numbers.

Figure 21B:
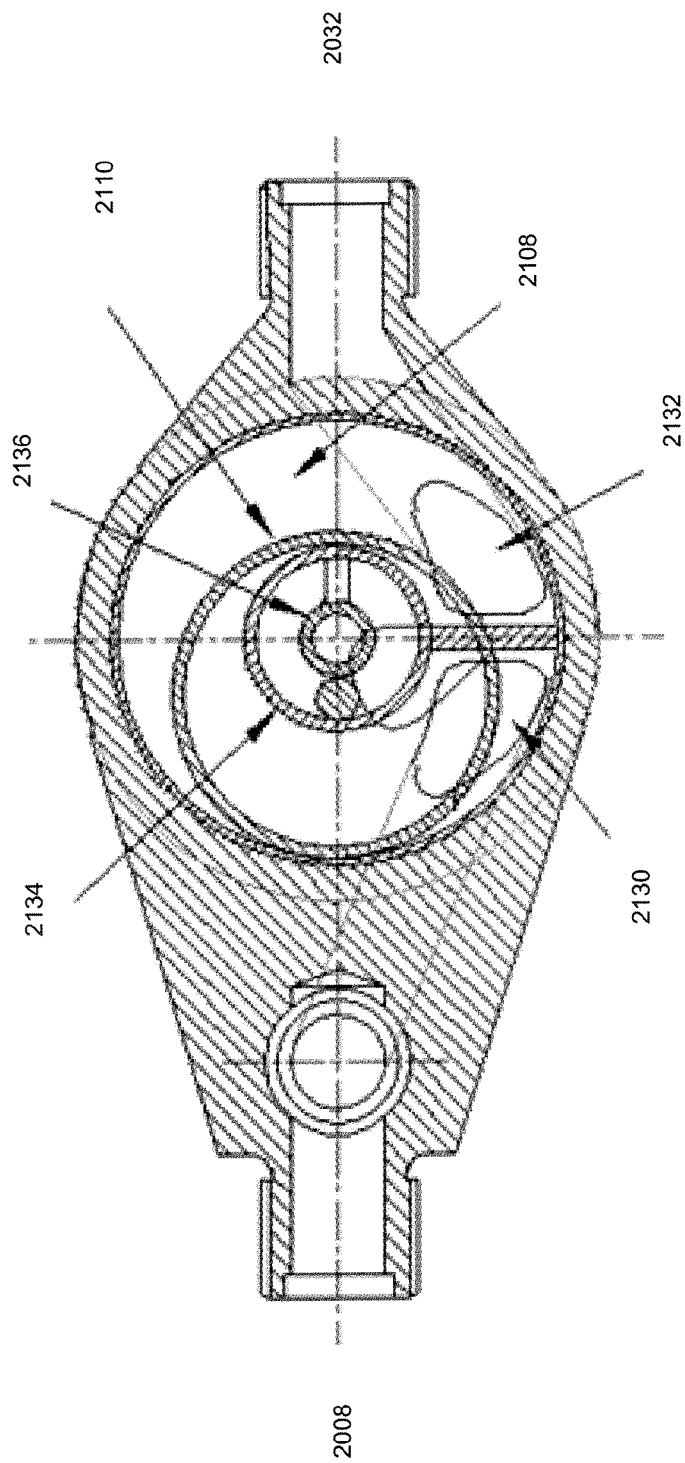
FIG. 21B depicts an top view a piston type positive displacement water meter, according to various embodiments of the invention.

FIG. 21B depicts an top view a piston type positive displacement water meter, according to various embodiments of the invention. Water may flow into an inlet 2008 and pass through the valve into the measurement chamber 2108 via the valve path and the input port 2130. The oscillation of the piston 2110 may result in the water flowing out through output port 2132 out of the measurement chamber 2108 to the meter output 2032. FIG. 21B also shows that the control roller 2134 and the abutment sheet 2136 may assist in keeping the piston 2110 oscillation precise and aligned.

Water Meter Node Schematic

Figure 22A:
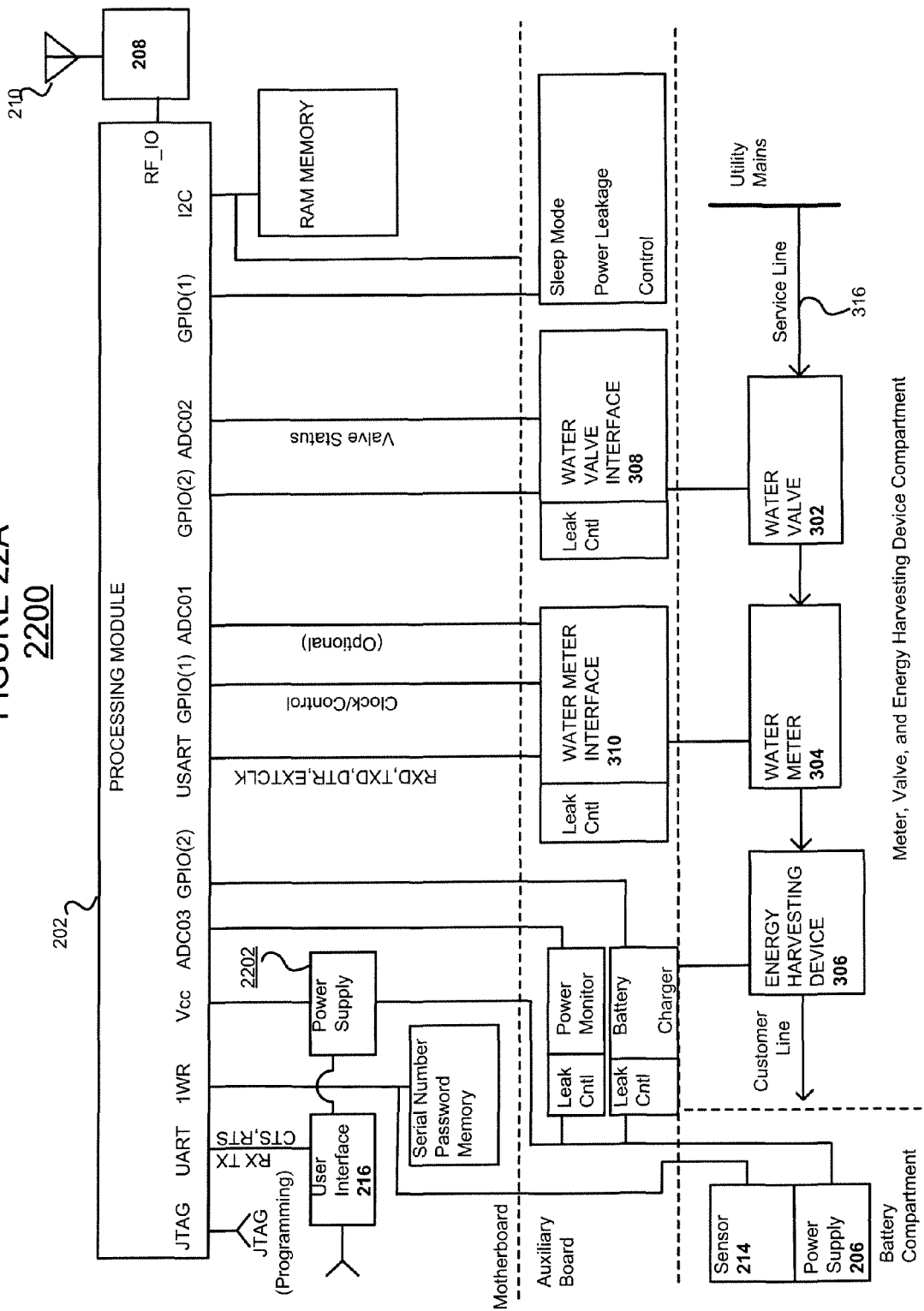
FIG. 22A depicts a schematic for a water meter node, according to various embodiments of the invention.

FIG. 22A depicts a schematic for a water meter node, according to various embodiments of the invention. In one embodiment of the water meter node, a ZigBee module from Meshnetics may have a maximum output power of 11 dBm using spread-spectrum technology may be used. The processing module 202 may be communicatively coupled to a transceiver 208 configured to send and receive messages that may be communicatively coupled to an antenna 210. In one embodiment, the transceiver 208 may be a 900 MHz RF Balun transceiver. In one embodiment, the 50 mV/meter field strength may be about 1 mW at the antenna, with a 1 mW RF transceiver power setting. The ZigBee chip from Meshnetics may comprise a −110 dBm sensitivity with the 1 mW transmit output the range may be about 3 to 5 miles.

The processing module 202 may be coupled to a data storage device. In one embodiment, the data storage device may comprise 1, 2, 3, 4, 5, 6, 7, 8, 9, or 10 RAM memory chips arranged in series or parallel. In another embodiment, the RAM memory chips may be 256 MB memory chips.

The valve may be the first in line per meter standards, however, the position of the metering and generator parts may be interchanged with no adverse effects.

In one embodiment, the node may be coupled to a power supply 206. In one embodiment, the power supply may comprise 1, 2, 3, 4, 5, 6, 7, 8, 9, or 10 batteries arranged in series or parallel. In another embodiment, the power supply 206 may be 6 NiMH (nickel-metal hydride cell battery) batteries. In another embodiment, the motherboard may be coupled to a supplemental power supply 2202 comprising 1, 2, 3, 4, 5, 6, 7, 8, 9, or 10 batteries arranged in series or parallel. In one embodiment, the supplemental power supply 2202 two (2) AA alkaline cells in series. Other power configurations may also be provided. The Aux Board may be may be coupled to a supplemental power supply 2202 as well comprising 1, 2, 3, 4, 5, 6, 7, 8, 9, or 10 batteries arranged in series or parallel. In one embodiment, Aux Board's supplemental power supply 2202 may comprise six NiMH AA cells (nickel-metal hydride cell battery) in series.

In one embodiment, an antenna may be coupled to a common core coupled via a universal connector to an ingress adaptor, according to various embodiments of the invention.

In another embodiment, an antenna may be communicatively coupled to a transceiver configured to send and receive messages communicatively coupled to a microprocessor coupled to a series of interfaces comprising a universal connector, according to various embodiments of the invention.

In another embodiment, an antenna 210 may be coupled to a common core coupled via a universal connector to an ingress adaptor, according to various embodiments of the invention. In another embodiment, an antenna 210 may be communicatively coupled to a transceiver 208 configured to send and receive messages communicatively coupled to a microprocessor coupled to a series of interfaces 2 including GPIO, IRQ, ADC/AC, UART, SPI, and I²C comprising a universal connector, according to various embodiments of the invention.

In one embodiment, comprising an antenna 210 communicatively coupled to a common core coupled via a universal connector to an ingress adaptor, according to various embodiments of the invention. The antenna may be a 802.15.4 antenna configured to send and receive messages. The ingress adaptor may comprise a plurality of interface family types including but not limited to RS232, Enet, ADC, I²C. Each of the Interface Family Types may be used to electrically coupled to the common core (e.g., processing module 202).

In one embodiment, antenna 210 coupled to a transceiver 208 coupled to a microprocessor coupled to a universal connector comprising GPIO, IRQ, ADC/AC, UART, SPI, and I2C interfaces, according to various embodiments of the invention. The antenna 210 may be a 802.15.4 antenna coupled to an 802.15.4 RF transceiver configured to send and receive messages using a range of communication technologies including Low Power Radio, GSM, GPRS, BLUETOOTH, IrDA, ZIGBEE, WiFi, SMS, GSM, RS-232, RS-485. In another embodiment, the data may be transmitted by wireless, telephone lines, or power lines. The microprocessor may be an ATMEL ATMEGA MICROPROCESSOR.

While specific circuitry may be employed to implement the above embodiments, aspects of the disclosed embodiments may be implemented in any suitable computing environment. Although not required, aspects of the embodiments may be implemented as computer-executable instructions, such as routines executed by a general-purpose-computer, (e.g., a server computer, wireless device, personal computer). Those skilled in the relevant art may appreciate that the aspects may be practiced with other communications, data processing, computer, or any combination thereof system configurations, including: Internet appliances, hand-held devices (including personal digital assistants (PDAs), wearable computers, all manner of cellular phones and mobile phones, multi-processor systems, microprocessor-based or programmable consumer electronics, set-top boxes, network PCs (personal computers), mini-computers, mainframe computers, and any combinations thereof.

It should be appreciated that the contents of any of these one or more data storage systems may be combined into fewer or greater numbers of data storage systems and may be stored on a data storage systems or server. Furthermore, the data storage systems may be local, remote, or any combination thereof to clients systems, servers, and other system components. In another embodiment, information stored in the databases may be useful in providing additional personalizations and customizations for providing remote metering and control.

In one embodiment of the invention, the motorized valve that may be remotely operated to open/close the water supply. In another embodiment of the invention, an arrangement to install wire seal for preventing tampering of the control box. In a further embodiment of the invention, the cushioned anti-rotational roller in nutating disc may lessen leakage. In another embodiment of the invention, the PTFE sliders on separators may allow for low friction and lower leakage.

Figure 22B:
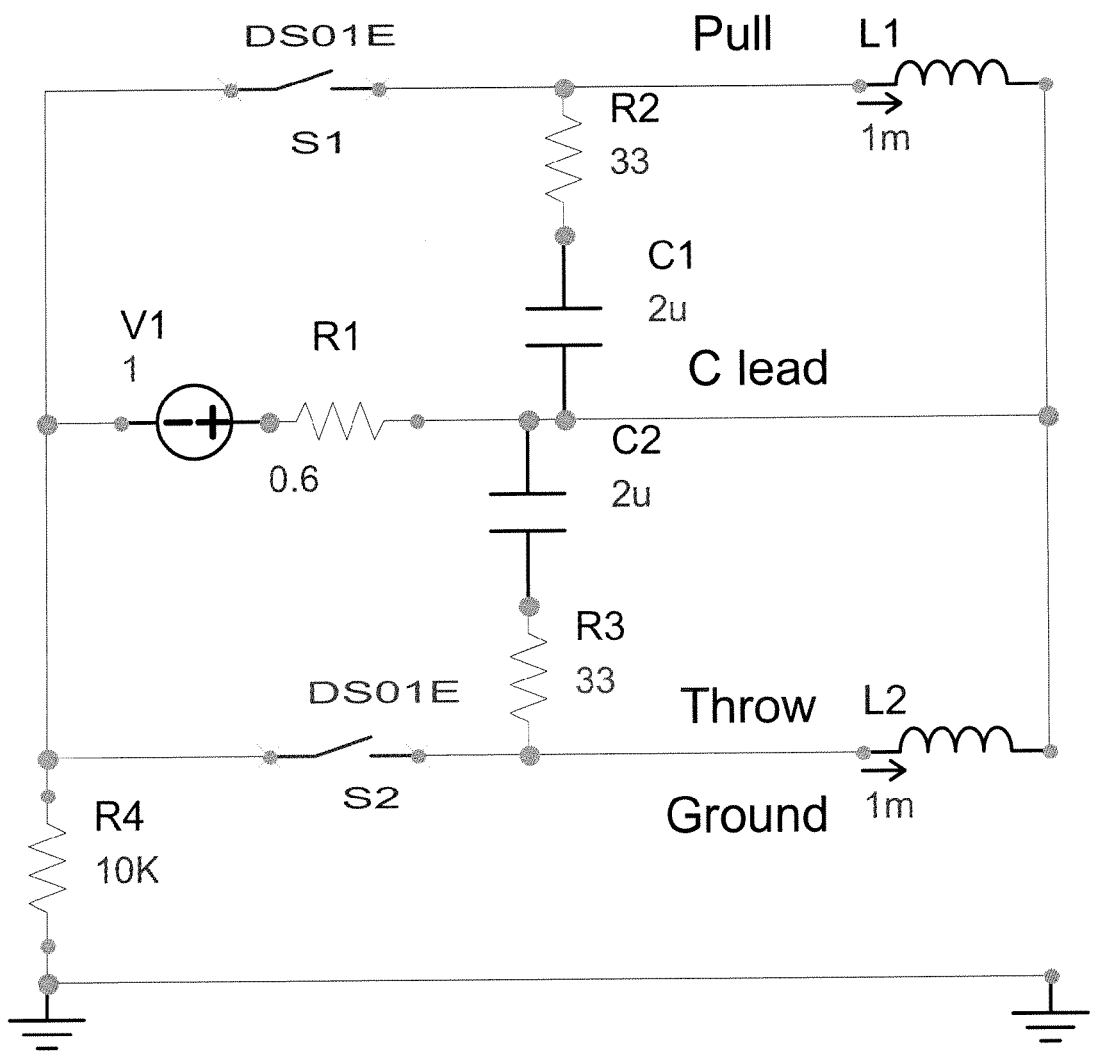
FIG. 22B depicts a schematic for a valve interface, according to various embodiments of the invention.

FIG. 22B Valve Interface

Referring now to FIG. 22B, the water valve 302 configured to open or close a water supply line in FIG. 3 or gas valve 402 configured to open or close a gas supply line in FIG. 4 may have a 6 VDC nominal operating voltage with 11 Watts may be needed to activate the valve with about a 50 millisecond impulse. The valve may have four leads P, C, T, and G. The C lead may be the common lead and may be connected to the battery supply. There are DC resistive paths from the C lead to the P lead and the T leads. The P lead may be the Pull lead and may open the valve when energized with a ground pulse through switch 1 of a specified duration and current. The T lead may be the Throw lead and may close the valve with a ground pulse through switch 2 of a specified duration and current. The G lead may be connected to the metal case of the valve.

Pulse periods may remain within minimum and maximum values. More precise values between these may be programmed to any value between the minimum and maximum values. Battery voltages driving the valve may remain within the maximum and minimum values. Operation above or below the maximum and minimum. Resistor R1 shows the internal resistance of the driver circuit. R1 values vary with battery voltage. At the minimum battery voltage, the resistor value may be the maximum value. At battery voltages above 7.2 Volts to maximum voltage the resistor value approaches minimum. The valve may operate normally at the minimum voltage with the maximum resistance value of R1 shown in the table. The valve may operate normally at the maximum voltage with the minimum resistance of R1 shown in the table. A valve may be able to be opened and closed within 500 milliseconds of each operation. The time between repeated open and close operations of the driver circuit may be 5 seconds minimum. In one embodiment of the invention, the valve driver may have a driver internal resistance (R1) from about at least 0.25 Ohms to 0.60 Ohms. In a further embodiment, the valve driver may have a driver internal resistance (R1) of about 0.10, 0.20, 0.25, 0.30, 0.35, 0.40, 0.50, 0.55, 0.60, 0.65, or 0.70 Ohms. The valve driver may have a battery voltage (V1) from about at least 6.0 VDC to 8.7 VDC. In a further embodiment, the battery voltage (V1) may be at least 4.0, 5.0, 6.0, 6.5, 7.0, 7.5, 8.0, 8.5, 8.70, 8.75, or 9.0 VDC. The valve driver may have a switch close time of 10 about at least 10 milliseconds to 200 milliseconds. In another embodiment the switch close time may be about 1, 2, 5, 10, 20, 30, 40, 50, 60, 70, 80, 90, 100, 110, 120, 130, 140, 150, 160, 170, 180, 190, 200, 205, or 210 milliseconds. In another embodiment the valve driver may be able to repeat a switch operation in the same switch within in 1, 2, 3, 4, 5, 6, 7, 8, 9, or 10 seconds. In a further embodiment, the valve driver may be able to repeat a switch operation in the same switch within in 5 seconds. In a further embodiment, the valve driver may have a switch current in pulse of at least about 1, 2, 3, 4, or 5 amperes. In another embodiment, the switch current in pulse may be 3.0 Ampere. In one embodiment of the invention, the Coulombs per activation in the valve driver may be 100, 200, 300, 400, 500, 600, 700, 800, 900, or 1,000 milliCoulombs. In another embodiment, the coulombs per activation are at most about 500, 600, or 700 milliCoulombs. In one embodiment, a wire size of 5, 10, 20, 25, or 30 AWG may be used in wires running coil to board. In a further embodiment, the wire size may be 15, 20, 21, 22, 23, 24, or 25 AWG. The valve coil inductance may be 500 µH to 100 mH. In another embodiment, the valve coil inductance may be 500, 600, 700, 800, or 900 µH. In a further embodiment, the valve coil inductance may be 10, 50, or 100 mH. In one embodiment of the invention, the valve coil resistance may be 1.0, 1.5, 2.0, 2.5, 2.70, 2.75, 3.0, or 3.5 Ohms. In another embodiment, the valve coil resistance may be about 2.7 Ohms. In a further embodiment of the invention, the valve coil resistance to ground in the valve driver may be about 1, 2, 5, 10, 15, or 20 Ohms. In another embodiment, the valve coil resistance to ground may be 8, 9, 10, 11, or 12 Ohms.

The valve may be mounted on the water meter to interrupt the flow of water between the inlet to the water meter and water-measuring chamber. An electronic pulse between the P and C leads may open the valve. An electronic pulse between the T and C leads may close the valve.

A pulse between the P and C leads may open the valve against the Input Operational Pressure. A pulse between the T and C leads may close the valve against the Input Operational Pressure, even if the water may be flowing at the Operational Flow Rate in the meter at the time the close pulse happens. In one embodiment of the invention, the test flow rate of the valve may be 0.25, 0.5, 1, 2, 5, 7.5, 10, 12.5, 15, 17.5, or 10 gallons per minute. In another embodiment, the test flow rate of the valve may range from about 0.10 to 20 gallons per minute, 0.20 to 17 gallons per minute, or 0.25 to 15 gallons per minute. In another embodiment of the invention, the test pressure drop of the valve may be 1.0, 1.5, 2.0, 2.20, 2.25, 2.5, 2.75 or 3.0 PSI. In a further embodiment, the test pressure drop of the valve may be 2.0, 2.2, 2.25, 2.3, 2.4, or 2.5 PSI. In one embodiment of the invention, the test burst pressure of the valve may be 100, 200, 300, 400, 500, 600, 700, 800, 900 or 1,000 PSI. In another embodiment of the invention, the test burst pressure of the valve may be 500, 600, or 700 PSI. In another embodiment of the invention, the input operational pressure of the valve may be 10 to 200 PSI. In another embodiment of the invention, the input operational pressure of the valve may be 13 to 150 PSI. The combined valve, water meter measuring chamber, and energizer may not exceed the AWWA standard C700-02, incorporated herein by reference in its entirety.

Moreover, the various components, servers, devices, any combination thereof may be customized to perform one or more additional features and functionalities. Such features and functionalities may be provided via deployment, transmitting or installing software/hardware. Some aspects of the embodiments may be implemented in a special purpose computer or data processor that may be specifically programmed, configured, or constructed to perform one or more of the processes described herein.

The system and components described herein may be constructed in a variety of manners configurations including virtual (e.g., software, virtual, internet based) components. The system and components described herein may be coupled (e.g., electrically or mechanically) or networked.

All patents, patent application publications, and non-patent publications mentioned in this specification may be indicative of the level of skill of those skilled in the art to which this invention pertains. All patents, patent application publications, and non-patent publications may be herein incorporated by reference in their entirety to the same extent as if each individual patent, patent application publication, and non-patent publication was specifically and individually indicated to be incorporated by reference.

EXAMPLES

The examples contained herein may be offered by way of illustration and not by any way of limitation.

Example 1

Advanced Metering Infrastructure (AMI)

The invention described herein provides a system and method to remotely read meters, remotely control the connection status, may allow for encrypted data communication, and real time alarms. The system and method described herein may be integrated into any existing infrastructure or network to upgrade a preexisting system to an AMI system (e.g., retrofit).

In another embodiment of the invention, the systems described herein may provide utility support (e.g., consulting and planning, asset management, engineering services, inspection and treatment services, storm/disaster assistance) for operations in outage management and grid component failure (e.g., transformer explosion). In another embodiment, the system may comprise telemetry to provide an utility organization with the required information to monitor and prevent outages and grid component failures.

In an alternate embodiment of the invention, the system and method described herein may comprise automatic meter reading, wherein a transducer unit may be used in conjunction with the meter nodes 101 to detect the output of the meters and transmit that information back to the control unit 106 via a network 108. For example, a node 101 may detect a problem with a transformer and send a message to a remote coordinator 104. The remote coordinator 104, in turn, may send a message to a control unit 106 to notify the utility of the transformer problem, message another remote coordinator 104 to check the status of other transformers in the system, and reroute the commodity (e.g., modify the distribution load and direction) via node 101 in a cluster 102 to prevent (or delay) the transformer failure.

In particular, the system described herein may not require an existing physical infrastructure and may be readily built and established in areas with little or no existing physical infrastructure (e.g., rural areas, developing nations). The system described herein also may require little equipment to maintain and may be built to be resistant to weather, tampering, pilfering, or terrorist attacks. Additionally, the system described herein may be installed on existing physical infrastructure including but not limited to telephone poles, street lamps, bridges, buildings including but not limited to municipal, commercial, residential, or industrial buildings.

Example 2

Energy Harvesting Device Requirements

The system described herein require little power over a day to operate. For example, most of the time the nodes described herein are in a "sleep mode" that may use less than 12 mAmp (micro Amperes) of current. The active time may be less than 2 minutes per day for a routing node 101 and 4 minutes per day for a meter node 101. The energy harvesting device may only require magnetic coupling through a high strength plastic wall.

The total battery drain, which may include the self-discharge of the battery may vary from about 7 coulombs-per-day to 10 coulombs-per-day depending on the node's position in the network 108 and status. One type of batteries suitable for use in the invention are NiMH batteries which are long storage life batteries with about 2000 mAHr capacity allowing for about 7200 coulombs of charge available. NiMH batteries may last at least a year and a half with no charging from the energy harvesting device in water valve shut off mode.

For example, a typical consumer may use more than 20 gallons per day at home (e.g., a two-person family may use about 70 gallons-per-day for household uses.) A garden alone may use another 40 gallons per day during a growing season.

A flow rate of 1 gallon-per-minute is low for showers, kitchen, and other uses. Even at the low rate of 1 one gallon-per-minute flow at a 1 PSI drop in a 5/8" pipe the energy harvesting valve described herein (energy harvesting device) may produce about 0.434 Joules of energy per second. In comparison, river dams convert mechanical energy to electrical energy at about 90% efficiency and tidal dams have about 30% efficiency. Using the lower value for computation, the coil of wire may have about 0.13 Joules of energy-per-second available. The peak voltage of the batteries may be about 8.7 Volts. Thus about 15 milliCoulombs of charge per second (15 milliAmpere) or about 0.898 Coulombs of charge per gallon may be achieved even with a low flow rate (e.g., 1 gallon-per-minute). Thus only about 11 gallons of water per day may be needed to replace the daily use of the equipment described herein (e.g., water meter node in FIG. 3)

Thus, a large pressure drop is not necessary for the energy harvesting device (energy harvesting valve) for the equipment described herein. The electronics described herein may limit the amount of current in the coil of wire to the herein discussed amounts. Therefore back EMF may be small because of the low efficiency (e.g., 30%) coupling of the generator impellers to the coil (e.g., 0.13 joules*0.30=39 mJ of back EMF pressure) Other uses for the pulses of energy from the coil other than charging the batteries may be also possible.

Example 3

Advanced Industrial Coordination Infrastructure

The system described herein may allow for remote monitoring and control of an industrial infrastructure (e.g., factory, assembly lines, chemical synthesis plants, food processing plants, mills). A control unit 106 may control the timing, duration, function, temperature, action, and frequency of the equipment; synchronize or stagger the factory output; and preferentially deactivate and active in a pattern (e.g., change the factory output to accommodate may change in orders).

The system and method described herein may allow, on an ongoing basis, the history of key metrics (e.g., distribution loading, network status) from which key operational metrics of transformer performance may be collected and analyzed. Predictive maintenance and the replacement and upgrade of network infrastructure (e.g., machines, transformers, parking meters, traffic lights, meters, devices) may be managed more effectively and efficiently. The distribution grid may be managed predictably instead of forensically.

The system and method described herein may be used in many industrial applications including but not limited to monitoring and controlling machines including but not limited to web handling lines; paper machines and pulp processes; inventory management and tracking; conveyor systems; bottling lines; paint line scheduling and routing control; textile range line control systems; mixing, batching and blending systems (e.g., food, beverages, chemicals, pharmaceuticals); packaging operations; metals process line control systems; materials and press handling control systems; chemical plants; and refineries.

Example 4

Municipal Infrastructure

The system and method described herein may be adapted to monitor and control the status and operation of traffic signals (e.g., infrastructure). A control unit 106 controls the timing, duration, and frequency of the traffic signals; may synchronize or stagger the traffic lights; and preferentially deactivate and active in a pattern (e.g., change the traffic light pattern to favor the passage of emergency, law enforcement, public transit). The control unit 106 monitors and controls at least one cluster 102 comprising at least one remote coordinator 104 and at least one node 101 installed throughout the traffic signal system (e.g., a single node 101 may control a single traffic signal) via a wireless network (e.g., MESH network). A plurality of remote coordinators 104 monitor and control a plurality of nodes 101 installed throughout the traffic signal system. Each remote coordinator 104 may monitor and control a plurality of nodes 101 in a cluster 102. Each cluster 102 may be arranged to maximize coordination of a node 101. A remote coordinator 104 also relay information (e.g., status, commands, messages) from the control unit 106 to a node 101 within their cluster 102 and between other remote coordinators 104. Several nodes 101 within the system may be coupled to actuators 606 including but not limited to a programmable logic controllers (PLC) to may allow remote activation, deactivation, and modulation of the traffic lights. For example, the system may allow an user to stop and start the flow of traffic, accommodate for emergency vehicles, public transit, reroute traffic in emergencies. Several nodes 101 may also comprise alarms and sensors 214 coupled to processing module 202 to monitor, detect, and report damage, pilfering, tampering, and vandalism to the traffic signals. The system and method installed in the traffic signal system (e.g., infrastructure) may allow for the remote control and monitoring of the traffic signal network and to detect and quickly repair damage.

Example 5

Emissions Meter

A node 101 may be integrated into any industrial or commercial site to may measure the efflux of emissions. The node 101 may be coupled to a meter to may measure the outflow and communicate with a remote coordinator 104 which in turns may transmit the information to the control unit 106. The node 101 may comprise a sensor 214 that measures only a part of the emissions stream (e.g., sample) coupled to a processing module 202 which extrapolates to the full emissions. The node 101 may further comprise at least one sensor 214 to detect the character or nature of the emissions including but not limited to carbon dioxide, sulfur dioxide, mercury, particulate matter, or methane. The emissions node 101 may allow for the industrial or commercial facility to accurately, and in real time, calculate and report their emissions. The emissions node 101 for emissions may also comprise a valve for an emergency stop on emissions. For example, a node 101 may be coupled to an actuator control coupled to a processing module 202 that closes a valve to prevent release of toxic substances or excessive emissions.

Although the invention may have been described in some detail by way of illustration and example for purposes of clarity of understanding, certain may change and modifications may be practiced within the scope of the appended claims. Modifications of the above-described modes for carrying out the invention that are obvious to persons of skill in electrical engineering and related fields may be intended to be within the scope of the following claims.

The present disclosure may not to be limited in scope by the specific embodiments described herein. Indeed, other various embodiments of and modifications to the present disclosure, in addition to those described herein, may be apparent to those of ordinary skill in the art from the description and accompanying drawings. Thus, such other embodiments and modifications may be intended to fall within the scope of the present disclosure. Further, although the present disclosure may have been described herein in the context of a particular implementation in a particular environment for a particular purpose, those of ordinary skill in the art may recognize that its usefulness may be not limited thereto and that the present disclosure may be beneficially implemented in any number of environments for any number of purposes. Accordingly, the claims set forth below may be construed in view of the full breadth and spirit of the present disclosure as described herein. Other embodiments may be considered.

Although the invention may have been described in some detail by way of illustration and example for purposes of clarity of understanding, certain may change and modifications may be practiced within the scope of the appended claims. Modifications of the above-described modes for carrying out the invention that are obvious to persons of skill in electrical engineering and related fields may be intended to be within the scope of the following claims.

We claim:

1. A system comprising
   a valve configured to open or close in response to a message, the valve being coupled to the inflow port of a meter and
   an energy harvesting device comprising a rotor that rotates with flow of a commodity and generates electricity through electromagnets attached to a shaft coupled to or independent of the outflow of the meter,
      wherein the valve, meter, and energy harvesting device are electrically coupled to a processing module configured to send and receive messages to open or close the valve or send a message comprising commodity usage information from the meter
   and said processing module electrically coupled electrically coupled to a synchronization element,
      wherein the processing module is communicatively coupled to a wireless transceiver,
      wherein the energy harvesting device comprising a rotor that rotates with flow of a commodity and generates electricity through electromagnets attached to a shaft independent of meter shaft to overcome measurement inaccuracy at low flows due to the coupled design associated with increased magnetic flux.

2. The system of claim 1, wherein the system further comprise housing that protects the system from damage.

3. The system of claim 1, wherein the meter is a water meter.

4. The system of claim 3, wherein the water meter is a multi-jet meter, single-jet meter, positive displacement meter, vertical turbine meter, horizontal turbine meter, compound meter, fire meter, fire hydrant meter, or a magnetic flow meter.

5. The system of claim 1, wherein the valve, meter, and energy harvesting device are in fluid communication with each other.

6. The system of claim 5, wherein the valve, meter, and energy harvesting device are in fluid communication with each other in that order.

7. The system of claim 1, wherein the energy harvesting device provides power to the valve, meter, processing module, transceiver, and combinations thereof.

8. The system of claim 1, wherein the energy harvesting device further comprises a rectifier operatively coupled to an output of the energy harvesting device and adapted to convert the energy from an alternating current (AC) to a direct current (DC).

9. The system of claim 1, wherein the energy harvesting device further comprising at least one power supply adapted to be charged by an output of a rectifier.

10. The system of claim 1, wherein the energy harvesting device further comprising a first power supply adapted to be charged by an output of a rectifier and a second power supply adapted to be charged by an output of the first power supply.

11. The system of claim 1, wherein the energy harvesting device further comprising a power supply interface configured to monitor voltages levels of the first power supply and second power supply and cause a transfer of energy from the first power supply to the second power supply in the event that the voltage level of the first storage device is above a first threshold and the voltage level of the second storage device is below a second threshold.

12. The system of claim 1, wherein the energy harvesting device further comprising a power supply interface operatively coupled to the first power supply and adapted to maintain voltage levels within a specified range.

13. The system of claim 1, wherein a rotator is selected from the group consisting of a turbine, impeller, oscillating disk, blade and shaft assembly, and a nutating disk assembly.

14. The system of claim 1, wherein the energy harvesting device further comprising a drive shaft operatively coupled to a rotating device at a first end and to the drive magnet at a second end.

15. The system of claim 1, wherein the energy harvesting device further comprises: a pair of rotors operatively coupled to a registration magnet and adapted to rotate in response to the registration magnet rotating,
   wherein each rotor comprises at least one magnetic pole; and
   a series of coils interposed between the pair of rotors,
   wherein the rotation of the pair of rotors with respect to the at least one coil produces an alternating current (AC) in the at least one coil.

16. The system of claim 15, further comprising a registration magnet shaft operatively coupled to the registration magnet at a first end and to the rotors at a second end.

* * * * *